US012452296B1

United States Patent
Kamdjou et al.

(10) Patent No.: US 12,452,296 B1
(45) Date of Patent: Oct. 21, 2025

(54) SYSTEMS AND METHODS FOR REAL-TIME DETECTION AND MITIGATION OF MALICIOUS ELECTRONIC COMMUNICATIONS

(71) Applicant: Sublime Security, Inc., Washington, DC (US)

(72) Inventors: Joshua Kamdjou, Washington, DC (US); Ian Thiel, Brooklyn, NY (US); Ross Wolf, Denver, CO (US)

(73) Assignee: Sublime Security, Inc., Washington, DC (US)

( * ) Notice: Subject to any disclaimer, the term of this patent is extended or adjusted under 35 U.S.C. 154(b) by 0 days.

(21) Appl. No.: 19/261,636

(22) Filed: Jul. 7, 2025

Related U.S. Application Data

(60) Provisional application No. 63/757,898, filed on Feb. 13, 2025.

(51) Int. Cl.
*H04L 9/40* (2022.01)
(52) U.S. Cl.
CPC ...... *H04L 63/1441* (2013.01); *H04L 63/1416* (2013.01)
(58) Field of Classification Search
None
See application file for complete search history.

(56) References Cited

U.S. PATENT DOCUMENTS

| | | | | |
|---|---|---|---|---|
| 9,781,148 | B2 * | 10/2017 | Mahaffey | H04W 12/02 |
| 10,417,432 | B2 * | 9/2019 | Mahaffey | H04L 63/145 |
| 2016/0099963 | A1 * | 4/2016 | Mahaffey | H04L 63/166 726/25 |
| 2019/0068616 | A1 * | 2/2019 | Woods | H04L 63/145 |
| 2020/0296116 | A1 * | 9/2020 | Woods | H04L 51/08 |
| 2021/0011999 | A1 * | 1/2021 | Bennett | G06F 16/1734 |
| 2022/0051127 | A1 * | 2/2022 | Jacobson | H04L 51/212 |
| 2022/0292189 | A1 * | 9/2022 | Silberman | G06F 21/554 |

(Continued)

FOREIGN PATENT DOCUMENTS

WO  WO-2025132775 A1 *  6/2025 ......... H04L 63/1433

*Primary Examiner* — Joseph P Hirl
*Assistant Examiner* — Hassan Saadoun
(74) *Attorney, Agent, or Firm* — Padowithz Alce; Chandler Scheitlin; Alce PLLC

(57) ABSTRACT

A system, method, and computer-program product includes detecting an electronic communication transmitted to a message storage repository monitored by a threat detection and response service, retrieving unstructured message data of the electronic communication in response to detecting the transmission of the electronic communication to the message storage repository, transforming the unstructured message data of the electronic communication into a structured message data object interpretable by the threat detection and response service, assessing the structured message data object that corresponds to the electronic communication against a set of subscriber-agnostic threat detection instructions provided by the threat detection and response service and a set of subscriber-composable enrichments that include subscriber-composed threat detection instructions, automatically detecting the electronic communication as malicious based on the assessment, and executing a threat mitigation action that mitigates a security threat associated with the electronic communication.

30 Claims, 31 Drawing Sheets

(56) References Cited

U.S. PATENT DOCUMENTS

| | | | |
|---|---|---|---|
| 2023/0144173 A1* | 5/2023 | St. Pierre | H04L 63/1408 |
| | | | 726/26 |
| 2023/0224312 A1* | 7/2023 | Duffy | H04L 63/1416 |
| | | | 726/22 |
| 2024/0314161 A1* | 9/2024 | Schaaf | H04L 51/08 |
| 2025/0240312 A1* | 7/2025 | Duffy | H04L 63/1433 |

* cited by examiner

DETECTING AN ELECTRONIC COMMUNICATION TRANSMITTED TO A MESSAGE STORAGE REPOSITORY S210

RETRIEVING UNSTRUCTURED MESSAGE DATA OF THE ELECTRONIC COMMUNICATION IN RESPONSE TO DETECTING THE TRANSMISSION OF THE ELECTRONIC COMMUNICATION TO THE MESSAGE STORAGE REPOSITORY S220

TRANSFORMING THE UNSTRUCTURED MESSAGE DATA OF THE ELECTRONIC COMMUNICATION INTO A STRUCTURED MESSAGE DATA OBJECT S230

ASSESSING THE STRUCTURED MESSAGE DATA OBJECT THAT CORRESPONDS TO THE ELECTRONIC COMMUNICATION AGAINST A SET OF SUBSCRIBER-AGNOSTIC THREAT DETECTION INSTRUCTIONS AND A SET OF SUBSCRIBER-SPECIFIC THREAT DETECTION INSTRUCTIONS S240

DETECTING THE ELECTRONIC COMMUNICATION AS MALICIOUS BASED ON THE ASSESSMENT S250

EXECUTING A THREAT MITIGATION ACTION THAT MITIGATES A SECURITY THREAT ASSOCIATED WITH THE ELECTRONIC COMMUNICATION IN RESPONSE TO DETECTING THE ELECTRONIC COMMUNICATION AS MALICIOUS S260

FIGURE 2

Unstructured or Raw Message Data of
New Electronic Communication

> From: "Roger Stone" <doin.crimes@gmail.com>
>
> To: "Pamela Ross" <pamela.ross@tyrellcorp.com>
>
> Subject: Salary Payment Update
>
> Date: Wed, 3 Aug 2023 10:00:00 -0400
>
> Message-ID: <doin.crimes@gmail.com>
>
> MIME-Version: 1.0
>
> Content-Type: text/plain; charset="UTF-8"
>
> Content-Transfer-Encoding: quoted-printable
>
> Dear Pamela,
>
> I hope this email finds you well. I am writing to request an update to my salary payment details.
>
> Due to recent changes in my banking arrangements, I would like to provide you with my new bank account information for salary deposits:
>
> Bank Name: New Bank
>
> Account Holder: John Doe
>
> Account Number: 123456789
>
> Routing Number: 987654321
>
> If you require any further information or have any questions, please feel free to contact me. I appreciate your assistance in updating my salary payment details.
>
> Thank you for your attention to this matter.
>
> Best regards,
>
> Roger Stone Structured Data Object Generator 108

Structured Message Data Object
Corresponding to New Electronic
Communication

FIGURE 5

Structured Message Data Object Corresponding to New Electronic Communication

SYSTEMS AND METHODS FOR REAL-TIME DETECTION AND MITIGATION OF MALICIOUS ELECTRONIC COMMUNICATIONS

CROSS-REFERENCE TO RELATED APPLICATIONS

This application claims the benefit of U.S. Provisional Application No. 63/757,898, filed 13 Feb. 2025, which is incorporated in its entirety by this reference.

TECHNICAL FIELD

This invention relates generally to the cybersecurity field, and more specifically to new and useful threat detection and mitigation systems and methods in the cybersecurity field.

BACKGROUND

Conventional cybersecurity services are designed as closed, black-box solutions. Such cybersecurity services fail to provide transparency into how security threats are detected and further restrict subscribing entities from modifying any characteristic related to threat detection. As a result, subscribing entities lack control over how security threats are detected and cannot adapt detection logic to their unique operating requirements.

Therefore, there is a need in the art for systems and methods that provide subscribing entities with transparency into how security threats are detected, as well as control over the detection logic used to identify such threats. The embodiments of the present application provide technical solutions that address, at least, the needs described above, as well as the deficiencies of the state of the art.

BRIEF SUMMARY OF THE EMBODIMENTS

In one embodiment, a computer-implemented method for real-time detection and mitigation of malicious electronic communications includes at a threat detection and response service detecting, in real-time, an electronic communication transmitted to a message storage repository monitored by the threat detection and response service; retrieving, by one or more computers, unstructured message data of the electronic communication in response to detecting the transmission of the electronic communication to the message storage repository; transforming, by the one or more computers, the unstructured message data of the electronic communication into a structured message data object interpretable by the threat detection and response service, wherein transforming the unstructured message data of the electronic communication into the structured message data object includes: instantiating a message data object based on a message data model schema defined by the threat detection and response service for representing electronic communications of a target type, extracting, from the unstructured message data of the electronic communication, a plurality of message components specified by the message data model schema, and populating, within the message data object, the plurality of message components in accordance with the message data model schema to create the structured message data object corresponding to the electronic communication; assessing, by the one or more computers, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository; automatically detecting, by the one or more computers, the electronic communication as malicious based on the assessment of the structured message data object of the electronic communication against the set of subscriber-agnostic threat detection instructions and the set of subscriber-specific threat detection instructions; and executing, in real-time, a threat mitigation action that mitigates a security threat associated with the electronic communication in response to detecting the electronic communication as malicious.

In one embodiment, the threat detection and response service provides the subscribing entity with a distinct instance of the threat detection and response service in response to receiving a service enrollment request from the subscribing entity, and the computer-implemented method further includes receiving, via a graphical user interface of the threat detection and response service, a code repository connection request from the subscribing entity to digitally connect a private threat detection code repository hosted by a remote code repository service to the distinct instance of the threat detection and response service, wherein the private threat detection code repository includes the set of subscriber-specific threat detection instructions; retrieving, in real-time or near real-time, the set of subscriber-specific threat detection instructions included in the private threat detection code repository in response to receiving the code repository connection request; and storing the set of subscriber-specific threat detection instructions retrieved from the private threat detection code repository within the distinct instance of the threat detection and response service, wherein the threat detection and response service does not use the set of subscriber-specific threat detection instructions when assessing inbound electronic communications that correspond to other subscribing entities.

In one embodiment, the threat detection and response service provisions a distinct instance of the threat detection and response service for the subscribing entity in response to receiving a service enrollment request from the subscribing entity, and provisioning the distinct instance of the threat detection and response service for the subscribing entity includes automatically retrieving the set of subscriber-agnostic threat detection instructions provided by the threat detection and response service by downloading a copy of a publicly accessible threat detection code repository hosted by a remote code repository service, wherein the publicly accessible threat detection code repository includes the set of subscriber-agnostic threat detection instructions, and the publicly accessible threat detection code repository is controlled by the threat detection and response service; and storing, within the distinct instance of the threat detection and response service, the set of subscriber-agnostic threat detection instructions retrieved from the publicly accessible threat detection code repository.

In one embodiment, the threat detection and response service provisions a distinct instance of the threat detection and response service for the subscribing entity in response to receiving a service enrollment request from the subscribing entity, and the computer-implemented method further includes after detecting the electronic communication as malicious: receiving, via a graphical user interface of the threat detection and response service, a code repository connection request from the subscribing entity to digitally connect a third-party threat detection code repository hosted by a remote code repository service to the distinct instance of the threat detection and response service, wherein: the third-party threat detection code repository includes a corpus of third-party threat detection instructions created by a third-party entity external to the subscribing entity and the threat detection and response service; retrieving, in real-time or near real-time, the corpus of third-party threat detection instructions included in the third-party threat detection code repository in response to receiving the code repository connection request; and storing the corpus of third-party threat detection instructions retrieved from the third-party threat detection code repository within the distinct instance of the threat detection and response service.

In one embodiment, the computer-implemented method further includes detecting, in real-time, a second electronic communication transmitted to the message storage repository; generating, by the one or more computers, a second structured message data object for the second electronic communication using unstructured message data that corresponds to the second electronic communication; automatically assessing, by the one or more computers, the second structured message data object that corresponds to the second electronic communication against (i) the set of subscriber-agnostic threat detection instructions provided by the threat detection and response service, (ii) the set of subscriber-specific threat detection instructions created by the subscribing entity that controls the message storage repository, and (iii) the corpus of third-party threat detection instructions created by the third-party entity external to the subscribing entity and the threat detection and response service; automatically detecting, by the one or more computers, the second electronic communication as malicious based on the second structured message data object satisfying at least one third-party threat detection instruction of the corpus of third-party threat detection instructions; and executing, in real-time, a second threat mitigation action that mitigates a security threat associated with the second electronic communication in response to detecting the second electronic communication as malicious.

In one embodiment, the message storage repository is used by an end user associated with the subscribing entity, and executing the threat mitigation action includes automatically routing the electronic communication from the message storage repository to a threat containment queue that is not accessible by the end user.

In one embodiment, the electronic communication is stored in a primary directory of the message storage repository, and executing the threat mitigation action includes: automatically removing the electronic communication from the primary directory of the message storage repository, and automatically routing the electronic communication removed from the primary directory to a message disposal directory of the message storage repository.

In one embodiment, the message storage repository corresponds to an electronic mail service used by the subscribing entity, and executing the threat mitigation action includes: generating, by the one or more computers, a security alert message that includes a precis of the electronic communication detected as malicious, and transmitting the security alert message to the subscribing entity using a real-time messaging service different from the electronic mail service.

In one embodiment, the computer-implemented method according to claim 1, further includes after executing the threat mitigation action that mitigates the security threat associated with the electronic communication instantiating, by the one or more computers, a detection repository graphical user interface that includes: a first selectable detection repository user interface element that corresponds to the set of subscriber-agnostic threat detection instructions, and a second selectable detection repository user interface element that corresponds to the set of subscriber-specific threat detection instructions; receiving, by the one or computers, a first input from the subscribing entity selecting the first selectable detection repository user interface element; and in response to receiving the first input, instantiating a detection instruction control user interface that includes a plurality of selectable detection instruction elements, wherein each distinct selectable detection instruction element corresponds to a distinct subscriber-agnostic threat detection instruction of the set of subscriber-agnostic threat detection instructions.

In one embodiment, a first selectable detection instruction element of the plurality of selectable detection instruction elements corresponds to a first subscriber-agnostic threat detection instruction of the set of subscriber-agnostic threat detection instructions, wherein: the first selectable detection instruction element includes a visual indication that indicates the first subscriber-agnostic threat detection instruction is an active detection instruction that is used by the threat detection and response service when assessing inbound electronic communications associated with the subscribing entity, and a second selectable detection instruction element of the plurality of selectable detection instruction elements corresponds to a second subscriber-agnostic threat detection instruction of the set of subscriber-agnostic threat detection instructions, wherein: the second selectable detection instruction element includes a visual indication that indicates the second subscriber-agnostic threat detection instruction is an inactive detection instruction that is not used by the threat detection and response service when assessing the inbound electronic communications associated with the subscribing entity.

In one embodiment, the computer-implemented method further includes receiving, via the detection instruction control user interface, a second input from the subscribing entity selecting the first selectable detection instruction element, instantiating, while the first selectable detection instruction element is selected, a detection instructions action menu that includes a detection instruction deactivation button, receiving, from the subscribing entity, an additional user input selecting the detection instruction deactivation button while the first selectable detection instruction element is selected, and transitioning the first subscriber-agnostic threat detection instruction from an active detection state to an inactive detection state based on receiving the additional user input, wherein the threat detection and response service does not use the first subscriber-agnostic threat detection instruction when assessing a threat of any future inbound electronic communication while the first subscriber-agnostic threat detection instruction remains in the inactive detection state.

In one embodiment, the computer-implemented method further includes receiving, via the detection instruction control user interface, a second input from the subscribing entity selecting the second selectable detection instruction element, instantiating, while the second selectable detection instruction control object is selected, a detection instructions action menu that includes a detection instruction activation button, receiving, from the subscribing entity, an additional user input selecting the detection instruction activation button while the second selectable detection instruction control object is selected, and transitioning the second subscriber-agnostic threat detection instruction from an inactive detection state to an active detection state based on receiving the additional user input, wherein the threat detection and response service uses the second subscriber-agnostic threat detection instruction when assessing a threat of any future inbound electronic communication while the second subscriber-agnostic threat detection instruction remains in the active detection state.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising detecting, in real-time, an electronic communication transmitted to a message storage repository monitored by a threat detection and response service; retrieving, by the one or more processors, unstructured message data of the electronic communication in response to detecting the transmission of the electronic communication to the message storage repository; transforming, by the one or more processors, the unstructured message data of the electronic communication into a structured message data object interpretable by the threat detection and response service; assessing, by the one or more processors, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository; automatically detecting, by the one or more processors, the electronic communication as malicious based on the assessment of the structured message data object of the electronic communication against the set of subscriber-agnostic threat detection instructions and the set of subscriber-specific threat detection instructions; and executing, in real-time, a threat mitigation action that mitigates a security threat associated with the electronic communication in response to detecting the electronic communication as malicious.

In one embodiment, the structured message data object that corresponds to the electronic communication includes a plurality of parent-level electronic communication data objects, wherein each distinct parent-level electronic communication data object of the plurality of parent-level electronic communication data objects represents a distinct portion of the electronic communication, and each distinct parent-level electronic communication data object of the plurality of parent-level electronic communication data objects stores a plurality of message attribute identifiers and a corresponding set of message attribute values that correspond to the distinct portion of the electronic communication.

In one embodiment, at least one subscriber-agnostic threat detection instruction of the set of subscriber-agnostic threat detection instructions is encoded with a data object traversal path that specifies a distinct sequence of message attribute identifiers configured to extract a target message attribute value from the structured message data object of the electronic communication, the at least one subscriber-agnostic threat detection instruction is further encoded with one or more attribute value conditions to evaluate the target message attribute value extracted from the structured message data object of the electronic communication, and the at least one subscriber-agnostic threat detection instruction is further encoded to detect the electronic communication as malicious in response to identifying the target message attribute value extracted from the structured message data object satisfies the one or more attribute value conditions.

In one embodiment, the at least one subscriber-agnostic threat detection instruction is digitally linked to the threat mitigation action, and the threat mitigation action is automatically executed by the threat detection and response service in response to identifying the at least one subscriber-agnostic threat detection instruction detecting the electronic communication as malicious.

In one embodiment, a computer-program product comprises a non-transitory machine-readable storage medium storing computer instructions that, when executed by one or more processors, perform operations comprising: detecting, in real-time, an electronic communication transmitted to a message storage repository monitored by a threat detection and response service; retrieving, by the one or more processors, unstructured message data of the electronic communication in response to detecting the transmission of the electronic communication to the message storage repository; transforming, by the one or more processors, the unstructured message data of the electronic communication into a structured message data object interpretable by the threat detection and response service, wherein transforming the unstructured message data of the electronic communication into the structured message data object includes: instantiating a message data object based on a message data model schema defined by the threat detection and response service for representing electronic communications of a target type, extracting, from the unstructured message data of the electronic communication, a plurality of message components specified by the message data model schema, and populating, within the message data object, the plurality of message components in accordance with the message data model schema to create the structured message data object corresponding to the electronic communication; assessing, by the one or more processors, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository; automatically detecting, by the one or more processors, the electronic communication as suspicious based on the assessment of the structured message data object of the electronic communication against the set of subscriber-agnostic threat detection instructions and the set of subscriber-specific threat detection instructions; and executing a threat mitigation action that mitigates a security threat associated with the electronic communication in response to detecting the electronic communication as suspicious.

In one embodiment, the computer instructions, when executed by the one or more processors, perform operations further comprising: determining a total number of message open events associated with the electronic communication using the one or more processors that tracks when the subscribing entity opens the electronic communication; determining a total number of message reply events associated with the electronic communication using the one or more processors that tracks when the subscribing entity replies to the electronic communication, and determining a total number of message forward events associated with the electronic communication using the one or more processors that tracks when the subscribing entity forwards the electronic communication.

In one embodiment, executing the threat mitigation action includes automatically routing the electronic communication to an electronic communication review queue, and the computer instructions, when executed by the one or more processors, perform operations further comprising: displaying, using a graphical user interface, the electronic communication review queue, wherein the graphical user interface includes a selectable representation that corresponds to the electronic communication; receiving, via the graphical user interface, an input from a user selecting the selectable representation that corresponds to the electronic communication; and displaying, by the one or more processors, an electronic communication details user interface that corresponds to the electronic communication, wherein the electronic communication details user interface includes a message activity history section that includes: the total number of message open events associated with the electronic communication, the total number of message reply events associated with the electronic communication, and the total number of message forward events associated with the electronic communication.

In one embodiment, the electronic communication details user interface that corresponds to the electronic communication further includes: a screen shot of the electronic communication, and a subset of the set of subscriber-agnostic threat detection instructions or the set of subscriber-specific threat detection instructions that the threat detection and response service used to detect the electronic communication as suspicious.

In one embodiment, a subject threat detection instruction of the set of subscriber-agnostic threat detection instructions or the set of subscriber-specific threat detection instructions is encoded with a computer-executable enrichment function that is configured to perform an enrichment operation, assessing the structured message data object that corresponds to the electronic communication against the set of subscriber-agnostic threat detection instructions and the set of subscriber-specific threat detection instructions further includes assessing the structured message data object against the subject threat detection instruction, and the computer-program product further comprises computer instructions for performing operations including: invoking, during the assessment of the structured message data object against the subject threat detection instruction, the computer-executable enrichment function; transmitting a request to a backend service of the threat detection and response service to perform the enrichment operation in response to invoking the computer-executable enrichment function; and receiving a response from the backend service that includes an enrichment output in response to the backend service performing the enrichment operation, wherein the subject threat detection instruction determines the electronic communication is suspicious based at least in part on the enrichment output.

In one embodiment, the computer-executable enrichment function corresponds to a message screenshot enrichment function, the message screenshot enrichment function captures a message screenshot of the electronic communication, and the subject threat detection instruction determines the electronic communication is suspicious based on providing the message screenshot as input to an additional enrichment function that detects the message screenshot includes a company logo that corresponds to a brand or an organization historically impersonated in phishing attacks.

In one embodiment, the computer-executable enrichment function corresponds to a message screenshot enrichment function, the message screenshot enrichment function captures a message screenshot of the electronic communication, the subject threat detection instruction further provides the message screenshot as input to an additional enrichment function that performs optical character recognition (OCR) on the message screenshot to identify textual content included in the screenshot, the subject threat detection instruction determines the electronic communication is suspicious based on the textual content including one or more phrases referencing free products, giveaways, or promotional offers.

In one embodiment, the structured message data object includes a base64 encoded value, the computer-executable enrichment function corresponds to a base64 scanning enrichment function, the base64 scanning enrichment function is invoked in response to providing the base64 encoded value of the structured message data object as input to the base64 scanning enrichment function, the base64 scanning enrichment function outputs a decoded value that corresponds to the base64 encoded value, and the subject threat detection instruction determines the electronic communication is suspicious based on the decoded value satisfying one or more threat detection conditions of the subject threat detection instruction.

In one embodiment, the structured message data object includes a file attachment, the computer-executable enrichment function corresponds to a file screenshot enrichment function, the file screenshot enrichment function captures a screenshot of one or more pieces of content included within the file attachment, and the subject threat detection instruction determines the electronic communication is suspicious based on providing the screenshot as input to an additional enrichment function that detects the screenshot includes a company logo that corresponds to a brand or an organization historically impersonated in phishing attacks.

In one embodiment, the structured message data object includes a hyperlink, the computer-executable enrichment function corresponds to a machine learning-based link analysis enrichment function, the machine learning-based link analysis enrichment function is invoked in response to providing the hyperlink of the structured message data object as input to the machine learning-based link analysis enrichment function, and in response to invoking the machine learning-based link analysis enrichment function, the machine learning-based link analysis enrichment function: navigates to a destination webpage that corresponds to the hyperlink, captures a screenshot of the destination webpage, and executes one or more machine learning-based object detection models to determine if the screenshot includes one or more objects of a predetermined object type, and outputs a classification label indicating the hyperlink is suspicious based on the screenshot having at least one object of the predetermined object type, wherein the subject threat detection instruction determines the electronic communication is suspicious based on the classification label outputted by the machine learning-based link analysis enrichment function satisfying one or more threat detection conditions of the subject threat detection instruction.

In one embodiment, the structured message data object includes a file attachment, the computer-executable enrichment function corresponds to a machine learning-based logo detection enrichment function, the machine learning-based logo detection enrichment function is invoked in response to providing the file attachment of the structured message data object as input to the machine learning-based logo detection enrichment function, and in response to invoking the machine learning-based logo detection enrichment function, the machine learning-based logo detection enrichment function: detects, using a machine learning-based object detection model, an occurrence of a subject logo within the file attachment, generates, using a Siamese neural network, a numerical vector representation of the subject logo, assesses the numerical vector representation of the subject logo against a plurality of reference numerical vector representations that correspond to a predetermined set of company logos, and determines the subject logo corresponds to a subject company logo based on the assessment, wherein the subject threat detection instruction determines the electronic communication is suspicious based on the machine learning-based logo detection enrichment function determining the subject logo corresponds to the subject company logo.

In one embodiment, the structured message data object includes a file attachment with a macro, the computer-executable enrichment function corresponds to a machine learning-based macro classification enrichment function, the machine learning-based macro classification enrichment function is invoked in response to providing the file attachment with the macro as input to the machine learning-based macro classification enrichment function, and in response to invoking the machine learning-based macro classification enrichment function, the machine learning-based macro classification enrichment function: assesses the macro using a machine learning model, and outputs a classification label indicating the macro is malicious based on the assessment, wherein the subject threat detection instruction determines the electronic communication is suspicious based on the classification label outputted by the machine learning-based macro classification enrichment function satisfying one or more threat detection conditions of the subject threat detection instruction.

BRIEF DESCRIPTION OF THE FIGURES

FIG. 2 illustrates an example method 200 in accordance with one or more embodiments of the present application;

1. SYSTEM FOR REAL-TIME DETECTION AND MITIGATION OF MALICIOUS ELECTRONIC COMMUNICATIONS

Figure 1:
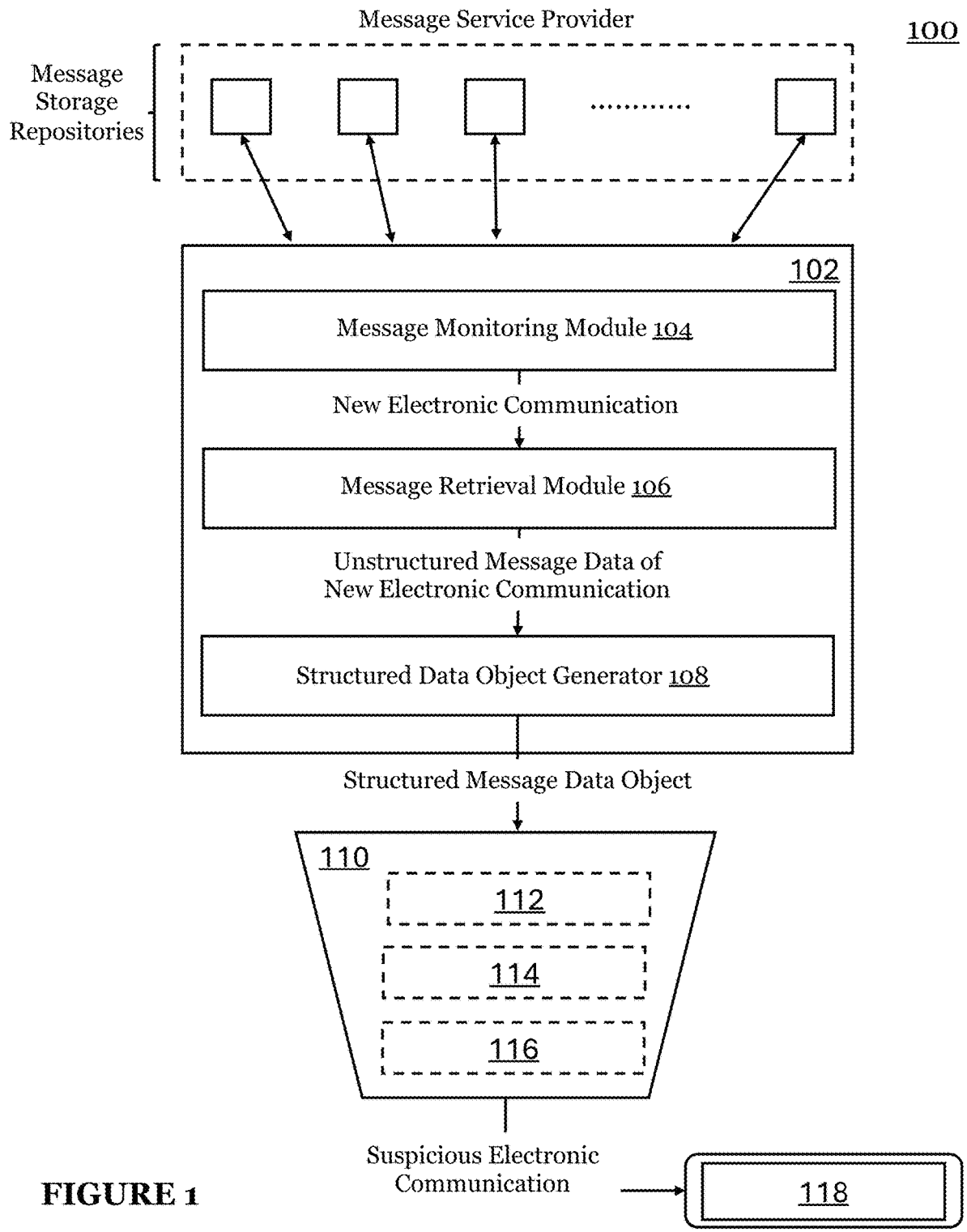
FIG. 1 illustrates a schematic representation of a system 100 in accordance with one or more embodiments of the present application.

As shown in FIG. 1, a system 100 for implementing remote detection and mitigation of malicious electronic communications may include a message detection and transformation module 102 that includes a message monitoring module 104, a message retrieval module 106, and a structured data object generator 108. The system 100 may further include a message threat assessment module 110 that includes one or more detection layers, such as a first detection layer 112, a second detection layer 114, and a third detection layer 116. The system 100 may further include a message threat mitigation module 118.

The system 100 may sometimes be referred to herein as a message threat detection and response service, a threat detection and response service, or the like. The message threat detection and response service, in one or more embodiments, may be implemented by a network of distributed computers.

The system 100 may enable real-time message detection and intelligent threat response for mitigating detected malicious electronic communications. It shall be noted that "real-time" or "near real-time" as generally used herein may refer to generating an output or performing an action within strict time constraints. For example, in one or more embodiments, real-time may be understood to be instantaneous, on the order of milliseconds, or on the order of minutes. Of course, depending on the particular temporal nature of the system in which an embodiment is implemented, other appropriate timescales may be considered acceptable for real-time or near real-time processing.

1.1 Message Detection and Transformation Module

The message detection and transformation module 102, sometimes referred to herein as the "message detection and transformation engine" may be operably configured to monitor one or more message storage repositories of one or more subscribing entities for new electronic communications.

The message monitoring module 104 of the message detection and transformation module 102 may be operably configured to detect message delivery events that occur at the one or more message storage repositories. A message delivery event, in some embodiments, may indicate that a new electronic communication has been electronically delivered or transmitted to one of the one or more message storage repositories that the system 100 is actively monitoring. The message monitoring module 104 may detect such message delivery events using any suitable programmatic mechanism.

Additionally, after detecting that a new electronic communication was delivered or transmitted to a monitored message storage repository, message retrieval module 106 of the message detection and transformation module 102 may function to retrieve unstructured message data (e.g., raw text data, plain text data, etc.) corresponding to the new electronic communication. The message retrieval module 106 may function to retrieve the unstructured message data corresponding to the new electronic communication by ingesting live message flows from the respective messaging service provider using an internet message access protocol (IMAP), calling an application programming interface (API) provided by the respective messaging service provider, or any other suitable programmatic communication mechanism.

Additionally, after obtaining the unstructured message data that corresponds to the new electronic communication, the structured data object generator 108 of the message detection and transformation module 102 may function to automatically generate, in real-time or near real-time, a structured message data object based on the unstructured message data that corresponds to the new electronic communication. The structured data object generator 108 may function to instantiate a message data object based on a predefined message data model schema, extract a plurality of message components from the unstructured message data in accordance with the predefined message data model schema, and populate the message data object with the extracted message components to create a structured, machine-readable representation of the new electronic communication that is suitable for automated message assessment and threat detection.

1.2 Message Threat Assessment Module

The message threat assessment module 110, sometimes referred to herein as the "message threat assessment engine" may be operably configured to automatically evaluate, in real-time or near real-time, the structured message data object outputted by the message detection and transformation module 102 to detect whether the new electronic communication or the representation thereof is suspicious or malicious.

The message threat assessment module 110 may automatically assess or evaluate the structured message data object corresponding to the new electronic communication against one or more message detection layers. Each message detection layer may be configured to assess the structured message data object against a distinct corpus of threat detection instructions (e.g., message threat detection instructions or the like). For instance, the first detection layer 112 may be configured to automatically assess the structured message data object that represents the new electronic communication against a set of subscriber-agnostic threat detection instructions (e.g., heuristics, rules, or the like), the second detection layer 114 may be configured to automatically assess the structured message data object that represents the new electronic communication against a set of subscriber-specific threat detection instructions (e.g., heuristics, rules, or the like), and the third detection layer 116 may be configured to automatically assess the structured message data object that represents the new electronic communication against a set of third-party threat detection instructions. That is, the message threat assessment module 110 may function to concurrently or sequentially evaluate the structured message data object against global detection logic, subscriber-defined detection logic, and externally sourced detection logic to determine whether the new electronic communication exhibits characteristics indicative of anomalous, suspicious, or malicious behavior.

Accordingly, in one or more embodiments, the message threat assessment module 110 may detect that the new electronic communication is suspicious or malicious when the structured message data object representing the new electronic communication satisfies one or more logical conditions, heuristic expressions, or detection rules defined within at least one of the threat detection instruction sets used by the message threat assessment module 110.

Accessing Global or User Lists

In some embodiments, the system 100 implementing the message threat assessment module 110 may function to reference one or more structured data lists from within the MQL. In such embodiments, the structured data lists may include global lists managed by the threat detection and response service provider, as well as organization-specific lists configured by administrators of the subscribing entity. Each structured data list may include data values that correspond to email attributes or other contextual identifiers, including but not limited to sender email addresses, email domains, Internet Protocol (IP) addresses, user identifiers, department codes, or organizational roles.

Additionally, or alternatively, an MQL interpreter or the message threat assessment module 110 may be configured to access the structured data lists during evaluation of threat detection instructions. A structured message data object may be assessed against a threat detection instruction that includes a logical expression or pointer referencing a structured data list. For example, a threat detection instruction may include a logical expression that determines whether a sender attribute extracted from a structured message data object is present within a structured data list corresponding to known internal users or high-value personnel accounts. In one or more embodiments, the threat detection and response service may retrieve the structured data list from a configuration store or list management service and may incorporate the data from the structured data list into the evaluation logic applied by the message threat assessment module 110.

In some embodiments, the system 100 may further include a list management interface through which an administrator of the subscribing entity may define, update, or delete structured data lists. The list management interface may expose an API or a GUI through which structured data values may be specified. The MQL interpreter may dynamically retrieve or cache the structured data lists to support real-time rule evaluation without requiring manual rule redefinition. By enabling access to structured data lists from within the MQL, the system 100 may support context-aware threat detection logic that reflects policies or conditions specific to the subscribing entity.

Historical Context

Additionally, or alternatively, the threat detection and response service implementing the message threat assessment module 110 or the like may automatically maintain one or more historical data stores that record prior message attributes and classification results specific to a subscribing entity. The historical data may include records indicating whether prior messages associated with particular senders, domains, subjects, or payload characteristics were previously classified as malicious, suspicious, or benign. The historical data may further include timestamps of prior message detections, historical threat scores, or metadata associated with user actions taken in response to prior messages.

In some embodiments, the threat detection and response service may detect anomalous behavior by comparing attributes of a current electronic communication against previously observed behaviors associated with the same sender. For example, the threat detection and response service may determine that a sender typically transmits electronic communications that pass domain-based message authentication, reporting, and conformance (DMARC) checks, and may identify a deviation when a message from the same sender fails DMARC verification. As another example, the threat detection and response service may determine that a sender does not historically transmit electronic communications containing financial intent or payment requests and may flag a current message as suspicious when natural language understanding (NLU) analysis indicates the presence of financial transaction-related language. Such historical profiling may enhance detection of contextually abnormal messages that would otherwise appear benign in isolation.

In some embodiments, the threat detection and response service may detect anomalous behavior by comparing attributes of a current electronic communication against previously observed behaviors associated with the same sender. For example, the threat detection and response service may determine that a sender typically transmits electronic communications that pass domain-based message authentication, reporting, and conformance (DMARC) checks, and may identify a deviation when a message from the same sender fails DMARC verification. As another example, the threat detection and response service may determine that a sender does not historically transmit electronic communications containing financial intent or payment requests and may flag a current message as suspicious when natural language understanding (NLU) analysis indicates the presence of financial transaction-related language. Such historical profiling may enhance detection of contextually abnormal messages that would otherwise appear benign in isolation.

In one or more embodiments, the threat detection and response service may store the historical data in a structured data repository indexed by one or more message attributes. Accordingly, the system 100 may expose the historical data to the MQL interpreter or the message threat assessment module 110 as a queryable input during evaluation of threat detection instructions. A threat detection instruction defined in the MQL may reference the historical data to determine, for example, whether a newly received electronic communication was transmitted from a sender address not previously observed in historical message records, or whether prior communications from the same domain were previously identified as malicious. The system 100 may update the historical data in real time upon processing each new electronic communication, enabling dynamically evolving detection logic based on the behavior of prior message traffic within the organization.

1.3 Threat Mitigation Module

The threat mitigation module 118, sometimes referred to herein as the "message threat mitigation engine" may be operably configured to mitigate a security threat associated with the new electronic communication when the message threat assessment module 110 detects that the new electronic communication is malicious or suspicious.

The threat mitigation module 118 may function to mitigate, in real-time or near real-time, a security threat associated with the new electronic communication in response to the message threat assessment module 110 detecting that the new electronic communication is malicious or suspicious, as described in more detail in method 200.

In one embodiment, the system 100 may include an subsystem (not shown) configured to autonomously generate, refine, and validate threat detection instructions in response to detection gaps identified by the system 100 or feedback received from users or subscribers to the message threat detection and response service. The automated subsystem may be operably coupled to the threat detection and response service and may function as an intelligent artificial intelligence (AI) based agent that monitors for false negatives (FNs), false positives (FPs), and emerging threats not yet covered by existing detection logic.

The automated subsystem may include a proposal engine that receives triggering inputs from multiple sources, including: (i) internal detection engineers manually submitting FN or FP samples, (ii) users submitting samples via user interfaces, (iii) automated feedback mechanisms from the threat assessment pipeline, and (iv) system-initiated triggers derived from behavioral anomalies or public threat intelligence sources. Upon receipt of a trigger, the automated subsystem may propose a candidate detection instruction, e.g., a rule authored in a domain-specific message query language (MQL), tailored to the triggering sample or scenario.

The automated subsystem may then execute a validation and refinement loop, wherein the candidate detection instruction is automatically tested against a corpus of benign and known malicious message data. During each iteration, the automated subsystem may modify rule prompts, logical conditions, or parameter thresholds to minimize false positives while maintaining high recall on malicious samples. The refinement loop may terminate upon reaching a success condition, e.g., zero or minimal FPs, or halt if the system determines the rule cannot meet efficacy constraints within a bounded number of retries.

In one embodiment, the automated subsystem may support multiple modes of deployment including: (i) passive review workflows where generated rules are presented to security personnel for manual approval, (ii) semi-automated workflows where rules are proposed to users for organizational testing, and (iii) fully automated deployments governed by policy-based thresholds. Approved rules are then integrated into the threat detection corpus and propagated to appropriate detection layers (e.g., subscriber-specific or global).

Additionally, the automated subsystem may encode enrichment workflows that leverage backend services, such as machine learning-based logo detection, link screenshot classification, or OCR-based text analysis, to produce detection logic based on high-fidelity signal features. This enables automated rule generation not only from raw email data but also from embedded artifacts such as attachments, hyperlinks, or screenshots. While the enrichment functions described herein may include industry-standard analyses such as optical character recognition, archive extraction, or macro inspection, the integration of these enrichment functions within the syntax and semantics of the message query language distinguishes the disclosed system. The ability to invoke enrichment operations as callable components from within threat detection instructions enables granular, user-defined logic that governs when and how enrichment is performed during message assessment.

Moreover, the enrichment functions described herein are provided as illustrative examples and do not represent an exhaustive enumeration of capabilities. Additional enrichment functions may include domain registration or WHOIS record analysis to assess sender legitimacy, topic modeling or natural language processing to identify the semantic themes of message content, geolocation inference based on IP metadata, or detection of impersonation risk using visual or phonetic similarity metrics. The enrichment framework may be modular and extensible, allowing new functions to be defined, registered, and invoked from within the message query language as callable components.

2. METHOD FOR REAL-TIME DETECTION AND MITIGATION OF MALICIOUS ELECTRONIC COMMUNICATIONS

As shown in FIG. 2, a method 200 for detecting and mitigating malicious electronic communications may include detecting an electronic communication transmitted to a message storage repository S210, retrieving unstructured message data of the electronic communication in response to detecting the transmission of the electronic communication to the message storage repository S220, transforming the unstructured message data of the electronic communication into a structured message data object S230, assessing the structured message data object that corresponds to the electronic communication against a set of subscriber-agnostic threat detection instructions and a set of subscriber-specific threat detection instructions S240, detecting the electronic communication as malicious based on the assessment S250, and executing a threat mitigation action that mitigates a security threat associated with the electronic communication in response to detecting the electronic communication as malicious S260.

2.1 Detecting an Electronic Communication

S210, which includes detecting an electronic communication, may function to detect, in real-time or near real-time, an electronic communication transmitted or delivered to a message storage repository monitored by the threat detection and response service 100. An electronic communication, as generally referred to herein, may be a digital message transmitted over a computer network to one or more target electronic addresses, endpoints, or destinations. It shall be recognized that the phrase "electronic communication" may be interchangeably referred to herein as an "electronic message," a "digital message," a "digital communication," and/or the like.

Figure 3:
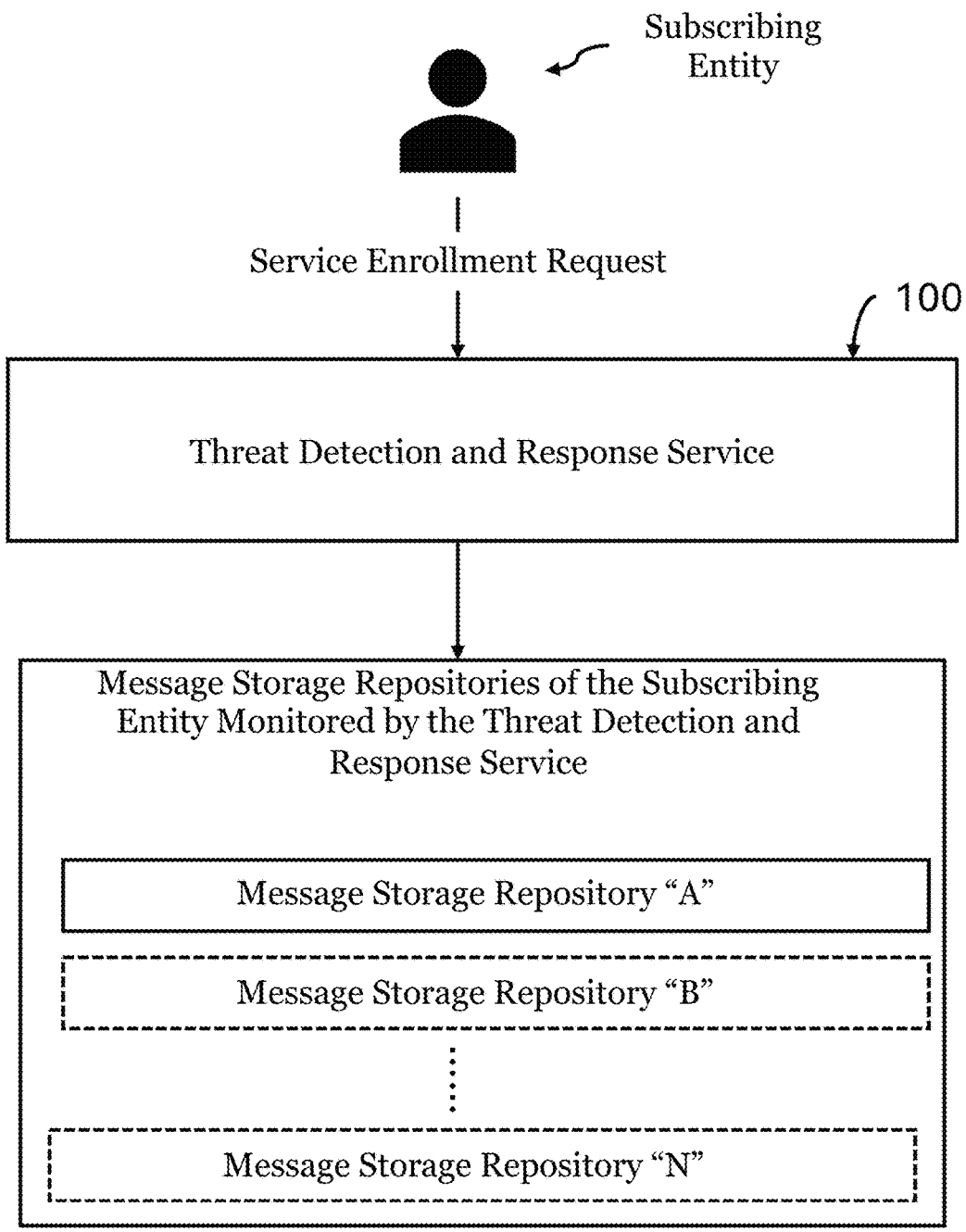
FIG. 3 illustrates an example schematic of receiving a service enrollment request in accordance with one or more embodiments of the present application.

In one or more embodiments, a system or service implementing method 200 may receive a service enrollment request from a subscribing entity that requests the system or service to monitor one or more distinct message storage repositories of the subscribing entity for suspicious or malicious electronic communications (e.g., one (1) message storage repository, five (5) message storage repositories, one hundred (100) message storage repositories, five hundred (500) message storage repositories, ten thousand (10,000) message storage repositories, or any other suitable number of message storage repositories), as shown generally by way of example in FIG. 3. In such an embodiment, in response to receiving the service enrollment request from the subscribing entity, the system or service implementing method 200 may function to commence an automated monitoring of the one or more distinct message storage repositories to detect, in real-time or near real-time, when new electronic communications are transmitted or delivered to the one or more distinct message storage repositories of the subscribing entity. At least one technical benefit of such automated monitoring may enable the system or service implementing method 200 to automatically identify malicious or suspicious electronic communications immediately after delivery to protect the subscribing entity from potential security breaches, data loss, and/or user compromise.

In one or more embodiments, each distinct message storage repository that the subscribing entity requested to be monitored may be used by a distinct end user associated with the subscribing entity. That is, in some embodiments, each message storage repository that the subscribing entity requested to be monitored may correspond to a distinct user account, be accessible by a respective end user corresponding to the distinct user account, and/or be operably configured to receive and store electronic communications addressed to the respective end user or the distinct user account.

In one or more embodiments, after the system or service implementing method 200 receives, from a subscribing entity, a service enrollment request to monitor a subject message storage repository, the system or service implementing method 200 may automatically establish programmatic access to the subject message storage repository. Such programmatic access may enable the system or service to detect, in real-time or near real-time, when an electronic communication is transmitted or delivered to the subject message storage repository. It shall be recognized that, in some embodiments, S210 may automatically establish the programmatic access to the subject message storage repository via an application programming interface (API), internet message access protocol (IMAP), or any other suitable communication mechanism. In some embodiments of the present application, the execution instance may operate in an inline configuration, wherein an electronic communication is evaluated prior to delivery to a recipient message inbox. The inline configuration may be enabled through integration with transport-layer mail flow rules or message routing policies enforced by the message service provider, allowing the threat detection and response service to perform real-time evaluation and mitigation actions prior to message acceptance or delivery.

Figure 4:
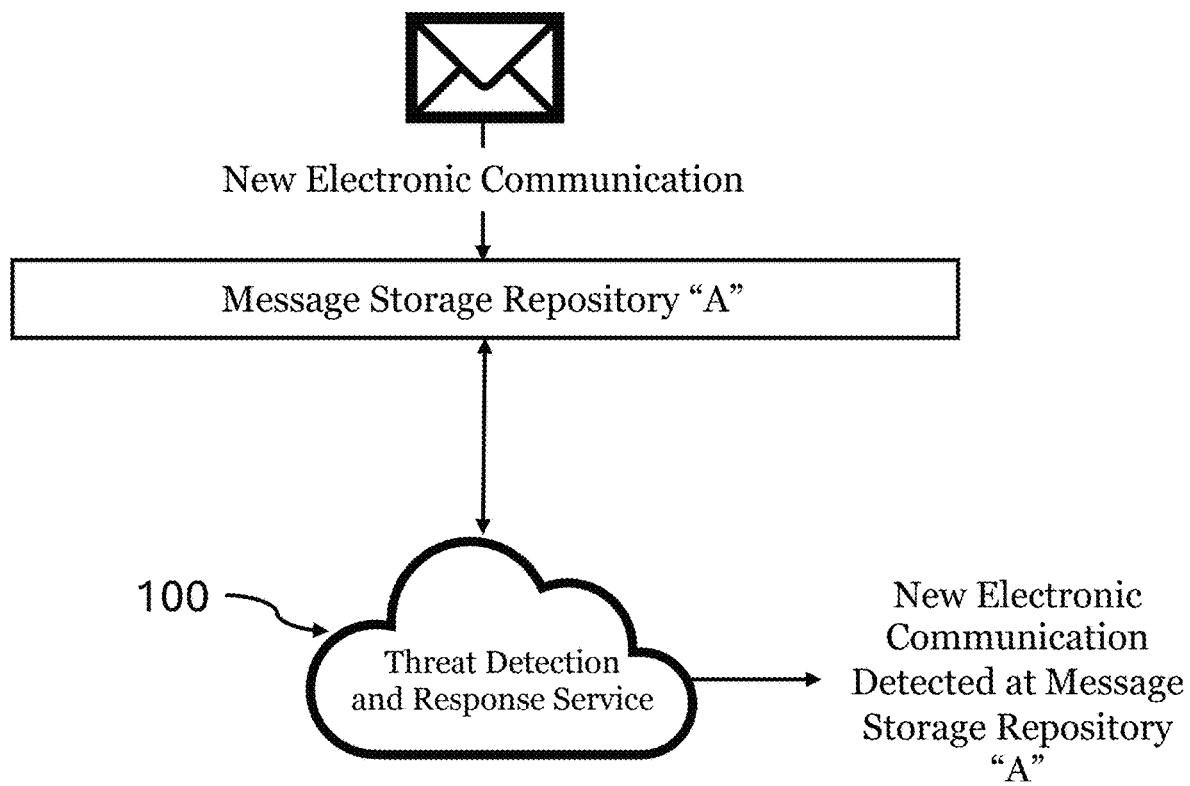
FIG. 4 illustrates an example schematic of detecting a new electronic communication at a monitored message storage repository in accordance with one or more embodiments of the present application.

For instance, in a non-limiting example, the service enrollment request received by the system or service implementing method 200 may include a request, from a user or the like, to perform threat monitoring of a subject electronic mailbox that corresponds to an email account hosted by a first messaging service provider (e.g., Google Workspace®, first electronic mail service, or the like). In such a non-limiting example, S210 may function to automatically establish programmatic access to the email account using an application programming interface provided by the first messaging service provider in response to receiving the service enrollment request. Accordingly, after programmatic access to the email account is established, the system or service implementing method 200 may be operably configured to detect, in real-time or near real-time, when a new electronic communication is delivered to the subject electronic mailbox, as shown generally by way of example in FIG. 4.

In another non-limiting example, the service enrollment request received by the system or service implementing method 200 may include a request, from a user or the like, to perform threat monitoring of a subject electronic mailbox that corresponds to an email account hosted by a second messaging service provider (e.g., Microsoft 365®, second electronic mail service, or the like). In such a non-limiting example, S210 may function to automatically establish programmatic access to the email account using an application programming interface provided by the second messaging service provider in response to receiving the service enrollment request. Accordingly, after programmatic access to the email account is established, the system or service implementing method 200 may be operably configured to detect, in real-time or near real-time, when a new electronic communication is delivered to the subject electronic mailbox.

As described in more detail herein, at least one technical benefit of detecting, in real-time or near real-time, that a new electronic communication (e.g., electronic message, email, or the like) was delivered or transmitted to a message storage repository (e.g., email inbox, etc.) may enable the system or service to automatically assess if the new electronic communication poses a security threat and, if so, automatically initiate one or more threat mitigation actions to mitigate the security threat associated with the new electronic communication.

2.2 Retrieving Unstructured Message Data Associated with the Electronic Communication S220, which includes retrieving unstructured message data, may function to retrieve, by one or more computers, unstructured message data that corresponds to an electronic communication in response to S210 detecting the transmission of the electronic communication to the message storage repository. The unstructured message data corresponding to the electronic communication may include the entire content of the electronic communication as transmitted to the message storage repository in an unstructured data state. It shall be recognized that the phrase "unstructured message data" may be interchangeably referred to herein as "unstructured electronic communication data," "raw text data," a "raw message representation," and/or the like.

In one or more embodiments, in response to detecting that a subject electronic communication was transmitted or delivered to a subject message storage repository, S220 may function to automatically retrieve, from the subject message storage repository, an unstructured message representation of the subject electronic communication. The unstructured message representation, in such an embodiment, may include the original content of the subject electronic communication in a raw text format (e.g., EML file, raw text file, or any other suitable plain text data representation).

It shall be recognized that, in one or more embodiments, the unstructured message representation of the subject electronic communication may include, but should not be limited to, message headers (e.g., sender data, recipient data, message subject data, timestamp data, etc.), message body content (e.g., the text of the message body associated with the subject electronic communication), attachment data (e.g., the one or more files included in the subject electronic communication, such as documents, images, executables, or any other suitable type of digital content), embedded hyperlinks contained within the message body of the subject electronic communication, and any other piece of metadata associated with the subject electronic communication.

In one or more embodiments, the system or service implementing method 200 may be operably configured to retrieve, in real-time or near real-time, the unstructured message representation of the subject electronic communication by automatically creating and transmitting one or more application programming interface (API) calls to an API endpoint provided by the messaging service provider hosting the subject message storage repository. In other words, in some embodiments, the threat detection and response service 100 may automatically create, using one or more computers, an API call that includes a request to obtain a representation of the subject electronic communication in a plain text format and, in turn, transmit, over a computer network, the created API call to the API endpoint provided by the messaging service provider. Accordingly, in such an embodiment, in response to transmitting the API call to the API endpoint provided by the messaging service provider, the threat detection and response service 100 may receive, as a response, unstructured message data that corresponds to the subject electronic communication.

In a non-limiting example, in response to detecting that a new electronic communication was delivered or transmitted to an electronic mailbox hosted by a first messaging service provider (e.g., Google Workspace®, first electronic mail service, or the like), S220 may function to create and transmit, in real-time or near real-time, an API call that includes a request to obtain a representation of the new electronic communication in a plain or raw text format. Accordingly, in such a non-limiting example, S220 may receive, in real time or near real-time, a response from the first messaging service provider that includes the representation of the new electronic communication in the plain or raw text format. It shall be recognized that, in such a non-limiting example, the representation of the new electronic communication may be formatted in accordance with an EML file format specification (e.g., RFC 822-compliant).

In another non-limiting example, in response to detecting that a new electronic communication was delivered or transmitted to an electronic mailbox hosted by a second messaging service provider (e.g., Microsoft 365®, second electronic mail service, or the like), S220 may function to create and transmit, in real-time or near real-time, an API call that includes a request to obtain a representation of the new electronic communication in a plain or raw text format. Accordingly, in such a non-limiting example, S220 may receive, in real time or near real-time, a response from the second messaging service provider that includes the representation of the new electronic communication in the plain or raw text format. It shall be recognized that, in such a non-limiting example, the representation of the new electronic communication may be formatted in accordance with an EML file format specification (e.g., RFC 822-compliant).

At least one technical benefit of retrieving unstructured message data that corresponds to a target electronic communication may enable a transformation of the unstructured message data into a structured message data object that is usable by the threat detection and response service 100 for downstream message processing, threat assessment, and threat response.

2.3 Generating a Structured Message Data Object

S230, which includes generating a structured message data object, may function to automatically generate a structured message data object that corresponds to an electronic communication obtained by S210 using the unstructured message data retrieved by S220 for the same electronic communication. A structured message data object, as generally referred to herein, may be a representation of a subject electronic communication in a machine-readable format (e.g., JavaScript Object Notation (JSON) or the like) that provides a consistent structure for enabling automated message threat assessment and threat response in a messaging service provider-agnostic manner. It shall be recognized that the phrase "structured message data object" may be interchangeably referred to herein as a "message data object," "message data model," and/or the like.

Figure 5A:
FIGS. 5-5C illustrate an example of generating a structured message data object in accordance with one or more embodiments of the present application.
Figure 5B:
Figure 5C:

In one or more embodiments, in response to S220 retrieving unstructured message data that corresponds to a subject electronic communication, S230 may function to automatically transform, using one or more computers, the unstructured message data of the subject electronic communication into a structured message data object that is interpretable by the threat detection and response service 100, as shown generally by way of example in FIGS. 5-5C. The structured message data object, in such an embodiment, may represent the subject electronic communication in a messaging service provider-agnostic format to eliminate the variability in message structure and formatting across different messaging service providers.

In one or more embodiments, transforming the unstructured message data of the subject electronic communication into the structured message data object may include instantiating a message data object based on a message data model schema, extracting a plurality of message components specified by the message data model schema from the unstructured message data of the subject electronic communication, and populating, within the instantiated message data object, the plurality of message components in accordance with the message data model schema to create the structured message data object corresponding to the subject electronic communication.

Instantiating a Message Data Object

In one or more embodiments, S230 may function to instantiate, via one or more computers, a message data object in response to obtaining the unstructured message data that corresponds to the subject electronic communication. The message data object, in such an embodiment, may be instantiated based on a message data model schema defined or provided by the threat detection and response service 100 for representing electronic communications of a target type (e.g., emails). The message data model schema may define a set of message data fields, data structures, and/or data types that specify how various message components of any inbound electronic communication of the target type is to be extracted, included, and/or represented within the message data object.

In some embodiments of the present application, the Message Data Model may further incorporate specialized data transformations that extract or resolve useful contextual elements from an electronic communication. The specialized data transformations may include logic for identifying a current message thread from a conversation history, decoding obfuscated or rewritten URLs to determine their original destination, or deriving canonical representations of sender identities. These transformations may enhance the semantic richness of the structured message data object and improve the accuracy and contextual relevance of downstream threat detection logic.

Accordingly, in one or more embodiments, in response to retrieving the unstructured message data corresponding to the subject electronic communication, S230 may function to instantiate, in real-time or near real-time, the message data object. The message data object, in such an embodiment, may include a plurality of parent-level electronic communication data objects. A parent-level electronic communication data object, as generally used herein, may refer to a top-level data container within the message data object that is configured to represent a distinct portion or part of the subject electronic communication and to encapsulate a corresponding set of message attributes (e.g., data fields, key-value pairs, etc.) associated with that distinct portion or part of the subject electronic communication. In other words, in some embodiments, each parent-level electronic communication data object may be configured to represent a distinct portion of the subject electronic communication and/or store a corresponding set of message attribute values or message components extracted from the unstructured message data of the subject electronic communication that are associated with that distinct portion.

For instance, in a non-limiting example, a first parent-level electronic communication data object of the instantiated message data object may be configured to represent at least one target attachment file included within or associated with the subject electronic communication, which may also be referred to herein as an attachment parent-level data object or the like. In such a non-limiting example, the attachment parent-level data object may be instantiated based on the message data model schema defined by the system or service implementing method 200. Upon instantiation, the attachment parent-level data object of the message data object may include a plurality of message attachment attribute identifiers (e.g., data fields, key-value pairs, etc.), each configured to represent a specific attribute, property, or characteristic of the at least one target attachment file included within the subject electronic communication. It shall be recognized that, at the time of instantiation, the attachment parent-level data object may include the plurality of message attachment attribute identifiers without any corresponding message attribute values of the subject electronic communication (e.g., extracted message components).

In one or more embodiments, the plurality of message attachment attribute identifiers (e.g., message attachment attribute data fields) included within the attachment parent-level data object may include a file name identifier (e.g., file name data field) configured to receive a string value representing the file name of the at least one target attachment file, a file type identifier (e.g., file type data field) configured to receive a string value indicating the file type of the at least one target attachment file (e.g., "pdf," "jpg," "zip," "docx," "xlsx," or the like), a md5 identifier (e.g., md5 data field) configured to receive a string value representing a first hash signature of the raw contents of the at least one target attachment file that was generated using a message-digest algorithm 5 (MD5 algorithm), a sha1 identifier (e.g., sha1 data field) configured to receive a string value representing a second hash signature of the raw contents of the at least one target attachment file that was generated using a secure hash algorithm 1 (SHA-1 algorithm), a sha256 identifier (e.g., sha256 data field) configured to receive a string value representing a third hash signature of the raw contents of the at least one target attachment file that was generated using a secure hash algorithm 256 (SHA-256 algorithm), a file size identifier (e.g., file size data field) configured to receive a numeric value representing the file size of the at least one target attachment file in bytes, and a raw identifier (e.g., raw data field) configured to receive a string value representing the raw contents of the at least one target attachment file in a base64-encoded format. As described in more detail herein, each of the message attribute identifiers or data fields may initially be unpopulated at the time of instantiation of the message data object, however, may later be assigned corresponding values as the system or service implementing method 200 extracts, parses, or processes the unstructured message data of the subject electronic communication.

Additionally, or alternatively, in such a non-limiting example, a second parent-level electronic communication data object of the instantiated message data object may be configured to represent the message body of the subject electronic communication, which may also be referred to herein as a message body parent-level data object or the like. In such an embodiment, the message body parent-level data object may be instantiated based on the message data model schema defined by the system or service implementing method 200. Upon instantiation, the message body parent-level data object of the message data object may include a plurality of message body attribute identifiers (e.g., data fields, key-value pairs, etc.), each configured to represent a specific attribute, property, or characteristic of the message body included within the subject electronic communication. It shall be recognized that, at the time of instantiation, the message body parent-level data object may include the plurality of message body attribute identifiers without any corresponding message attribute values of the subject electronic communication (e.g., extracted message components).

In one or more embodiments, the plurality of message body attribute identifiers (e.g., message body attribute data fields) included within the message body parent-level data object may include a current message thread identifier (e.g., current message thread data field) configured to receive one or more text strings that include the textual context of the message body of the subject electronic communication (e.g., current text thread, etc.), an internet protocol address identifier (e.g., internet protocol address data field) configured to receive a string value of an internet protocol address when the message body includes a reference to the internet protocol address, one or more hyperlink identifiers (e.g., one or more hyperlink data fields) configured to receive a first value that represents a respective uniform resource locator (URL) as visually displayed within the message body of the subject electronic communication (e.g., https://accounts.acme.com), a second value representing the actual destination URL (e.g., http://malicious-site.biz/login) that a user is navigated to when the respective URL (e.g., https://accounts.acme.com) is activated or clicked on by the user, and an associated URL assessment value configured to receive an indication of whether or not a mismatch exists between the visually displayed URL (e.g., the first value) and the actual destination URL (e.g., the second value).

Additionally, or alternatively, in such a non-limiting example, a third parent-level electronic communication data object of the instantiated message data object may be configured to represent the message header associated with the subject electronic communication, which may be referred to herein as a message header parent-level data object. In such an embodiment, the message header parent-level data object may be instantiated based on the message data model schema defined by the system or service implementing method 200. Upon instantiation, the message header parent-level data object of the message data object may include a plurality of message header attribute identifiers (e.g., data fields, key-value pairs, etc.), each configured to represent a specific attribute, property, or characteristic of the message header that corresponds to the subject electronic communication. It shall be recognized that, at the time of instantiation, the message header parent-level data object may include the plurality of message header attribute identifiers without any corresponding message attribute values of the subject electronic communication (e.g., extracted message components).

In one or more embodiments, the plurality of message header attribute identifiers (e.g., message header attribute data fields) included within the message header parent-level data object may include a recipient email address identifier (e.g., recipient email address data field) configured to receive a string of text that includes the full recipient email address (e.g., user@company.com) to which the subject electronic communication was addressed or delivered, a username identifier (e.g., username data field) configured to receive the portion of the recipient email address that appears before the @ symbol (e.g., user), and a domain identifier (e.g., domain data field) configured to receive the portion of the recipient email address that appears after the @ symbol (e.g., company.com).

Additionally, or alternatively, in some embodiments, the message header parent-level data object may further include a sender email address identifier (e.g., sender email address data field) configured to receive a string of text that includes the full sender email address (e.g., user1@acme.com) from which the subject electronic communication was sent or originated, a username identifier (e.g., username data field) configured to receive the portion of the sender email address that appears before the @ symbol (e.g., user1), and a domain identifier (e.g., domain data field) configured to receive the portion of the sender email address that appears after the @ symbol (e.g., acme.com).

Additionally, or alternatively, in such a non-limiting example, a fourth parent-level electronic communication data object of the instantiated message data object may be configured to represent the electronic mailbox (e.g., message storage repository or the like) to which the subject electronic communication was delivered or transmitted, which may also be referred to herein as a mailbox parent-level data object. In such an embodiment, the mailbox parent-level data object may be instantiated based on the message data model schema defined by the system or service implementing method 200. Upon instantiation, the mailbox parent-level data object of the message data object may include a plurality of mailbox attribute identifiers (e.g., data fields, key-value pairs, etc.), each configured to represent a specific attribute, property, or characteristic of the electronic mailbox (e.g., message storage repository) to which the subject electronic communication was delivered or transmitted. It shall be recognized that, at the time of instantiation, the mailbox parent-level data object may include the plurality of mailbox attribute identifiers without any corresponding message attribute values of the subject electronic communication (e.g., extracted message components).

In one or more embodiments, the plurality of mailbox attribute identifiers (e.g., mailbox attribute data fields) included within the mailbox parent-level data object may include a full email address identifier (e.g., email address data field) configured to receive a string of text representing the full email address that corresponds to the electronic mailbox (e.g., message storage repository) in which the subject electronic communication was found (e.g., user@company.com), a first name identifier (e.g., first name data field) configured to receive a string value representing the given name (e.g., John) of the owner of the electronic mailbox (e.g., message storage repository), and a last name identifier (e.g., last name data field) configured to receive a string value representing the surname (e.g., Doe) of the owner of the electronic mailbox.

Additionally, or alternatively, in such a non-limiting example, a fifth parent-level electronic communication data object of the instantiated message data object may be configured to represent intended recipients of the subject electronic communication, which may be referred to herein as a recipients parent-level data object. In such an embodiment, the recipients parent-level data object may be instantiated based on the message data model schema defined by the system or service implementing method 200. Upon instantiation, the recipients parent-level data object of the message data object may include a plurality of message recipients attribute identifiers (e.g., data fields, key-value pairs, etc.), each configured to represent a specific attribute, property, or characteristic of the intended recipients of the subject electronic communication. It shall be recognized that, at the time of instantiation, the recipients parent-level data object may include the plurality of message recipients attribute identifiers without any corresponding message attribute values of the subject electronic communication (e.g., extracted message components).

In one or more embodiments, the plurality of message recipients attribute identifiers (e.g., message recipients data fields) included within the recipients parent-level data object may include a primary recipient identifier (e.g., primary recipient data field) configured to receive one or more email addresses that correspond to the individuals or entities designated as the main intended recipients of the subject electronic communication (e.g., the one or more email addresses in the "To" message field of the subject electronic communication), a carbon copy (CC) recipient identifier (e.g., carbon copy recipient data field) configured to receive one or more email addresses corresponding to individuals or entities copied on the subject electronic communication for visibility purposes (e.g., the one or more email addresses in the "CC" message field of the subject electronic communication), and a blind carbon copy (BCC) recipient identifier (e.g., blind carbon copy recipient data field) configured to receive one or more email addresses corresponding to individuals or entities that were intended to receive the subject electronic communication without being visible to other recipients (e.g., the one or more email addresses in the "BCC" message field of the subject electronic communication).

Additionally, or alternatively, in such a non-limiting example, a sixth parent-level electronic communication data object of the instantiated message data object may be configured to represent the sender of the subject electronic communication from which the subject electronic communication originated (e.g., the sender who sent the subject electronic communication), which may be referred to herein as a sender parent-level data object. In such an embodiment, the sender parent-level data object may be instantiated based on the message data model schema defined by the system or service implementing method 200. Upon instantiation, the sender parent-level data object of the message data object may include a plurality of message sender attribute identifiers (e.g., data fields, key-value pairs, etc.), each configured to represent a specific attribute, property, or characteristic of the sender of the subject electronic communication. It shall be recognized that, at the time of instantiation, the sender parent-level data object may include the plurality of message sender attribute identifiers without any corresponding message attribute values of the subject electronic communication (e.g., extracted message components).

In one or more embodiments, the plurality of message sender attribute identifiers (e.g., message sender data fields) included within the sender parent-level data object may include a sender display name identifier (e.g., sender display name data field) configured to receive a string value representing the display name associated with the sender of the subject electronic communication (e.g., Acme Corp, John Doe, etc.), a sender email address identifier (e.g., sender email address data field) configured to receive a string value representing the full sender email address (e.g., noreply@acme.com) that sent the subject electronic communication, a sender username identifier (e.g., sender username data field) configured to receive the portion of the sender email address that appears before the @ symbol (e.g., noreply), and a sender domain identifier (e.g., sender domain data field) configured to receive the portion of the sender email address that appears after the @ symbol (e.g., acme.com).

Additionally, or alternatively, in such a non-limiting example, a seventh parent-level electronic communication data object of the instantiated message data object may be configured to represent the message subject of the subject electronic communication, which may be referred to herein as a message subject parent-level data object. In such an embodiment, the message subject parent-level data object may be instantiated based on the message data model schema defined by the system or service implementing method 200. Upon instantiation, the message subject parent-level data object of the message data object may include at least one message subject attribute identifier (e.g., data field, key-value pair, etc.) configured to represent a specific attribute, property, or characteristic of the message subject (e.g., email subject) of the subject electronic communication. It shall be recognized that, at the time of instantiation, the message subject parent-level data object may include the at least one message subject attribute identifier without a corresponding message attribute value of the subject electronic communication (e.g., extracted message component).

In one or more embodiments, the at least one message subject attribute identifier (e.g., message subject data field) included within the message subject parent-level data object may be configured to receive a string value representing the subject line of the subject electronic communication.

Additionally, or alternatively, in such a non-limiting example, an eighth parent-level electronic communication data object of the instantiated message data object may be configured to represent the directional context of the subject electronic communication, which may be referred to herein as a directional metadata parent-level data object. In such an embodiment, the directional metadata parent-level data object may be instantiated based on the message data model schema defined by the system or service implementing method 200. Upon instantiation, the directional metadata parent-level data object of the message data object may include a plurality of message direction attribute identifiers (e.g., data fields, key-value pairs, etc.) configured to represent a specific attribute, property, or characteristic that indicates the relative direction of the subject electronic communication with respect to the subscribing entity that received the subject electronic communication. It shall be recognized that, at the time of instantiation, the directional metadata parent-level data object may include the plurality of message direction attribute identifiers without a corresponding direction attribute value (e.g., null data fields).

In one or more embodiments, the plurality of message direction attribute identifiers (e.g., message direction data fields) included within the directional metadata parent-level data object may include a message inbound direction identifier (e.g., message inbound direction data field) configured to receive a value indicating whether the subject electronic communication was transmitted from a sender external to the subscribing entity and delivered to at least one user account controlled by the subscribing entity, a message internal direction identifier (e.g., message internal direction data field) configured to receive a value indicating whether the subject electronic communication was sent from a user account controlled by the subscribing entity to one or more additional user accounts also controlled by the subscribing entity, and a message outbound direction identifier (e.g., message outbound direction data field) configured to receive a value indicating whether the subject electronic communication was sent from a user account controlled by the subscribing entity to one or more recipients external to the subscribing entity.

It shall be recognized that the message data model may include additional, fewer, or different parent-level electronic communication data objects without departing from the scope of the disclosure. It shall be further recognized the plurality of message attribute identifiers (e.g., data fields, key-value pairs, etc.) within each respective parent-level electronic communication data object may include additional, different, or fewer message attribute identifiers (e.g., data fields, key-value pairs, etc.) without departing from the scope of the disclosure.

Extracting Message Components from the Unstructured Message Data

In one or more embodiments, S230 may function to extract or derive, from the unstructured message data of the subject electronic communication, a plurality of message components specified by the message data model schema in response to instantiating the message data object. In other words, S230 may function to extract or derive a corresponding message component (e.g., message attribute value) from the unstructured message data (of the subject electronic communication) for each distinct message attribute identifier or each distinct message attribute data field included within the instantiated message data object.

It shall be recognized that, in some embodiments, S230 may extract or derive the corresponding message component (e.g., message attribute value) associated with each distinct message attribute identifier (or each distinct message attribute data field) included within the instantiated message data object using any suitable attribute extraction or derivation module, engine, or computer-based routine.

For instance, in a non-limiting example, S230 may function to extract, from the unstructured message data corresponding to the subject electronic communication, a first message component or value that corresponds to the file name identifier (e.g., file name data field) of the attachment parent-level data object. Additionally, or alternatively, in such a non-limiting example, S230 may function to extract, from the unstructured message data corresponding to the subject electronic communication, a second message component or value that corresponds to the file type identifier (e.g., file type data field) of the attachment parent-level data object. Additionally, or alternatively, in such a non-limiting example, S230 may function to extract, from the unstructured message data corresponding to the subject electronic communication, a third message component or value that corresponds to the file size identifier (e.g., file size data field) of the attachment parent-level data object. Additionally, or alternatively, in such a non-limiting example, S230 may function to derive (e.g., generate or the like) a first hash signature for a subject attachment file that corresponds to the md5 identifier (e.g., md5 data field) of the attachment parent-level data object using the MD5 algorithm. Additionally, or alternatively, in such a non-limiting example, S230 may function to derive (e.g., generate or the like) a second hash signature for the subject attachment file that corresponds to the sha1 identifier (e.g., sha1 data field) of the attachment parent-level data object using the secure hash algorithm 1 (SHA-1 algorithm). Additionally, or alternatively, in such a non-limiting example, S230 may function to derive (e.g., generate or the like) a third hash signature for the subject attachment file that corresponds to the sha256 identifier (e.g., sha256 data field) using the secure hash algorithm 256 (SHA-256 algorithm).

Additionally, or alternatively, in such a non-limiting example, S230 may function to extract, from the unstructured message data corresponding to the subject electronic communication, a fourth message component or value that corresponds to the current message thread identifier (e.g., current message thread data field) of the message body parent-level data object. Additionally, or alternatively, in such a non-limiting example, S230 may function to extract, from the unstructured message data of the subject electronic communication, a fifth message component or value that corresponds to the internet protocol address identifier (e.g., internet protocol address data field) of the message body parent-level data object. Additionally, or alternatively, in such a non-limiting example, S230 may function to extract, from the unstructured message data of the subject electronic communication, one or more additional message components or values that corresponds to the one or more hyperlink identifiers (e.g., one or more hyperlink data fields) of the message body parent-level data object.

It shall be recognized that, in one or more embodiments, S230 may additionally function to extract or derive additional message components or values that correspond to the message attribute identifiers or data fields of other parent-level electronic communication data objects (e.g., the message header parent-level data object, the mailbox parent-level data object, the recipients parent-level data object, the sender parent-level data object, the message subject parent-level data object, the directional metadata parent-level data object, etc.) in analogous ways.

It shall be further recognized that, in some embodiments, S230 may extract a corresponding message component (e.g., message attribute value) from the unstructured message data of the subject electronic communication for only a subset of message attribute identifiers or message attribute data fields included within the instantiated message data object. This may occur when certain portions or elements of the subject electronic communication are not present within the unstructured message data and, therefore, no corresponding message component or value exists to be extracted. For example, if the subject electronic communication does not include a file attachment, then the message attribute identifiers (or data fields) associated with attachment-specific properties (e.g., the file name identifier or data field, the file type identifier or data field, the md5 identifier or data field, the sha1 identifier or data field, the sha256 identifier or data field, the file size identifier or data field, etc.) of the attachment parent-level data object may remain unpopulated or null. Similarly, if the subject electronic communication does not include a carbon copy recipient, a blind carbon copy recipient, or an embedded hyperlink, the corresponding message attribute identifiers or data fields for those components may likewise remain unpopulated or null.

Populating Extracted Message Components within the Message Data Object

In one or more embodiments, after deriving, extracting, or generating the plurality of message components based on the unstructured message data associated with the subject electronic communication, S230 may function to automatically populate, within the instantiated message data object, the plurality of message components in accordance with the message data model schema to create the structured message data object corresponding to the subject electronic communication. At least one technical benefit of transforming the unstructured message data into the structured message data object may provide a structured, machine-readable representation of the subject electronic communication, which enables downstream systems to perform automated message assessment, message threat detection, and message threat mitigation actions in a consistent and uniform manner, regardless of the original format, structure, or source of the electronic communication.

For instance, in a non-limiting example, after extracting a message component or message attribute value corresponding to the file name of an attachment included in the subject electronic communication, S230 may function to populate the file name identifier (e.g., file name data field) within the attachment parent-level data object of the instantiated message data object with the extracted file name. Similarly, after determining the file size of the attachment, S230 may populate the file size identifier (e.g., file size data field) within the same attachment parent-level data object with the determined file size value.

Additionally, or alternatively, in one or more embodiments, if the unstructured message data includes one or more email addresses listed in the "To" field of the subject electronic communication, S230 may function to populate the primary recipient identifier (e.g., primary recipient data field) with the one or more email addresses listed in the "To" field. Additionally, or alternatively, if the unstructured message data includes one or more email addresses listed in the "CC" field of the subject electronic communication, S230 may function to populate the carbon copy recipient identifier (e.g., carbon copy recipient data field) with the one or more email addresses listed in the "CC" field. Additionally, or alternatively, if the unstructured message data includes one or more email addresses listed in the "BCC" field of the subject electronic communication, S230 may function to populate the blind carbon copy recipient identifier (e.g., blind carbon copy recipient data field) with the one or more email addresses listed in the "BCC" field.

Additionally, or alternatively, in one or more embodiments, in response to determining a message direction that corresponds to the subject electronic communication based on an evaluation of the sender email address against the recipient email addresses extracted from the unstructured message data corresponding to the subject electronic communication, S230 may function to automatically populate one or more message direction attribute identifiers (e.g., message direction data fields) within the directional metadata parent-level data object of the instantiated message data object. For instance, when S230 determines that the subject electronic communication originated from a sender email address external to the subscribing entity and was delivered to one or more user accounts controlled by the subscribing entity, S230 may populate the message inbound direction identifier (e.g., message inbound direction data field) with a value indicating an inbound message direction. Similarly, when S230 determines that both the sender email address and the recipient email addresses are associated with user accounts controlled by the subscribing entity, S230 may populate the message internal direction identifier (e.g., message internal direction data field) with a value indicating an internal message direction.

It shall be recognized that, in one or more embodiments, S230 may function to automatically populate, in real-time or near real-time, a corresponding message attribute value or message component for the one or more message attribute identifiers (or data fields) associated with the other parent-level data objects of the instantiated message data object in analogous ways.

For instance, in a non-limiting example, the structured message data object corresponding to the subject electronic communication may include a "mailbox" parent-level data object that contains one or more message attribute identifiers and corresponding message attribute values that correspond to the digital mailbox in which the subject electronic communication was found. For example, the "mailbox" parent-level data object may include a message attribute identifier such as "display_name" with a corresponding message attribute value of "John Doe", a message attribute identifier such as "email" with a corresponding message attribute value of "john.doe@example.com", a message attribute identifier such as "first_name" with a corresponding message attribute value of "John", and a message attribute identifier such as "last_name" with a corresponding message attribute value of "Doe".

Additionally, or alternatively, in such a non-limiting example, the structured message data object corresponding to the subject electronic communication may further include the "subject" parent-level data object that contains a message attribute identifier and a corresponding message attribute value that correspond to the subject line of the subject electronic communication. For example, the "subject" parent-level data object may include a message attribute identifier such as "subject_line" with a corresponding message attribute value of "Urgent: Action Required for Your Account".

2.4 Assessing the Structured Message Data Object

S240, which includes assessing a structured message data object, may function to automatically assess the structured message data object generated by S230 against a corpus of message threat detection instructions. A message threat detection instruction, as generally referred to herein, may include a computer-readable rule or logic-based expression that is configured to evaluate one or more message components or message attribute values contained within the structured message data object to detect if the electronic communication corresponding to the structured message data object is indicative of anomalous, suspicious, or malicious behavior. It shall be recognized that the phrase "message threat detection instruction" may be interchangeably referred to herein as a "threat detection instruction," "computer-executable threat detection heuristic," and/or the like.

Figure 6:
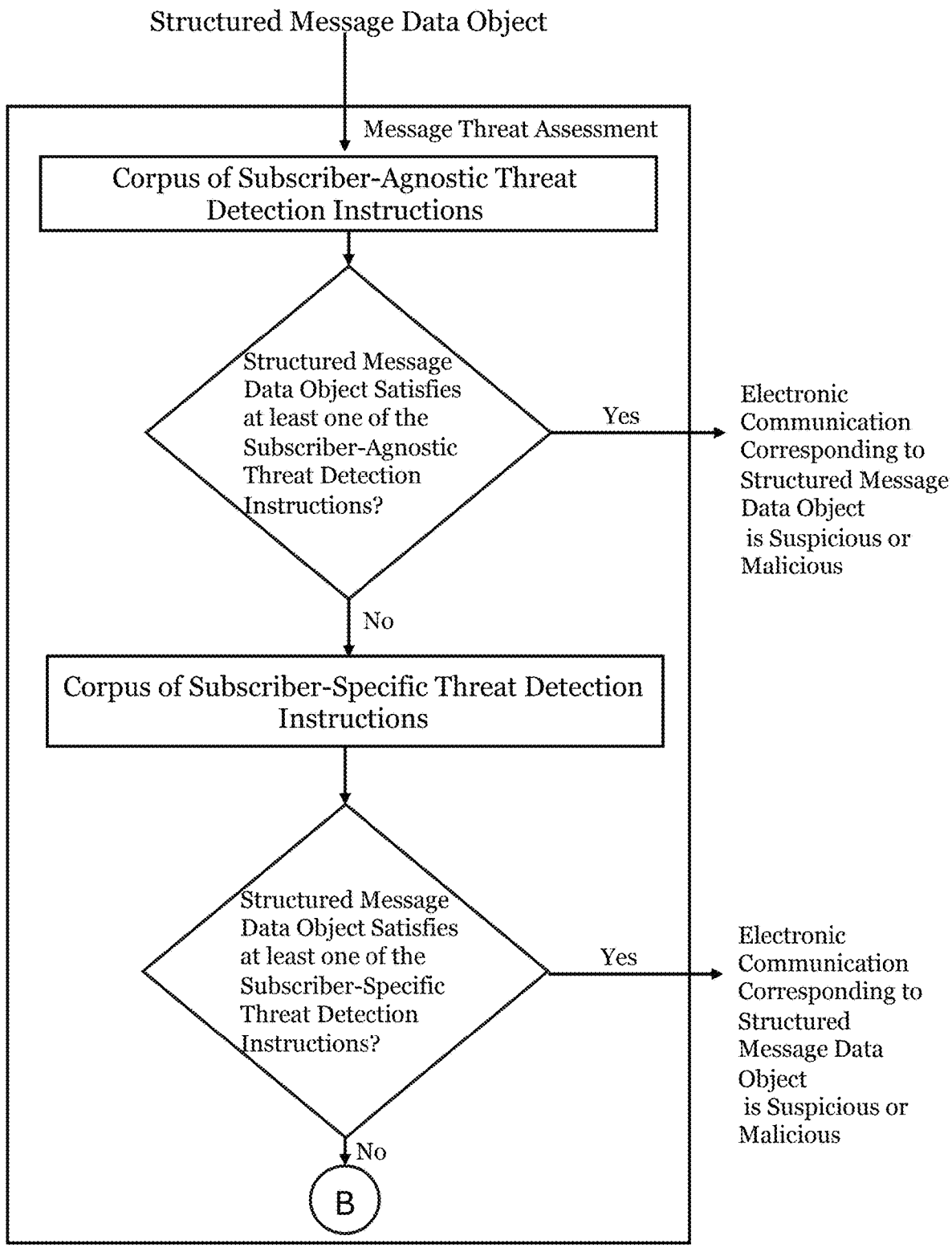
FIGS. 6-6A illustrate an example schematic of assessing a structured message data object against a corpus of subscriber-agnostic threat detection instructions, a corpus of subscriber-specific threat detection instructions, and a corpus of third-party threat detection instructions in accordance with one or more embodiments of the present application.
Figure 6A:
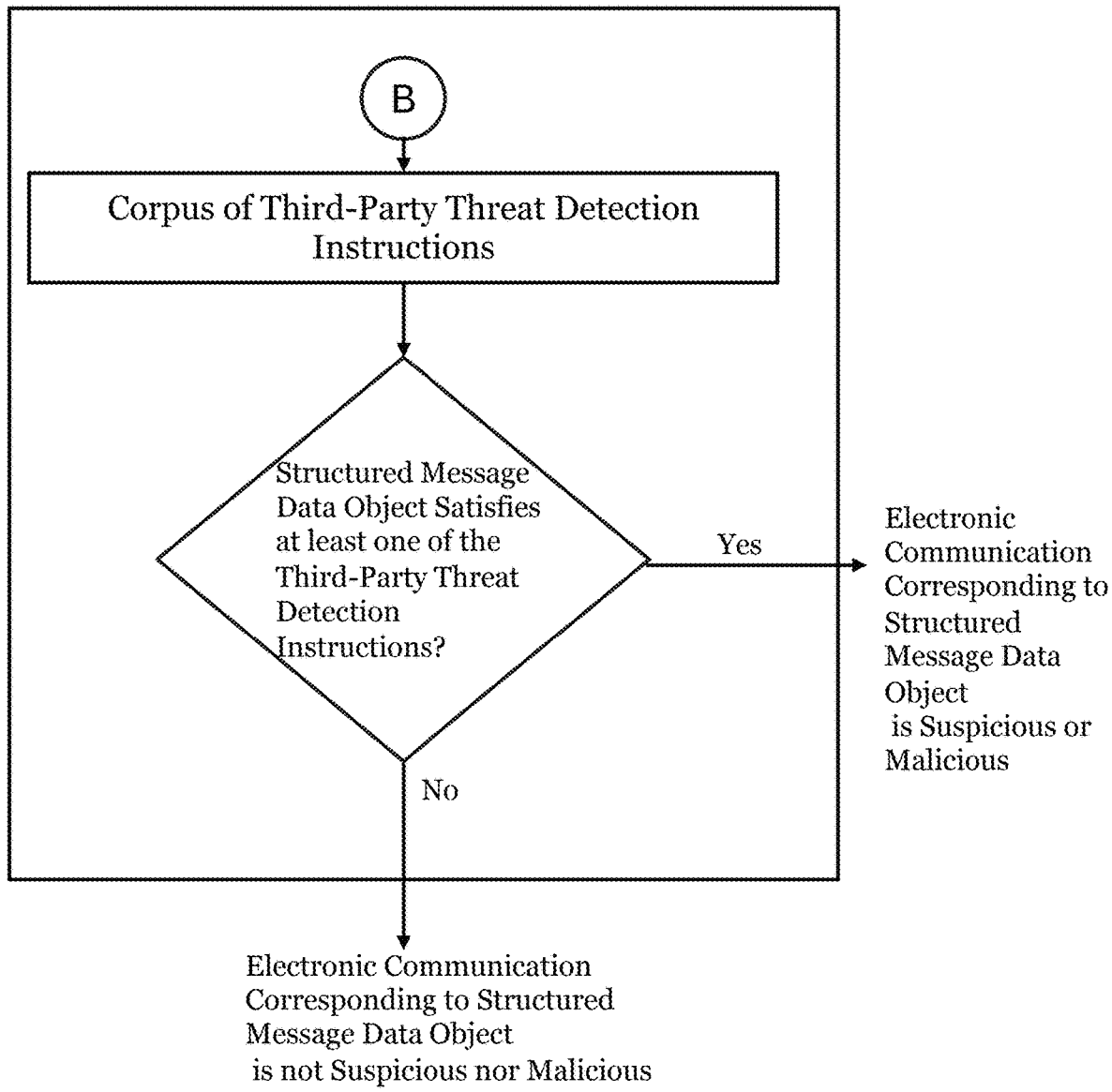

In one or more embodiments, in response to generating a structured message data object that represents a target electronic communication transmitted to a message storage repository, S240 may function to automatically assess, using one or more computers, the structured message data object against a set of subscriber-agnostic threat detection instructions provided by the threat detection and response service 100 and a set of subscriber-specific threat detection instructions created by a subscribing entity that controls the message storage repository, as shown generally by way of example in FIGS. 6-6A. That is, in such an embodiment, S240 may function to assess, in real-time or near real-time, the structured message data object against the set of subscriber-agnostic threat detection instructions and the set of subscriber-specific threat detection instructions to determine whether the target electronic communication includes one or more characteristics that may be indicative of anomalous, suspicious, or malicious behavior, and, if so, flag the target electronic communication for further review, automated response, or threat mitigation.

The set of subscriber-agnostic threat detection instructions, in one or more embodiments, may include a collection of computer-readable message detection rules or detection logic authored, curated, and/or maintained by the threat detection and response service 100 for use across all subscribers subscribing to the threat detection and response service 100.

The set of subscriber-specific threat detection instructions, in one or more embodiments, may include a collection of computer-readable message detection rules or logic expressions authored by a specific subscribing entity and designed to evaluate structured message data objects in a manner tailored to that specific subscribing entity's preference.

Programmatically Importing Message Threat Detection Instructions

Figure 14:
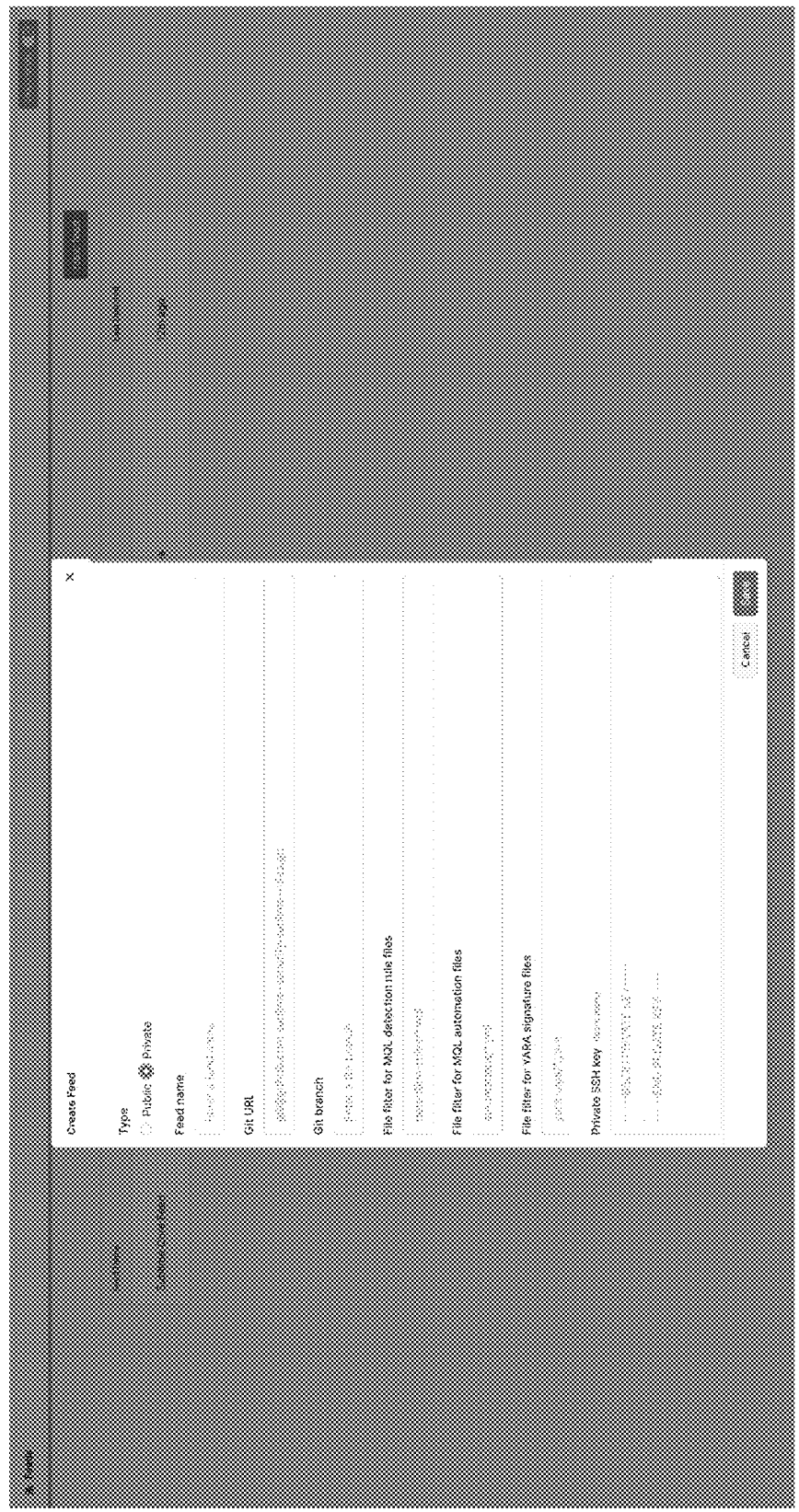

In one or more embodiments, the system or service implementing method 200 (e.g., threat detection and response service 100) may provide a subscribing entity with a distinct instance of the threat detection and response service 100 in response to receiving a service enrollment request from the subscribing entity. In one or more embodiments, after providing the distinct instance to the subscribing entity, the system or service implementing method 200 may function to receive, from the subscribing entity, a code repository connection request to digitally connect a private threat detection code repository hosted by a remote code repository service (e.g., GitHub®) to the distinct instance of the threat detection and response service 100. It shall be recognized that, in such an embodiment, the subscribing entity may have created and transmitted the code repository connection request via a graphical user interface of the threat detection and response service 100, as shown generally by way of example in FIG. 14.

The private threat detection code repository, in one or more embodiments, may include a set of subscriber-specific threat detection instructions (e.g., one or more subscriber-specific threat detection instructions, two or more subscriber-specific threat detection instructions, thirty or more subscriber-specific threat detection instructions, etc.) that are authored, managed, and/or version-controlled by the subscribing entity and tailored to the subscribing entity's internal message policies, infrastructure, risk posture, or operational context. In other words, the set of subscriber-specific threat detection instructions may represent custom message detection logic developed or maintained by the subscribing entity to identify electronic communications that may be anomalous, suspicious, or malicious.

Accordingly, in such an embodiment, the system or service implementing method 200 (e.g., the threat detection and response service 100) may automatically retrieve, in real-time or near real-time, the set of subscriber-specific threat detection instructions included in the private threat detection code repository (e.g., private GitHub® repository or the like) in response to receiving the code repository connection request. It shall be recognized that, in one or more embodiments, the retrieved set of subscriber-specific threat detection instructions may be stored within the distinct instance of the threat detection and response service and used to evaluate structured message data objects. It shall be further recognized that the threat detection and response service 100 may not use the set of subscriber-specific threat detection instructions when assessing inbound electronic communications that correspond to other subscribing entities.

At least one technical benefit of enabling the subscribing entity to digitally connect the private threat detection code repository to the distinct instance of the threat detection and response service 100 enables the subscribing entity to extend the message detection capabilities of the threat detection and response service 100 beyond its default message detection logic (e.g., the threat detection instructions provided by the threat detection and response service 100). In this way, structured message data objects may be evaluated against both the service-default threat detection instructions provided by the threat detection and response service 100 and the subscriber-specific threat detection instructions maintained within the private threat detection code repository.

In one or more embodiments, the threat detection and response service 100 may function to provision a distinct instance of the threat detection and response service 100 for the subscribing entity in response to receiving the service enrollment request from the subscribing entity. In such an embodiment, provisioning the distinct instance of the threat detection and response service 100 for the subscribing entity may include automatically retrieving a set of subscriber-agnostic threat detection instructions provided by the threat detection and response service 100 by accessing or downloading a copy of a publicly accessible threat detection code repository hosted by a remote code repository service (e.g., GitHub®). The publicly accessible threat detection code repository, in one or more embodiments, may be controlled by the threat detection and response service 100 and include the set of subscriber-agnostic threat detection instructions. Accordingly, the retrieved set of subscriber-agnostic threat detection instructions may be stored within the distinct instance of the threat detection and response service 100 and used to evaluate structured message data objects.

At least one technical benefit of digitally connecting the distinct instance of the threat detection and response service 100 to the publicly accessible threat detection code repository enables updated or new subscriber-agnostic threat detection instructions published to the publicly accessible threat detection code repository to be automatically pushed to the distinct instance in real-time or near real-time, thereby ensuring that the subscribing entity continuously receives the latest detection instructions for which structured message data objects may be evaluated against.

Figure 13:
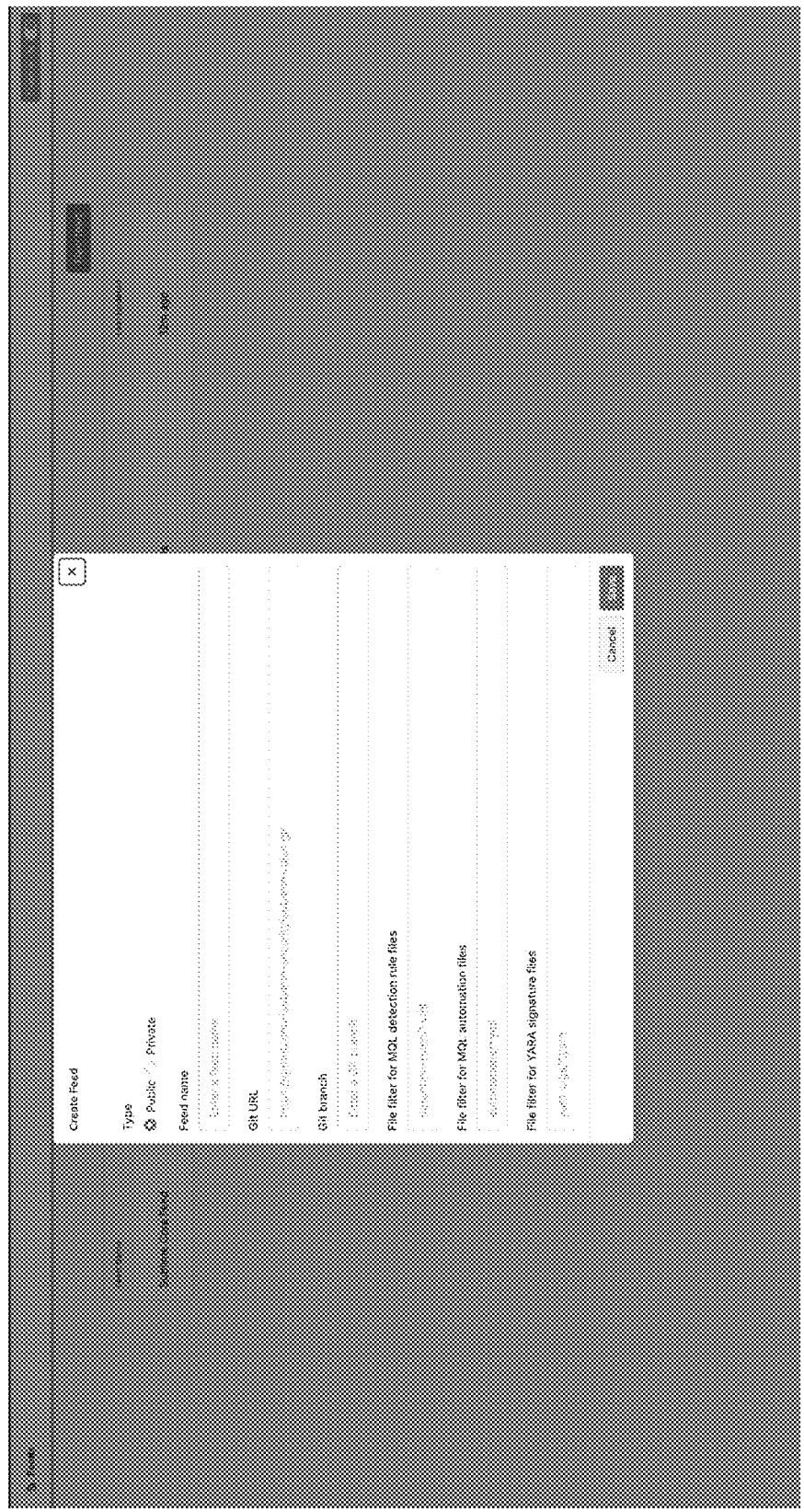

Additionally, or alternatively, in one or more embodiments, the system or service implementing method 200 may function to receive, from the subscribing entity, a code repository connection request to digitally connect a third-party threat detection code repository hosted by a remote code repository service (e.g., GitHub®) to the distinct instance of the threat detection and response service 100. It shall be recognized that, in such an embodiment, the subscribing entity may have created and transmitted the code repository connection request via the graphical user interface of the threat detection and response service 100, as shown generally by way of example in FIG. 13.

The third-party threat detection code repository, in one or more embodiments, may include a corpus of third-party threat detection instructions (e.g., one or more third-party threat detection instructions, two or more third-party threat detection instructions, thirty or more third-party threat detection instructions, etc.) that are created, managed, and/or version-controlled by a third-party entity external to the subscribing entity and the threat detection and response service 100. In other words, the corpus of third-party threat detection instructions may represent open-source detection instructions developed and maintained by a third-party entity such as a public security community or open-source community.

Accordingly, in such an embodiment, the system or service implementing method 200 (e.g., the threat detection and response service 100) may automatically retrieve, in real-time or near real-time, the corpus of third-party threat detection instructions included in the third-party threat detection code repository (e.g., open-source GitHub® repository or the like) in response to receiving the code repository connection request. It shall be recognized that, in one or more embodiments, the retrieved corpus of third-party threat detection instructions may be stored within the above-mentioned instance of the threat detection and response service and used to evaluate structured message data objects.

At least one technical benefit of digitally connecting the distinct instance of the threat detection and response service 100 to the third-party threat detection code repository enables the subscribing entity to retrieve and leverage peer-created threat detection instructions-such as those maintained by open-source security communities.

Message Threat Detection Instruction Encoding

In one or more embodiments, each threat detection instruction included in the set of subscriber-specific threat detection instructions, the set of subscriber-agnostic threat detection instructions, and/or the corpus of third-party threat detection instructions may be encoded or structured using a message detection language (e.g., message query language (MQL) or the like) that is designed to reference and evaluate message components or message attribute values contained within a subject structured message data object.

In one or more embodiments, each respective threat detection instruction of the set of subscriber-specific threat detection instructions, the set of subscriber-agnostic threat detection instructions, and/or the corpus of third-party threat detection instructions may encoded with a respective data object traversal path that specifies a distinct sequence of one or more message attribute identifiers that is configured to extract a target message attribute value from the subject structured message data object.

Additionally, in one or more embodiments, each respective threat detection instruction may additionally be encoded with one or more attribute value conditions to evaluate the target message attribute value extracted from the subject structured message data object.

Additionally, in one or more embodiments, each respective threat detection instruction may further be encoded to detect the subject electronic communication as suspicious (e.g., malicious or the like) or not suspicious (e.g., not malicious or the like) (e.g., a subject electronic communication is malicious or suspicious in response to a respective threat detection instruction detecting the target message attribute value extracted from the subject structured message data object satisfies the one or more attribute value conditions, the subject electronic communication is not malicious or not suspicious in response to the respective threat detection instruction detecting the target message attribute value extracted from the structured message data object does not satisfy the one or more attribute value conditions).

As described above, in one or more embodiments, a structured message data object corresponding to a subject electronic communication may be formatted as a JSON object and include an "attachments" parent-level data object that contains one or more message attribute identifiers and corresponding message attribute values that correspond to properties of an attachment file included in the subject electronic communication. For example, the "attachments" parent-level data object may include a message attribute identifier such as "file_name" with a corresponding message attribute value of "invoice.exe", a message attribute identifier such as "file_type" with a corresponding value of "exe", a message attribute identifier such as "sha256" with a corresponding value representing the SHA-256 hash signature of the attachment file, and a message attribute identifier such as "size" and a corresponding value of 40,000 bytes.

In a non-limiting example, a respective threat detection instruction may be encoded to identify a subject electronic communication as suspicious or malicious when the structured message data object corresponding to the subject electronic communication includes an indication that the subject electronic communication has an executable attachment with a file size exceeding a predetermined byte threshold.

Accordingly, in such an embodiment, when the structured message data object is evaluated against the respective threat detection instruction, the first data object traversal path and the second data object traversal path are used to extract (e.g., access) target message attribute values from the structured message data object and, in turn, the logical expression is used to determine whether the extracted message attribute values satisfy the specified conditions for classifying the subject electronic communication as suspicious or malicious. In a non-limiting example, the subject electronic communication may be determined to be suspicious or malicious because the extracted value of the "file_type" message attribute identifier is "exe" and the extracted value of the "size" message attribute identifier is 40,000 bytes, thereby satisfying the condition that the file type is equal to "exe" and the file size is greater than 30,000 bytes.

Figure 7:
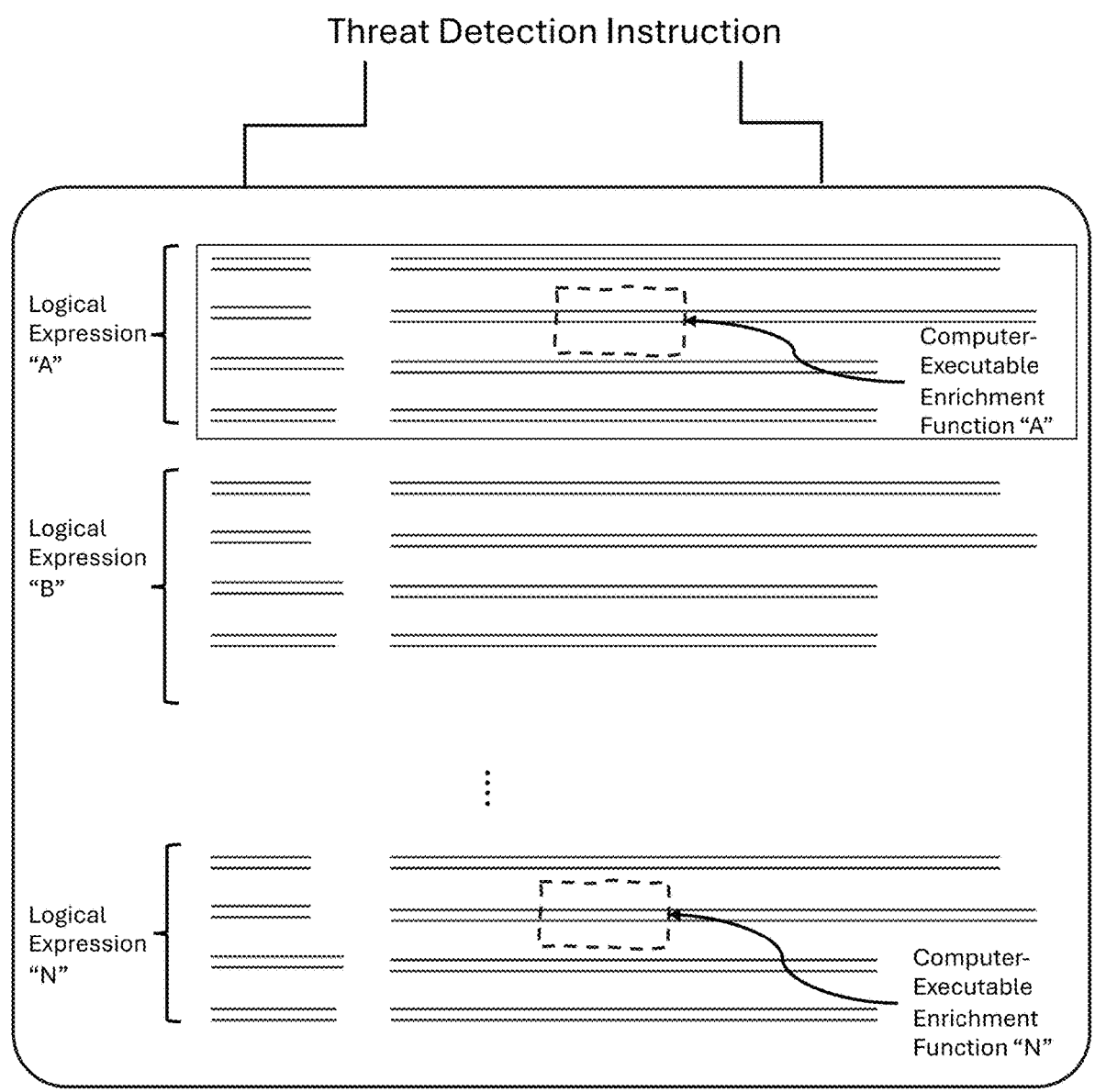
FIG. 7 illustrates an example encoding of a threat detection instruction in accordance with one or more embodiments of the present application.

Additionally, in some embodiments, one or more threat detection instructions (e.g., a plurality of threat detection instructions or the like) may be encoded with one or more computer-executable enrichment functions that can perform advanced analytical tasks (e.g., enrichment tasks) not achievable by regular expressions alone, as shown generally by way of example in FIG. 7. In one or more embodiments, each of the one or more computer-executable enrichment functions, when invoked, may be configured to initiate a request to a backend service of the threat detection and response service 100 to perform a respective enrichment task and, in turn, the backend service may perform the respective enrichment task and return an enrichment result that can be evaluated by a subject threat detection instruction, as described in more detail herein.

For instance, in a non-limiting example, a subject threat detection instruction (e.g., subscriber-agnostic threat detection instruction, subscriber-specific threat detection instruction, third-party threat detection instruction, etc.) may be encoded with a message screenshot enrichment function. The message screenshot enrichment function may perform a computer operation that captures a screenshot of a subject electronic communication. The screenshot of the subject electronic communication may be similar or equivalent to the visual representation displayed to an end user within a message preview pane or reading pane of a graphical user interface provided by a respective messaging service provider. It shall be recognized that, in some embodiments, the message screen shot enrichment function may capture a screenshot of the subject electronic communication using the message body's hypertext markup language (HTML) section.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the message screenshot enrichment function to generate a visual representation (e.g., graphical representation) of the target electronic communication. It shall be recognized that, in some embodiments, the visual representation generated by the message screenshot enrichment function may be passed as input to one or more additional enrichment functions encoded within the subject threat detection instruction that may be configured to detect visual indicators of deception, impersonation, or fraud not identifiable through text-based analysis.

In some embodiments, the threat detection and response service may support rule-level exclusions, wherein a specific behavior or message pattern may be excluded from the effect of a particular threat detection instruction without modifying the core rule definition. The exclusion logic may be defined through a user interface or programmatic configuration and may apply only within the context of a specific subscribing entity. By enabling targeted exclusions, the system may adapt detection outcomes based on local requirements or operational context without resorting to global allowlists or requiring rule duplication or manual edits across multiple tenants.

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a base64 scanning enrichment function. The base64 scanning enrichment function may be configured to identify one or more base64 encoded strings within a subject electronic communication and decode the one or more identified base64 encoded strings into one or more corresponding decoded string values. The decoded string values may be evaluated against one or more detection conditions that, if satisfied, may result in the subject electronic communication being detected as suspicious or malicious.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the base64 scanning enrichment function in response to providing a textual message component of the subject structured message data object (e.g., hyperlink, HTML message body, URL parameter, or attachment content) having a base64 encoded value as input to the base64 scanning enrichment function. The base64 scanning enrichment function, in such a non-limiting example, may function to output a decoded value that corresponds to the base64 encoded value. Accordingly, the subject threat detection instruction may further function to assess the decoded value against one or more message threat detection conditions of the subject threat detection instruction and, if the decoded value satisfies one of the one or more message threat detection conditions, the target electronic communication may be detected as suspicious or malicious.

At least one technical benefit of using the base64 scanning enrichment function within a respective threat detection instruction enables the respective threat detection instruction to detect obfuscated malicious or suspicious content—such as base64 encoded recipient information in phishing URLs, base64 encoded domains or usernames in message content, and base64 encoded data within HTML attachments—that would otherwise evade detection by traditional message analysis techniques.

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a file HTML screenshot enrichment function. The file HTML screenshot enrichment function may be configured to generate a visual representation of an HTML file attachment included within a subject electronic communication by rendering the HTML content and producing a corresponding image file. The generated image may be evaluated by one or more downstream enrichment functions to support visual inspection and detection of potentially malicious content.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the file HTML screenshot enrichment function in response to providing a HTML-based file attachment included in the subject structured message data as input to the file HTML screenshot enrichment function. The file HTML screenshot enrichment function, in such a non-limiting example, may function to output an image file that corresponds to a visual representation of the inputted HTML-based file attachment. Accordingly, the outputted image file may be evaluated by the subject threat detection instruction to determine whether the visual content of the outputted image file satisfies one or more message threat detection conditions and, if one or more of the message threat detection conditions are satisfied, the target electronic communication may be detected as suspicious or malicious.

At least one technical benefit of using the file HTML screenshot enrichment function within a respective threat detection instruction may enable the detection of visually rendered malicious content that may not be detectable through traditional message analysis techniques.

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a machine learning-based link analysis enrichment function. The machine learning-based link analysis enrichment function may be configured to analyze a hyperlink included within a subject electronic communication to classify the hyperlink as either benign or suspicious. In one or more embodiments, the machine learning-based link analysis enrichment function may perform one or more computer-based operations including navigating to a destination webpage associated with the hyperlink using a headless browser, capturing a screenshot of the rendered destination webpage, and executing one or more machine learning-based object detection models to detect if any visual elements of a predetermined type are within the screenshot—such as brand logos, login input fields, or captcha forms—that may be indicative of phishing or other suspicious activity. In some embodiments of the present application, the link analysis enrichment function may further download one or more files referenced within an electronic communication, and the downloaded files may be subjected to additional enrichment analysis, such as attachment detonation, content inspection, or signature-based classification.

It shall be recognized that in some embodiments, the classification output may further include additional categories beyond binary malicious or benign designations, such as graymail, spam, promotional content, or bulk-messaging classifications. The inclusion of such categories may enable differentiated threat mitigation actions or user experience adjustments based on the contextual relevance of the electronic communication.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the machine learning-based link analysis enrichment function in response to providing a hyperlink or URL value included within the subject structured message data object as input to the machine learning-based link analysis enrichment function. The machine learning-based link analysis enrichment function, in one or more embodiments, may to navigate to a destination webpage associated with the hyperlink or URL value using a headless browser, capture a screenshot of the rendered destination webpage, and execute one or more machine learning-based object detection models to detect if the screenshot includes one or more elements or objects that corresponds to at least one of a plurality of predetermined object types (e.g., brand logos, buttons, input forms, etc.).

It shall be recognized that the machine learning-based link analysis enrichment function, in such a non-limiting example, may function to output a suspicious classification label that indicates the hyperlink or URL value is suspicious based on the screenshot having at least one item, element, or object that corresponds to one of the plurality of predetermined object types. In other words, the subject threat detection instruction may detect the target electronic communication as suspicious or malicious in response to the machine learning-based link analysis outputting the suspicious classification label for the hyperlink or URL value.

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a machine learning-based logo detection enrichment function. The machine learning-based logo detection enrichment function may be configured to analyze a file attachment included within a subject electronic communication to detect whether the file attachment contains a logo that is equivalent or substantially equivalent to a company logo included within a predetermined set of company logo representations.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the machine learning-based logo detection enrichment function in response to providing a file attachment (e.g., image file, document file, or the like) included within the subject structured message data object as input to the machine learning-based logo detection enrichment function. The machine learning-based logo detection enrichment function may function to detect an occurrence of a subject logo within the file attachment using a machine learning-based object detection model, generate a numerical vector representation of the subject logo using a Siamese neural network in response to providing the subject logo to the Siamese neural network, assessing the numerical vector representation of the subject logo against a plurality of reference numerical vector representations that correspond to a predetermined set of company logos using a vector similarity assessment technique (e.g., cosine similarity, etc.), and computing a logo similarity score based on the assessment.

The logo similarity score, as generally referred to herein, may indicate a degree of similarity between the subject logo the predetermined set of company logo representations based on the assessment, where a higher score reflects a greater likelihood that the subject logo is visually equivalent or substantially equivalent to a company logo included in the predetermined set of company logo representations.

It shall be recognized that, in such a non-limiting example, the subject threat detection instruction may determine that the target electronic communication is suspicious or malicious based on the computed logo similarity score satisfying a predetermined minimum threshold.

It shall be further recognized that, in some embodiments, the output of the machine learning-based logo detection enrichment function may include an indication of the detected company logo (e.g., ACME Corporation) to which the subject logo likely corresponds. In a non-limiting example, a subject threat detection instruction may be configured to detect the target electronic communication as malicious or suspicious when the file attachment is of type "pdf" and the detected company logo is equal to "ACME Corporation."

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a machine learning-based macro classification enrichment function. The machine learning-based macro classification enrichment function may be configured to analyze a file attachment included within a subject electronic communication to detect whether the file attachment includes a potentially malicious macro (e.g., a VBA macro) based on macro-related characteristics extracted from the file attachment.

Accordingly, in such a non-limiting example, the threat detection and response service 100 may function to automatically assess a subject structured message data object that corresponds to a target electronic communication against the subject threat detection instruction. In such a non-limiting example, during the assessment or execution of the subject threat detection instruction against the subject structured message data object, the subject threat detection instruction may function to invoke the machine learning-based macro classification enrichment function in response to providing a file attachment having a macro (e.g., Microsoft Office document, spreadsheet, etc.) included within the subject structured message data object as input to the machine learning-based macro classification enrichment function. The machine learning-based macro classification enrichment function may function to use an XGBoost machine learning model or the like to assess the macro-related content (e.g., Visual Basic for Applications (VBA) keywords, file metadata, etc.) of the file attachment and classify the macro as either malicious or not malicious.

In a non-limiting example, the subject threat detection instruction may be configured to detect the target electronic communication as malicious or suspicious when the file attachment has a file extension associated with Microsoft Office documents or compressed archives (e.g., "doc", "xlsm", "zip") and the machine learning-based macro classification enrichment function classifies the macro as a malicious macro.

Additionally, or alternatively, in another non-limiting example, a subject threat detection instruction (e.g., subscriber-agnostic threat detection instruction, subscriber-specific threat detection instruction, third-party threat detection instruction, etc.) may be encoded with a machine learning-based natural language understanding enrichment function. The machine learning-based natural language understanding enrichment function may be configured to analyze a message body included within a subject electronic communication to determine whether the message body expresses a phishing-related intent and/or contains one or more named entities using one or more trained machine learning models (e.g., Natural Language Understanding (NLU) models).

The machine learning-based natural language understanding enrichment function may output one of a plurality of predetermined intent classification labels based on the one or more trained machine learning models assessing the message body. For instance, in a non-limiting example, the machine learning-based natural language understanding enrichment function may output a classification label of "business email compromise" when the message body includes urgent language about quick tasks from C-suite, human resources, and accounting departments. In another non-limiting example, the machine learning-based natural language understanding enrichment function may output a classification label of "callback_scam" when the message body includes language about renewing/purchasing services such as tech support, antivirus, or cryptocurrency. In another non-limiting example, the machine learning-based natural language understanding enrichment function may output a classification label of "credential_theft" when the message body includes language urging users to visit a link leading to a realistic-looking portal that requires their credentials to log in. In another non-limiting example, the machine learning-based natural language understanding enrichment function may output a classification label of "extortion" when the message body appears to intimidate victims with threats of blackmail. In another non-limiting example, the machine learning-based natural language understanding enrichment function may output a classification label of "steal_personally_identifiable_information" when the message body requests updates to billing information, personal identification, and tax returns. In another non-limiting example, the machine learning-based natural language understanding enrichment function may output a classification label of "job_scam" when the message body includes language associated with employment offers.

Additionally, in some embodiments, the one or more trained machine learning models may output one or more message tags that provide additional context regarding the thematic content of the message body. For instance, in a non-limiting example, the machine learning-based natural language understanding enrichment function may output a tag of "invoice" when the message body includes language about viewing invoices via links or attachments. In another non-limiting example, the machine learning-based natural language understanding enrichment function may output a tag of "payment" when the message body includes terminology related to ACH, EFT, or wire payments. In another non-limiting example, the machine learning-based natural language understanding enrichment function may output a tag of "purchase_order" when the message body references purchase orders, quotation requests, or similar transactional documents.

Additionally, in some embodiments, the one or more trained machine learning models may function to extract one or more phrases from the message body included within the subject structured message data object and assign each extracted phrase a corresponding named entity label. Each named entity label may represent a semantically meaningful category associated with phishing, fraud, or socially manipulative content. For instance, in a non-limiting example, the machine learning-based natural language understanding enrichment function may extract a phrase such as "hello" or "dear" and assign such phrase a named entity label of "greeting" (e.g., token(s) that aid in the identification of the recipient). In another non-limiting example, the machine learning-based natural language understanding enrichment function may extract a phrase such as "wire," "bank details," or "ACH payment" and assign such phrase the named entity label "financial" (e.g., token(s) containing financial details such as payments, bank accounts, or real estate transactions). In another non-limiting example, the machine learning-based natural language understanding enrichment function may extract a phrase such as "ACME CORP" or "COMPANY" and assign such phrase the named entity label "organization" (e.g., token(s) containing an organization name). In another non-limiting example, the machine learning-based natural language understanding enrichment function may extract a recipient-referencing phrase such as "Jane Doe" or "all" and assign such phrase the label "recipient" (e.g., token(s) representing the recipient of the email). In another non-limiting example, the machine learning-based natural language understanding enrichment function may extract a phrase such as "I need you to" or "please open" and assign such phrase the named entity label "request" (e.g., token(s) asking the recipient to act on behalf of the sender). In another non-limiting example, the machine learning-based natural language understanding enrichment function may extract a closing phrase such as "thanks" or "regards" and assign such phrase the named entity label "salutation" (e.g., token(s) signifying the end of the correspondence or aiding in the identification of the sender). In another non-limiting example, the machine learning-based natural language understanding enrichment function may extract a sender-referencing expression such as "Ms. Tyrell" or "IT Department" and assign such phrase the named entity label "sender" (e.g., token(s) representing the sender of an email, either a name or a generic designator). In another non-limiting example, the machine learning-based natural language understanding enrichment function may extract a phrase such as "ASAP" or "immediately" and assign such phrase the named entity label "urgency" (e.g., token(s) containing language meant to urge the recipient to act immediately).

It shall be recognized that, in one or more embodiments, the subject threat detection instruction may function to invoke the machine learning-based natural language understanding enrichment function in response to providing a message body included within a subject structured message data object as input to the machine learning-based natural language understanding enrichment function. The subject threat detection instruction, in one or more embodiments, may determine that a subject electronic communication corresponding to the subject structured message data object is malicious when the machine learning-based natural language understanding enrichment function outputs any one of the plurality of predetermined intent classification labels for the message body.

Additionally, or alternatively, in a non-limiting example, a subject threat detection instruction may be configured to detect a subject electronic communication as suspicious or malicious when one or more tokens within the message body are associated with the named entity "urgency" and one or more tokens are associated with the named entity "request."

2.5 Classifying a Subject Electronic Communication as Malicious or Suspicious

S250, which includes classifying an electronic communication, may function to automatically classify the electronic communication identified by S210 as malicious or suspicious based on assessing the structured message data object corresponding to the electronic communication against the set of subscriber-agnostic threat detection instructions and the set of subscriber-specific threat detection instructions.

In one or more embodiments, S250 may function to detect, via one or computers, that the electronic communication identified by S210 is suspicious or malicious when the structured message data object corresponding to the electronic communication satisfies at least one threat detection instruction defined within the set of subscriber-agnostic threat detection instructions or the set of subscriber-specific threat detection instructions.

Stated another way, in one or more embodiments, S250 may function to detect that the electronic communication identified by S210 is suspicious or malicious when the structured message data object corresponding to the electronic communication includes one or more message components or message attribute values that satisfy the logical conditions or heuristic expressions encoded within at least one threat detection instruction included in the set of subscriber-agnostic threat detection instructions or the set of subscriber-specific threat detection instructions.

For instance, in a non-limiting example, the structured message data object corresponding to a subject electronic communication may include an "attachments" parent-level data object with a message attribute identifier "file_type" having a value of "exe" and a message attribute identifier "size" having a value of 40,000 bytes. A respective threat detection instruction included in the set of subscriber-specific threat detection instructions may include a logical expression such as "attachments.file_type=="exe" AND attachments.size >30000". In such a non-limiting example, when the structured message data object is assessed against the respective threat detection instruction, the logical expression is satisfied, thereby causing the subject electronic communication to be classified or detected as suspicious or malicious.

2.6 Executing Threat Mitigation Actions

S260, which includes executing a threat mitigation action, may function to automatically execute, in real-time or near real-time, one or more threat mitigation actions that mitigate a security threat associated with a subject electronic communication in response to detecting the subject electronic communication as malicious or suspicious. A threat mitigation action, as generally referred to herein, may include a computer-executable operation or sequence of operations that, when executed, reduces the likelihood that a suspicious or malicious electronic communication adversely affects an end user, computing environment, or other digital assets of the subscribing entity. It shall be recognized that the phrase "threat mitigation action" may be interchangeably referred to herein as a "threat mitigation task" and/or the like.

In one or more embodiments, in response to determining that a subject electronic communication transmitted or delivered to a message storage repository monitored by the threat detection and response service 100 is suspicious or malicious, S260 may function to automatically execute, using one or more computers, at least one threat mitigation action to mitigate a security threat that the subject electronic communication poses. Stated another way, in some embodiments, at least a subset of the threat detection instructions (e.g., subscriber-agnostic threat detection instructions, subscriber-specific threat detection instructions, third-party threat detection instructions, etc.) may be digitally linked to at least one corresponding threat mitigation action, such that when the threat detection and response service 100 identifies, during an assessment of a subject structured message data object, that a threat detection instruction within the subset detected the subject structured message data object as malicious or suspicious, the corresponding threat mitigation action is automatically executed in real time.

In a non-limiting example, automatically executing the at least one threat mitigation action that mitigates the security threat associated with the subject electronic communication may include automatically removing the subject electronic communication from a primary directory (e.g., message inbox folder) of the message storage repository and automatically routing the subject electronic communication removed from the primary directory to a message disposal directory (e.g., trash folder, spam folder, or the like) of the message storage repository. In other words, the threat detection and response service 100 may function to programmatically relocate, in real time or near real-time, the subject electronic communication from an actively used message folder to a lower-access folder within the message storage repository to prevent user interaction with the subject electronic communication.

In another non-limiting example, the message storage repository monitored by the threat detection and response service 100 may be used by an end user (e.g., an employee, contractor, or affiliated user) of a subscribing entity for sending, receiving, or storing electronic communications. In such a non-limiting example, automatically executing the at least one threat mitigation action that mitigates the security threat associated with the subject electronic communication may include automatically routing the subject electronic communication from the message storage repository to a threat containment queue that is not accessible by the end user. In other words, the threat detection and response service 100 may function to programmatically relocate, in real-time or near real-time, the subject electronic communication to an isolated message storage location that the end user is unable to access, thereby preventing the end user from viewing, interacting with, or acting upon the subject electronic communication.

In another non-limiting example, the message storage repository may be provided by an electronic mail service (e.g., Google Workspace®) used by a subscribing entity. In such a non-limiting example, automatically executing the at least one threat mitigation action may include automatically generating a security alert message that includes a precis of the subject electronic communication and, in turn, transmit the security alert message to the subscribing entity using a real-time messaging service (e.g., Slack® or the like) different from the electronic mail service. In other words, the threat detection and response service 100 may function to deliver the security alert message in real time through a communication channel separate from the electronic mail service. It shall be recognized that, in some embodiments, the security alert message may include the subject line of the subject electronic communication, the sender email address of the subject electronic communication, the threat detection instruction that identified or detected the subject electronic communication to be suspicious or malicious, and the one or more threat mitigation actions that was automatically executed in response to detecting the subject electronic communication as suspicious or malicious.

Figure 8:
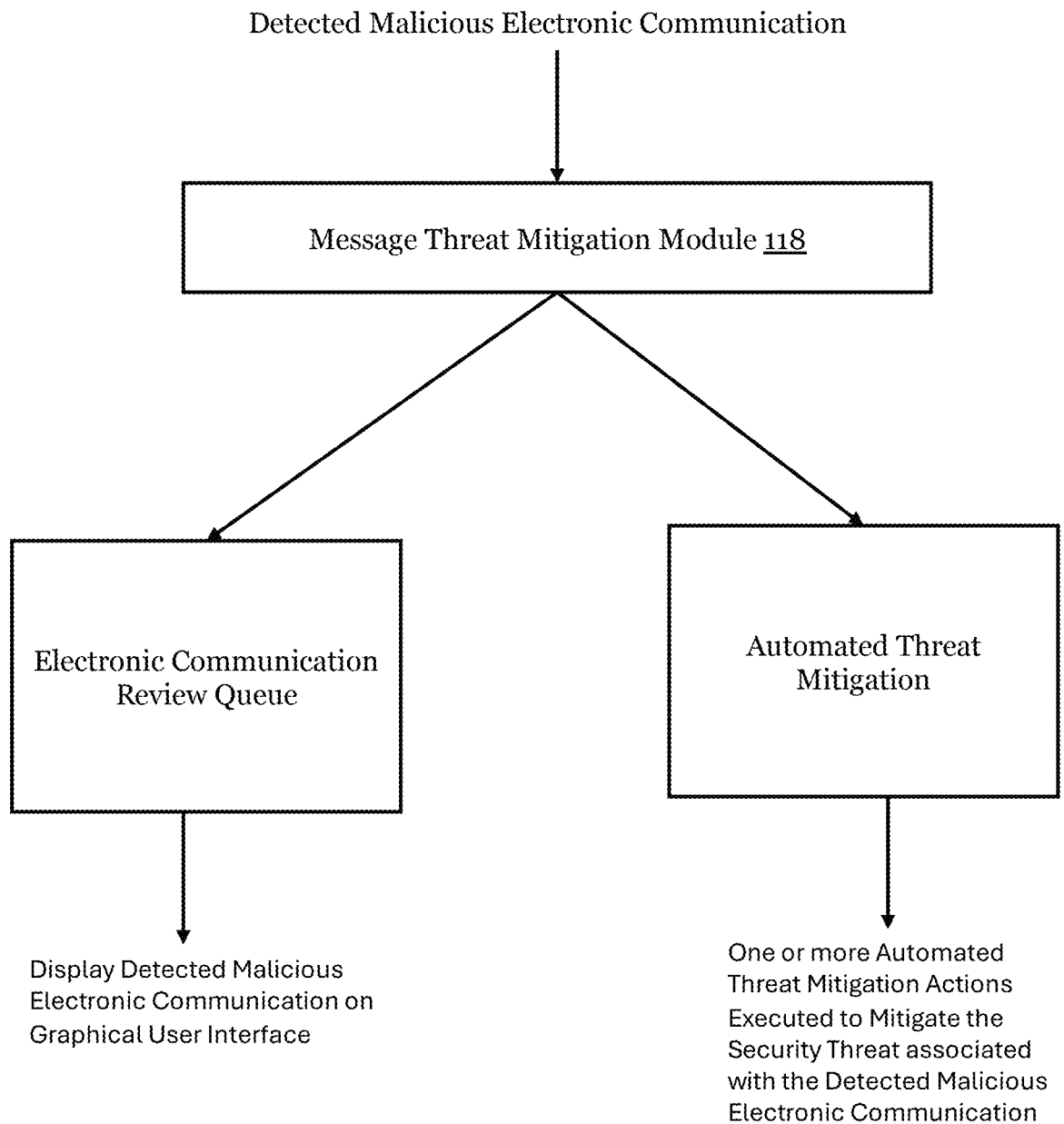
FIG. 8 illustrates an example of executing one or more threat mitigation actions based on detecting a malicious or suspicious electronic communication in accordance with one or more embodiments of the present application.

In another non-limiting example, automatically executing the at least one threat mitigation action may include automatically routing, in real-time or near real-time, the subject electronic communication (or the corresponding structured message data object) to an electronic communication review queue, as shown generally by way of example in FIG. 8. In such a non-limiting example, the threat detection and response service 100 may function to display, using a graphical user interface, the electronic communication review queue. The graphical user interface may include a selectable user interface element that corresponds to the subject electronic communication (e.g., the corresponding structured message data object).

Figure 9A:
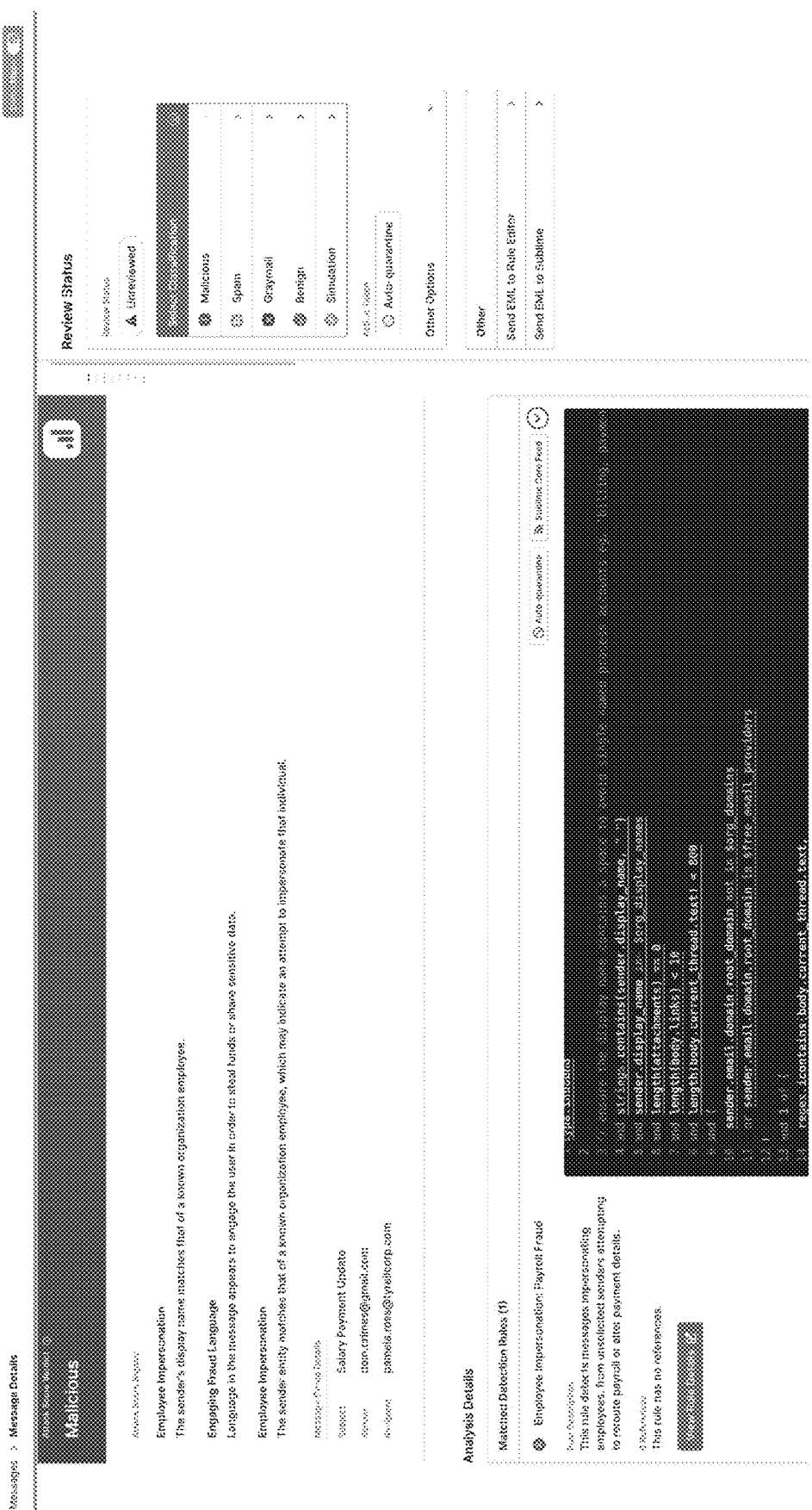
FIGS. 9-14 illustrate example graphical user interfaces in accordance with one or more embodiments of the present application.
Figure 9C:
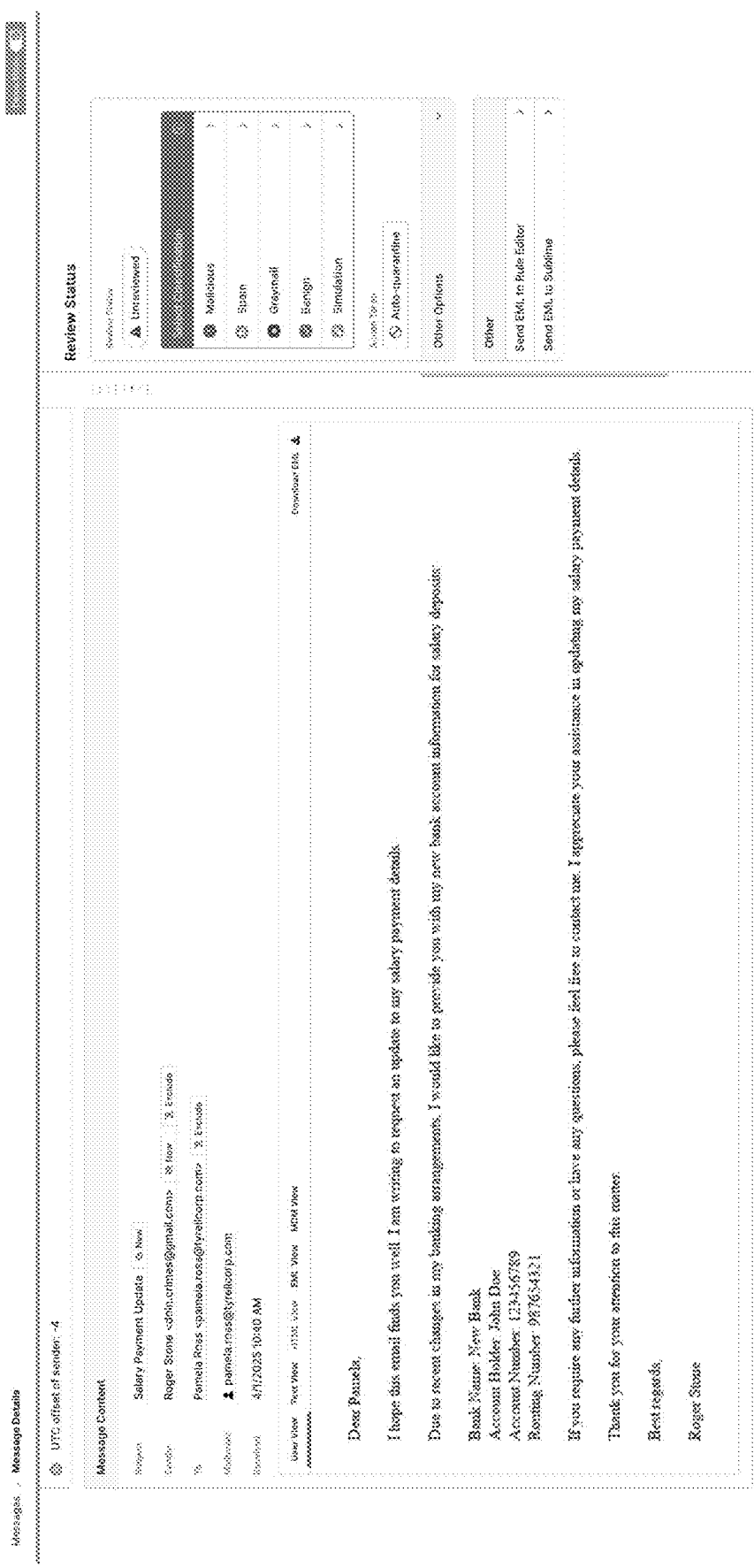
Figure 9D:
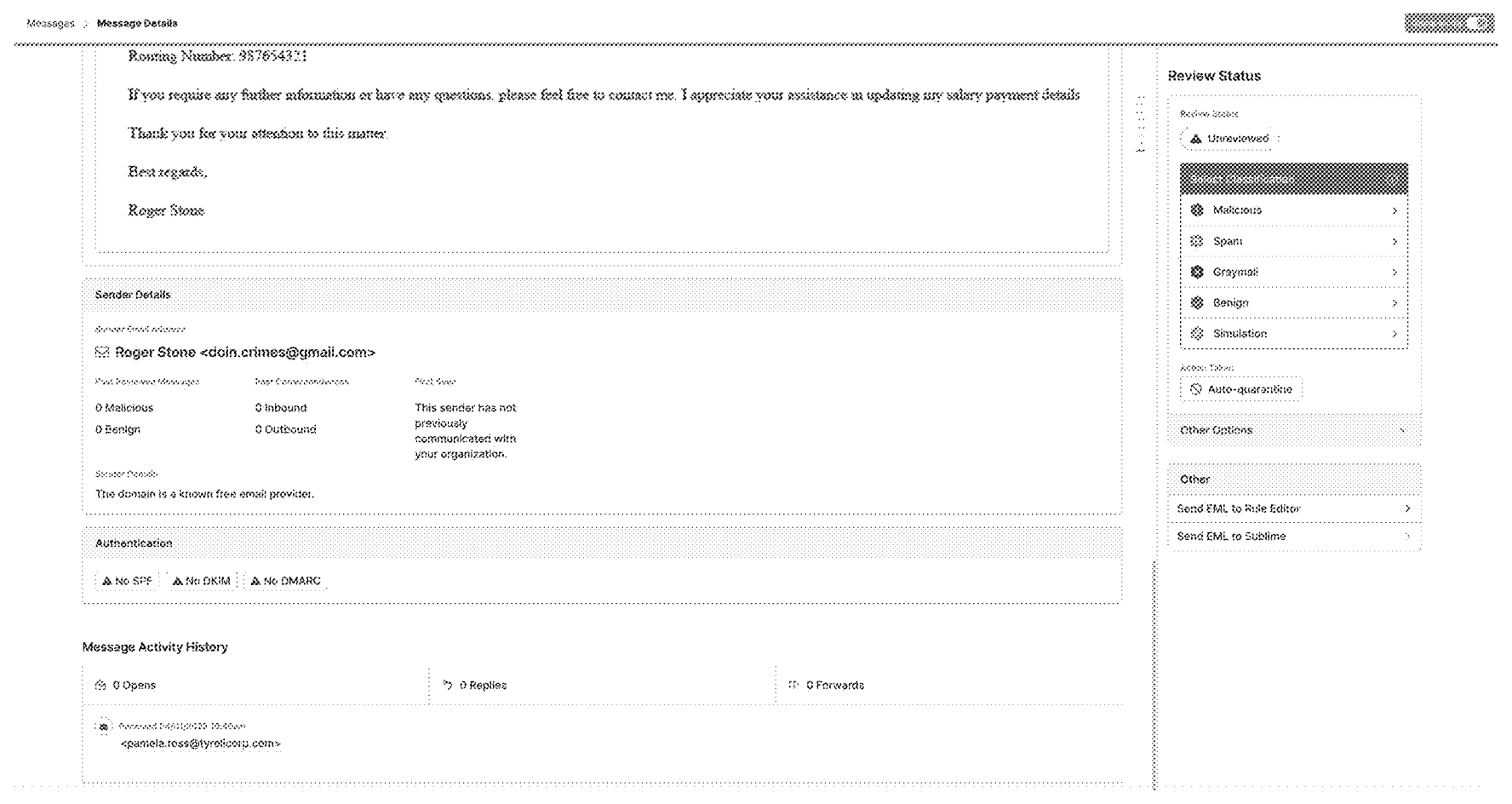

Accordingly, in such a non-limiting example, the threat detection and response service 100 may function to receive, via the graphical user interface, an input from a user selecting the selectable user interface element that corresponds to the subject electronic communication and, in turn, the threat detection and response service 100 may function to display an electronic communication details user interface that corresponds to the subject electronic communication in response to receiving the input from the user selecting the selectable user interface element. An electronic communication details user interface, as generally referred to herein, may include a detailed view of the selected electronic communication, including, but not limited to, extracted metadata, structured message data objects, identified threat indicators, and any applied or recommended threat mitigation actions, as shown generally by way of example in FIGS. 9-9D.

The electronic communication details user interface, in one or more embodiments, may include a total number of message open events associated with the subject electronic communication, a total number of message reply events associated with the subject electronic communication, and a total number of message forward events associated with the subject electronic communication. The electronic communication details user interface, in one or more embodiments, may further include a screen shot of the subject electronic communication and a subset of the set of subscriber-agnostic threat detection instructions or the set of subscriber-specific threat detection instructions that the threat detection and response service 100 used to detect the electronic communication as suspicious or malicious.

In one or more embodiments, the system or service implementing method 200 may function to determine the total number of message open events associated with the subject electronic communication using one or more processors that track when the subscribing entity opens the subject electronic communication. A message open event, as generally referred to herein, may relate to a system-detectable interaction indicating that a user associated with the subscribing entity has accessed, previewed, or otherwise opened the subject electronic communication within the message storage repository or a related user interface.

Additionally, or alternatively, in one or more embodiments, the system or service implementing method 200 may function to determine the total number of message reply events associated with the subject electronic communication using one or more processors that track when the subscribing entity replies to the subject electronic communication. A message reply event, as generally referred to herein, may relate to a system-detectable action indicating that a user associated with the subscribing entity has composed and transmitted a response to the subject electronic communication via the message storage repository or a related messaging interface.

Additionally, or alternatively, in one or more embodiments, the system or service implementing method 200 may function to determine the total number of message forward events associated with the subject electronic communication using one or more processors that track when the subscribing entity forwards the subject electronic communication. A message forward event, as generally referred to herein, may relate to a system-detectable action indicating that a user associated with the subscribing entity has transmitted the subject electronic communication, in whole or in part, to one or more additional recipients using the message storage repository or a related messaging interface.

In one or more embodiments, after detecting the subject electronic communication transmitted to the message storage repository is malicious, the system or service implementing method 200 (e.g., threat detection and response service 100) may function to receive, from the subscribing entity, a code repository connection request to automatically retrieve, store, and/or use a corpus of third-party threat detection instructions in analogous ways as described above. In such an embodiment, after retrieving and storing the corpus of third-party threat detection instructions, the system or service implementing method 200 may function to detect, in real-time or near real-time, a second electronic communication transmitted to the message storage repository.

Additionally, in one or more embodiments, the system or service implementing method 200 may function to generate, using one or more computers, a second structured message data object for the second electronic communication using unstructured message data that corresponds to the second electronic communication and, in turn, automatically assess, using the one or more computers, the second structured message data object that corresponds to the second electronic communication against a set of subscriber-agnostic threat detection instructions provided by the threat detection and response service 100, a set of subscriber-specific threat detection instructions created by the subscribing entity that controls the message storage repository, and the corpus of third-party threat detection instructions.

Accordingly, in one or more embodiments, the system or service implementing method 200 may function to detect, using the one or more computers, the second electronic communication as malicious based on the second structured message data object satisfying at least one third-party threat detection instruction of the corpus of third-party threat detection instructions. It shall be further recognized that, in one or more embodiments, the system or service implementing method 200 may function to execute, in real-time, a second threat mitigation action that mitigates a security threat associated with the second electronic communication in response to detecting the second electronic communication as malicious.

At least one technical benefit of using third-party threat detection instructions is that the system or service implementing method 200 can identify and mitigate new electronic communications associated with threat patterns that have not been captured by the subscriber-specific or subscriber-agnostic detection rules.

Figure 10:
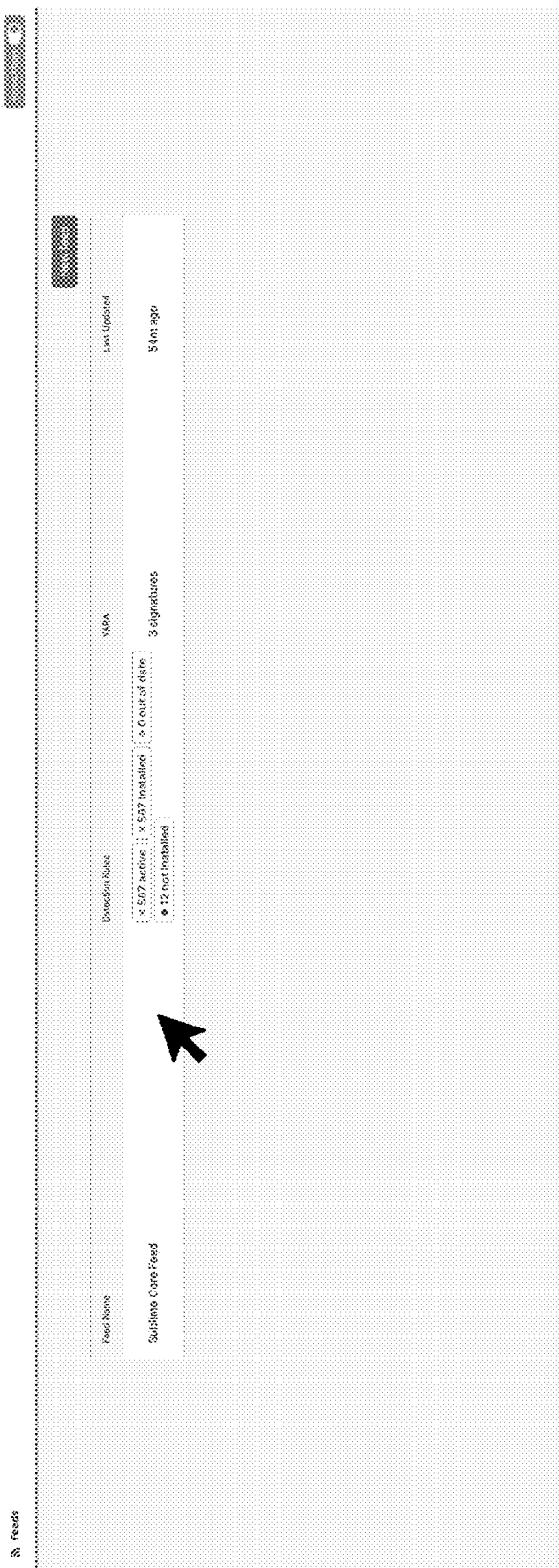
Figure 10A:
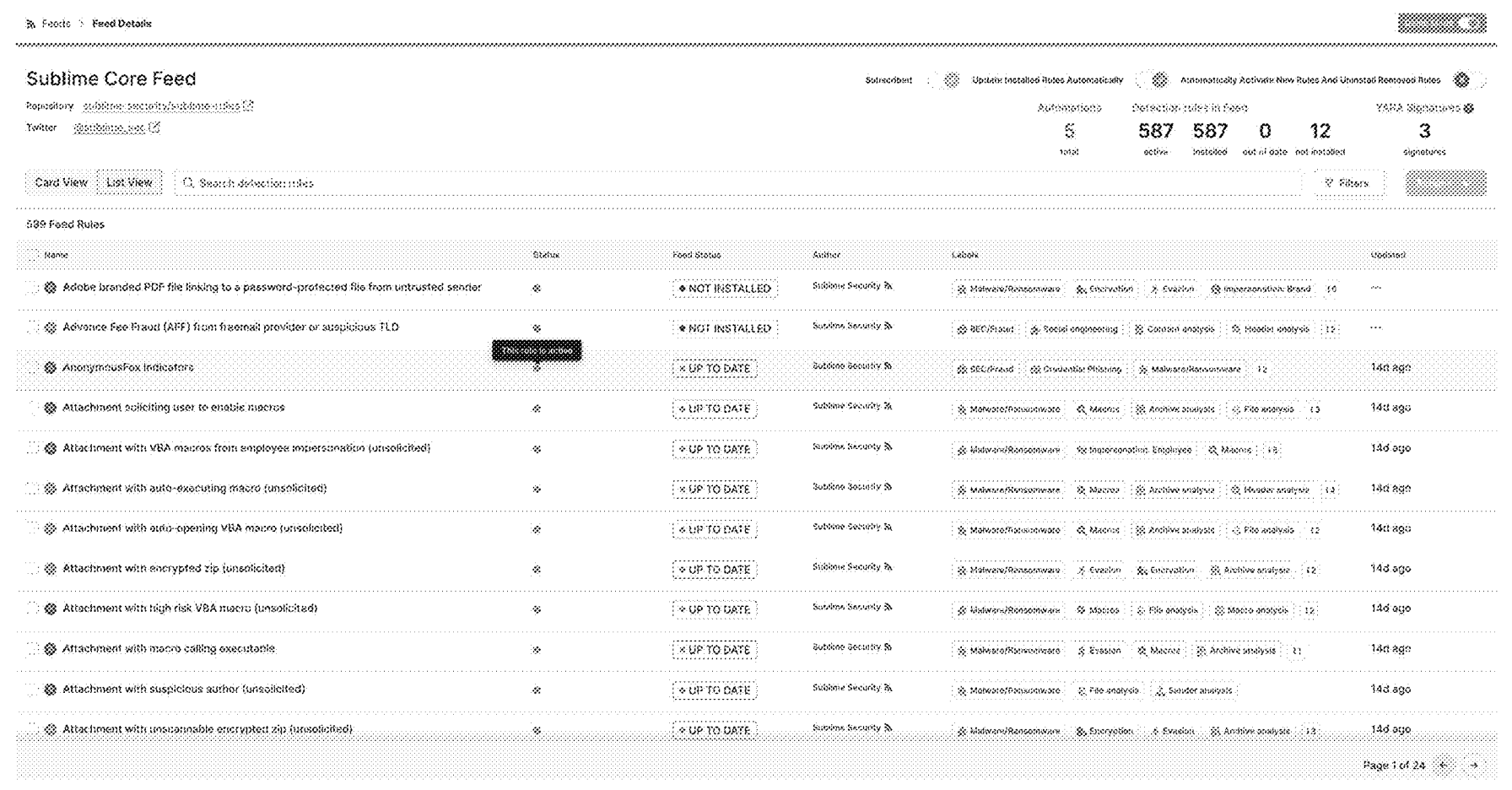
Figure 10B:
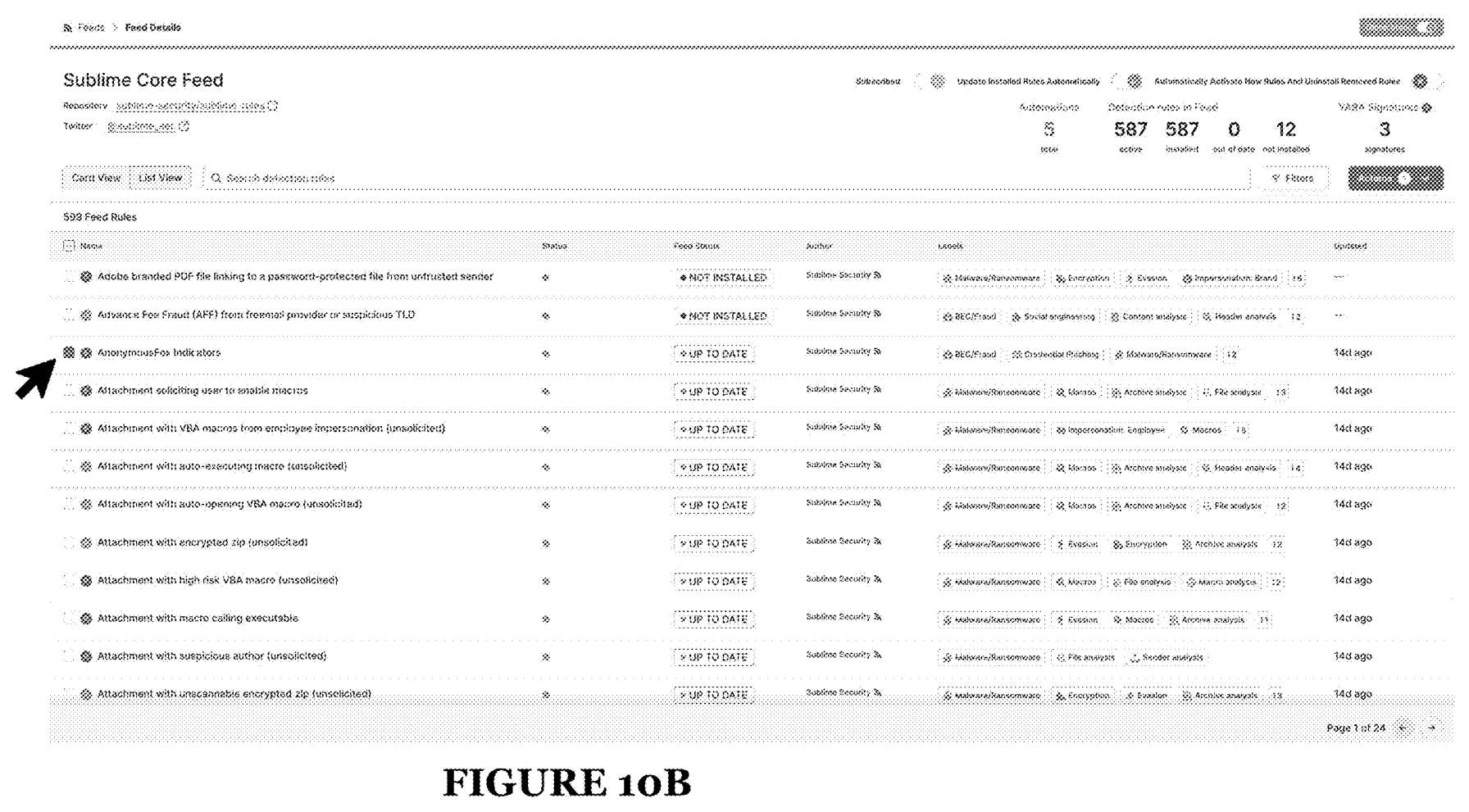
Figure 10C:
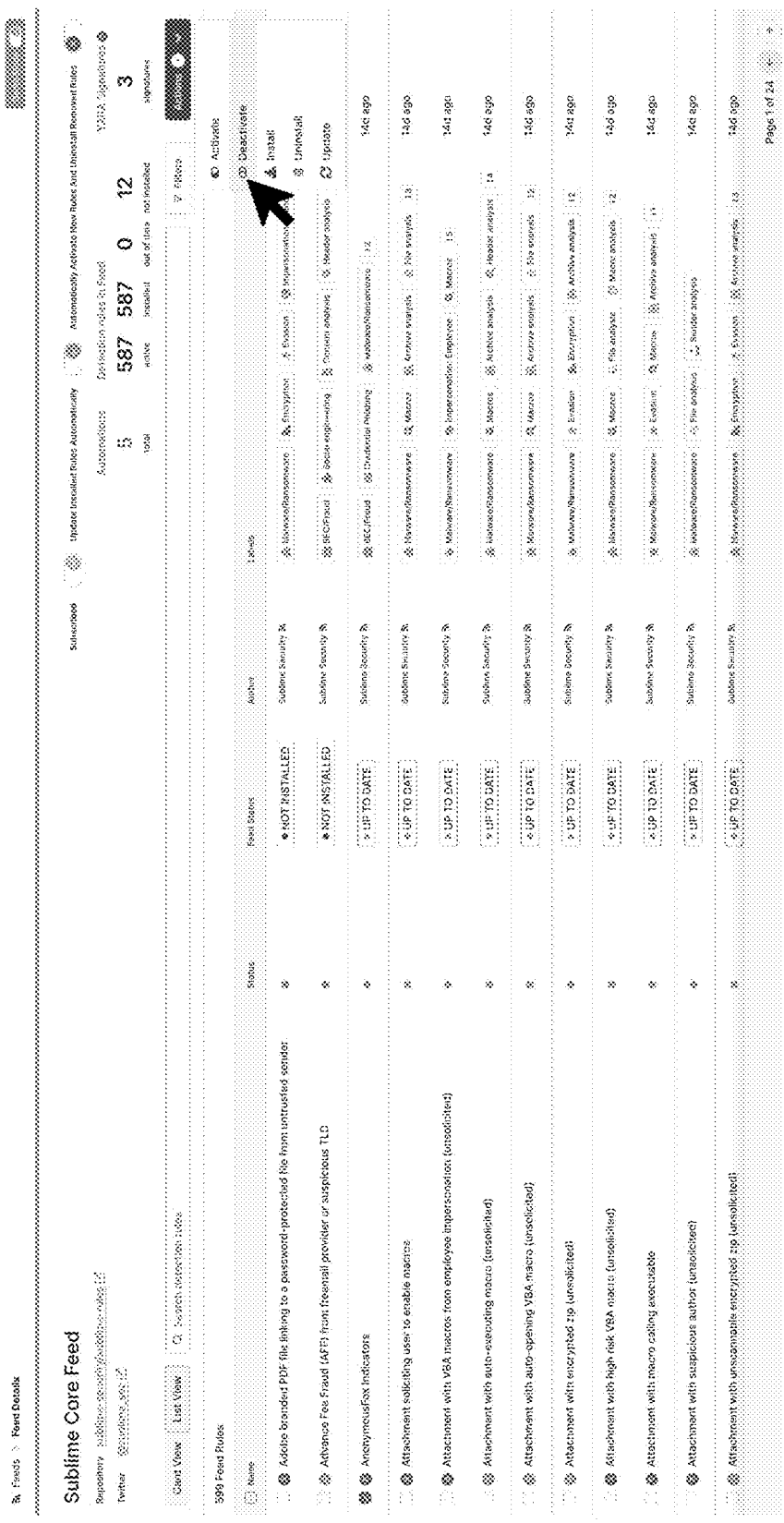
Figure 10D:
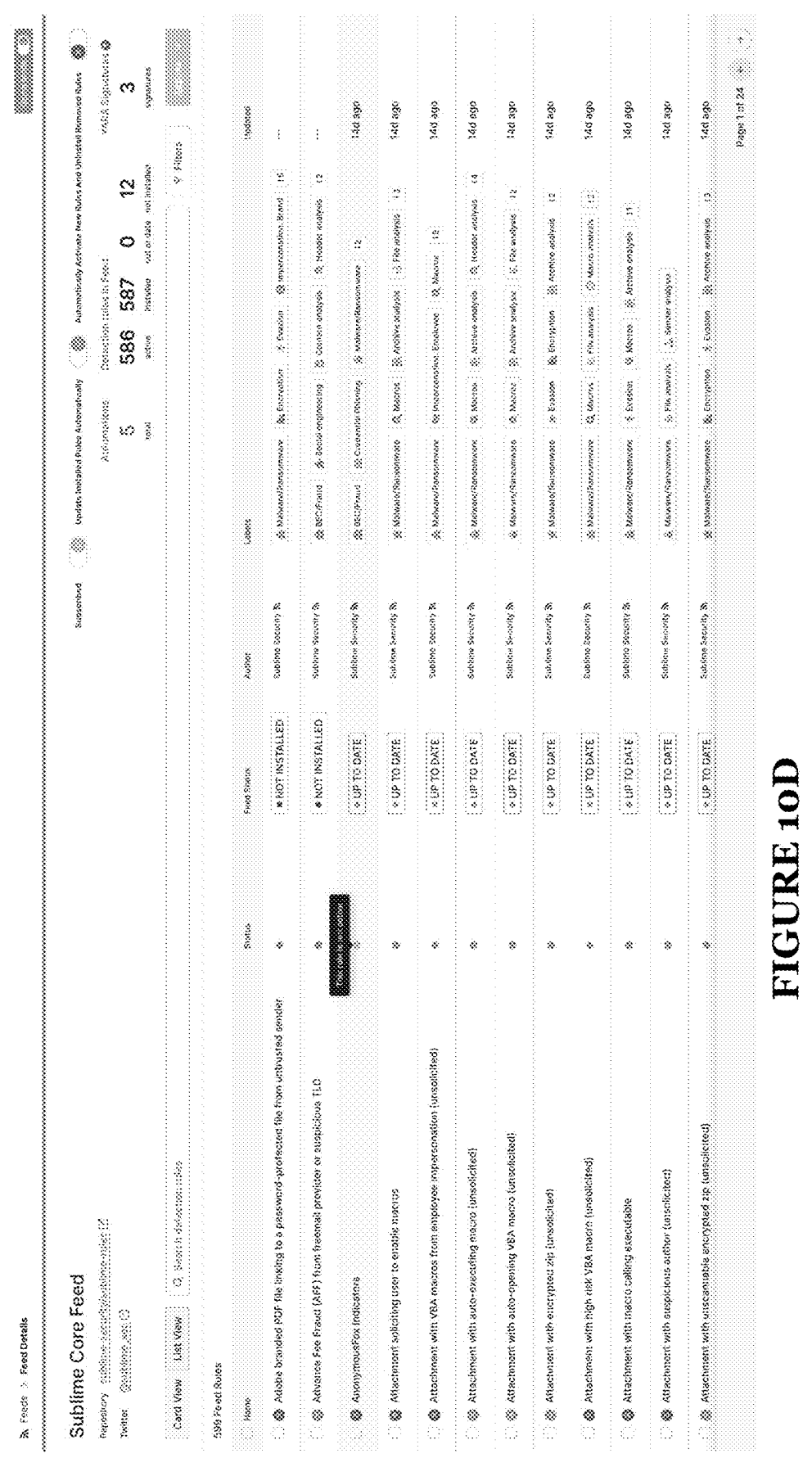

Additionally, or alternatively, in one or more embodiments, after executing the at least one threat mitigation action that mitigates the security threat associated with the subject electronic communication, the system or service implementing method 200 may function to instantiate a detection repository graphical user interface that includes a first selectable detection repository user interface element that corresponds to the set of subscriber-agnostic threat detection instructions and a second selectable detection repository user interface element that corresponds to the set of subscriber-specific threat detection instructions. In such an embodiment, the system or service implementing method 200 may function to receive, via one or more computers, a first input from a subscribing entity (e.g., user or the like) selecting the first selectable detection repository user interface element and, in turn, instantiate a detection instruction control user interface that includes a plurality of selectable detection instruction elements in response to receiving the first input, as shown generally by way of example in FIGS. 10-10D.

It shall be recognized that, in one or more embodiments, each selectable detection instruction element of the plurality of selectable detection instruction elements displayed on the detection instruction control user interface may correspond to a distinct subscriber-agnostic threat detection instruction included in the set of subscriber-agnostic threat detection instructions. For instance, in a non-limiting example, a first selectable detection instruction element of the plurality of selectable detection instruction elements may correspond to a first subscriber-agnostic threat detection instruction included in the set of subscriber-agnostic threat detection instructions. The first selectable detection instruction element, in such a non-limiting example, may include a visual indication that indicates the first subscriber-agnostic threat detection instruction is an active detection instruction that is used by the threat detection and response service 100 when assessing inbound electronic communications (e.g., the corresponding structured message data objects) associated with the subscribing entity.

Additionally, or alternatively, in such a non-limiting example, a second selectable detection instruction element of the plurality of selectable detection instruction elements may correspond to a second subscriber-agnostic threat detection instruction included in the set of subscriber-agnostic threat detection instructions. The second selectable detection instruction element, in such a non-limiting example, may include a visual indication that indicates the second subscriber-agnostic threat detection instruction is an inactive detection instruction that is not used by the threat detection and response service 100 when assessing the inbound electronic communications (e.g., the corresponding structured message data objects) associated with the subscribing entity.

In one or more embodiments, the system or service implementing method 200 may function to receive, via the detection instruction control user interface, a second input from the subscribing entity selecting the first selectable detection instruction element and, in turn, instantiate a detection instructions action menu that includes a detection instruction deactivation button while the first selectable detection instruction element is selected. In such an embodiment, after the detection instructions action menu is instantiated, the system or service implementing method 200 may receive, from the subscribing entity, an additional user input selecting the detection instruction deactivation button while the first selectable detection instruction element is selected. Accordingly, the system or service implementing method 200 may function to transition the first subscriber-agnostic threat detection instruction from an active detection state to an inactive detection state in response to receiving the additional user input (e.g., the threat detection and response service 100 does not use the first subscriber-agnostic threat detection instruction when assessing a threat of any future inbound electronic communication (or corresponding structured message data object) while the first subscriber-agnostic threat detection instruction remains in the inactive detection state), as shown generally by way of example in FIGS. 10-10D.

Figure 11:
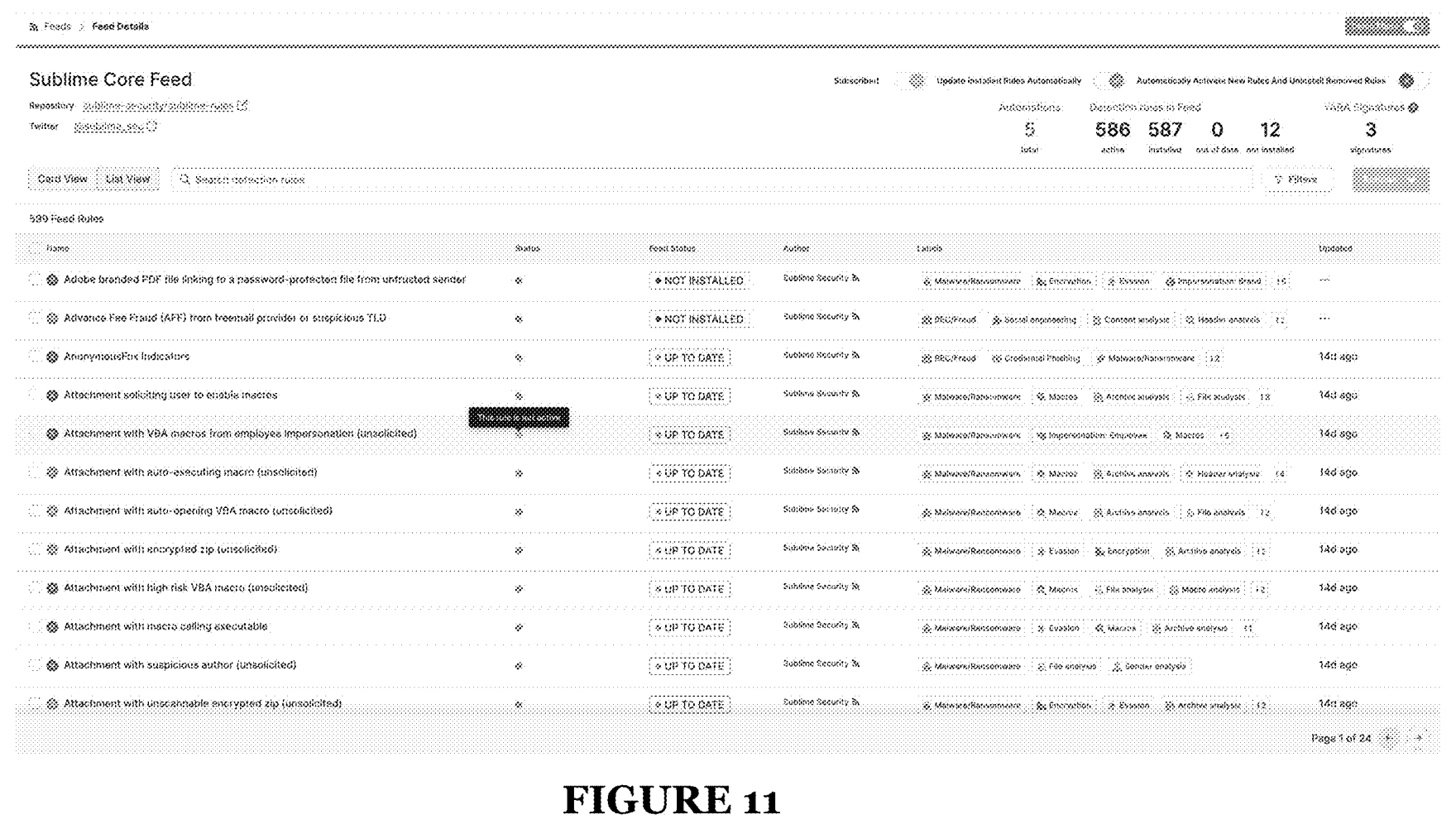
Figure 11A:
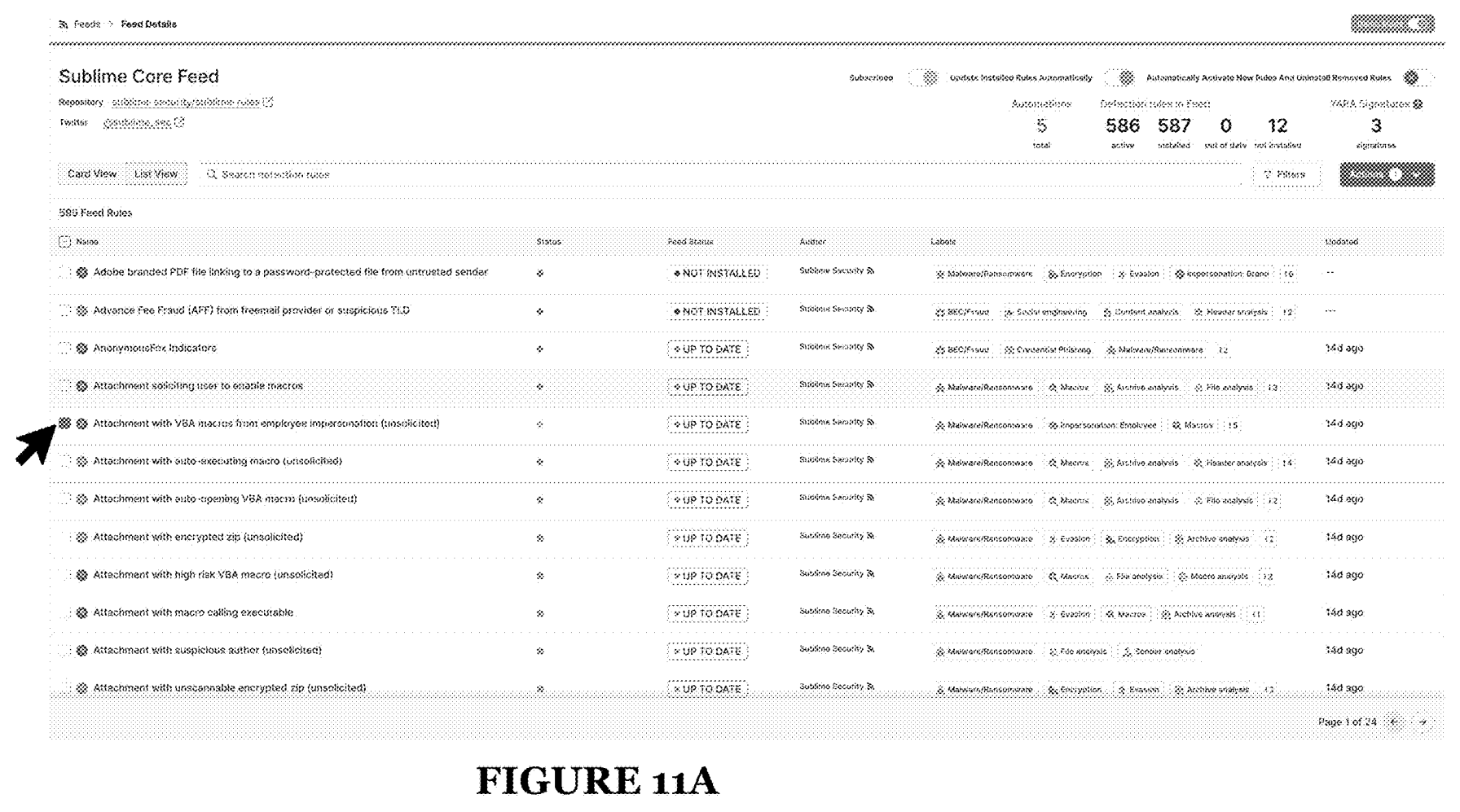
Figure 11B:
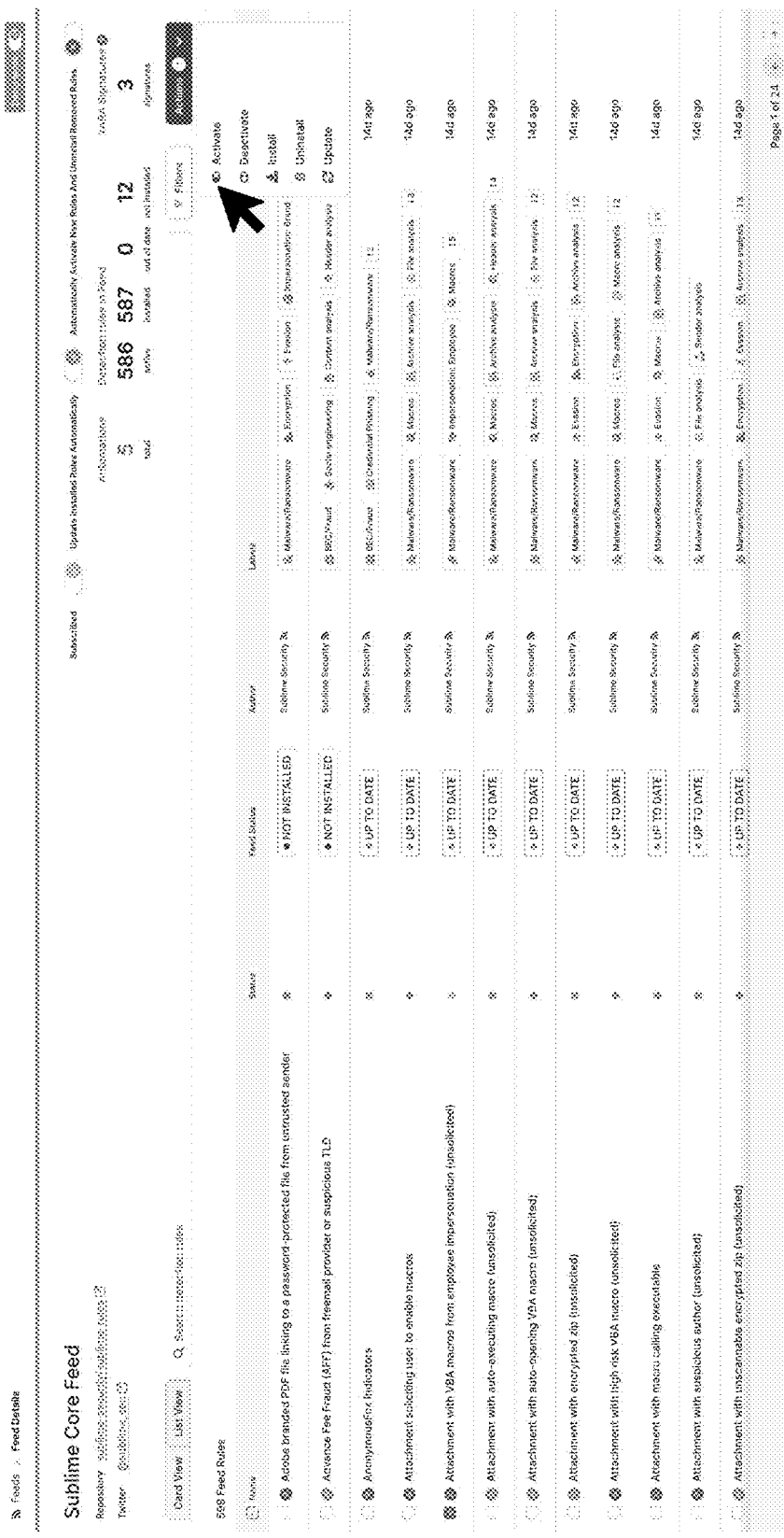
Figure 11C:
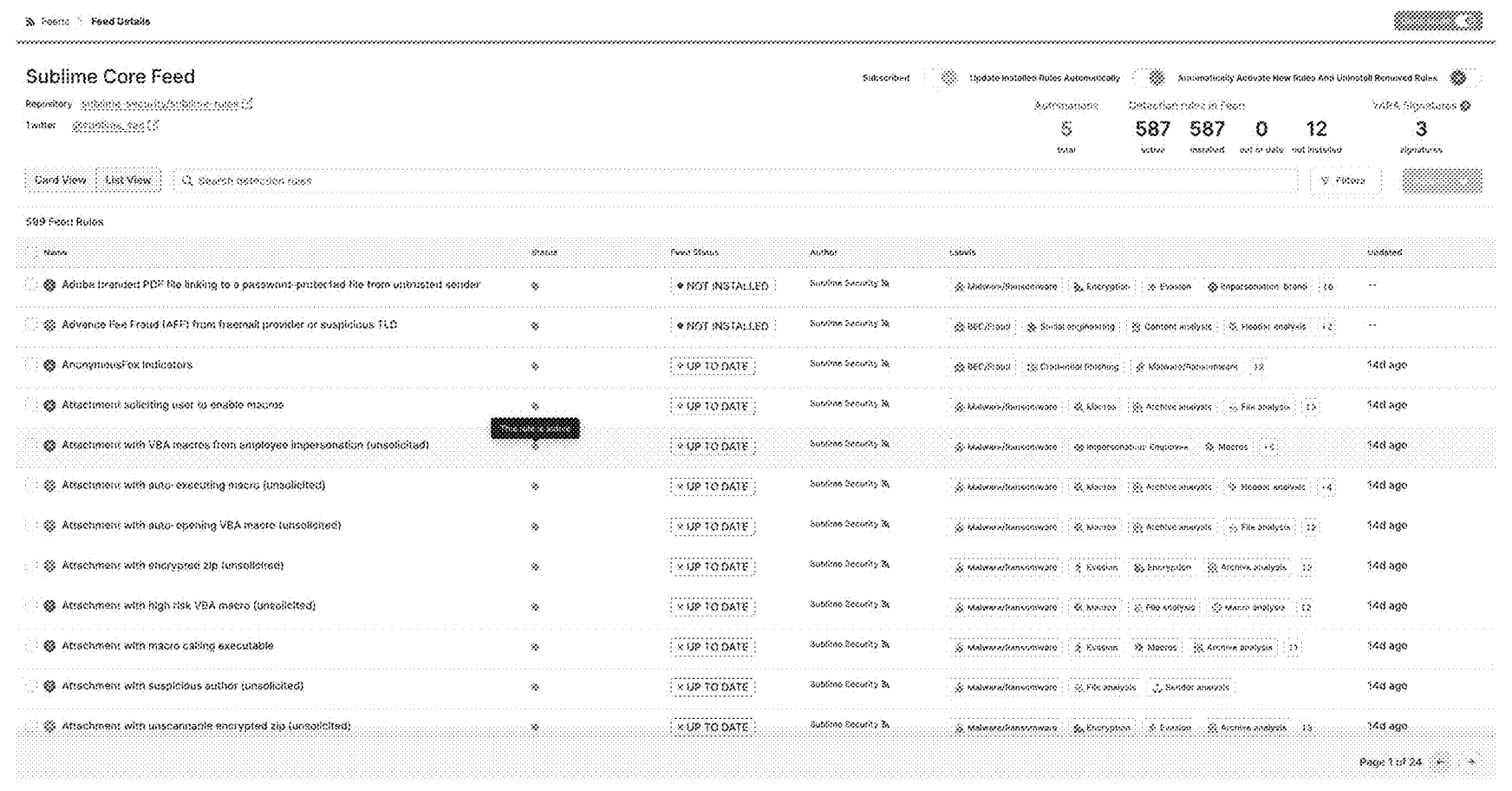

Additionally, or alternatively, in one or more embodiments, the system or service implementing method 200 may function to receive, via the detection instruction control user interface, a third input from the subscribing entity selecting the second selectable detection instruction element and, in turn, instantiate a detection instructions action menu that includes a detection instruction activation button while the second selectable detection instruction element is selected. In such an embodiment, after the detection instructions action menu is instantiated, the system or service implementing method 200 may function to receive, from the subscribing entity, an additional user input selecting the detection instruction activation button while the second selectable detection instruction element is selected. Accordingly, the system or service implementing method 200 may function to transition the second subscriber-agnostic threat detection instruction from an inactive detection state to an active detection state in response to receiving the additional user input (e.g., the threat detection and response service 100 uses the second subscriber-agnostic threat detection instruction when assessing a threat of any future inbound electronic communication (or corresponding structured message data object) while the second subscriber-agnostic threat detection instruction remains in the active detection state), as shown generally by way of example in FIGS. 11-11C.

Figure 12:
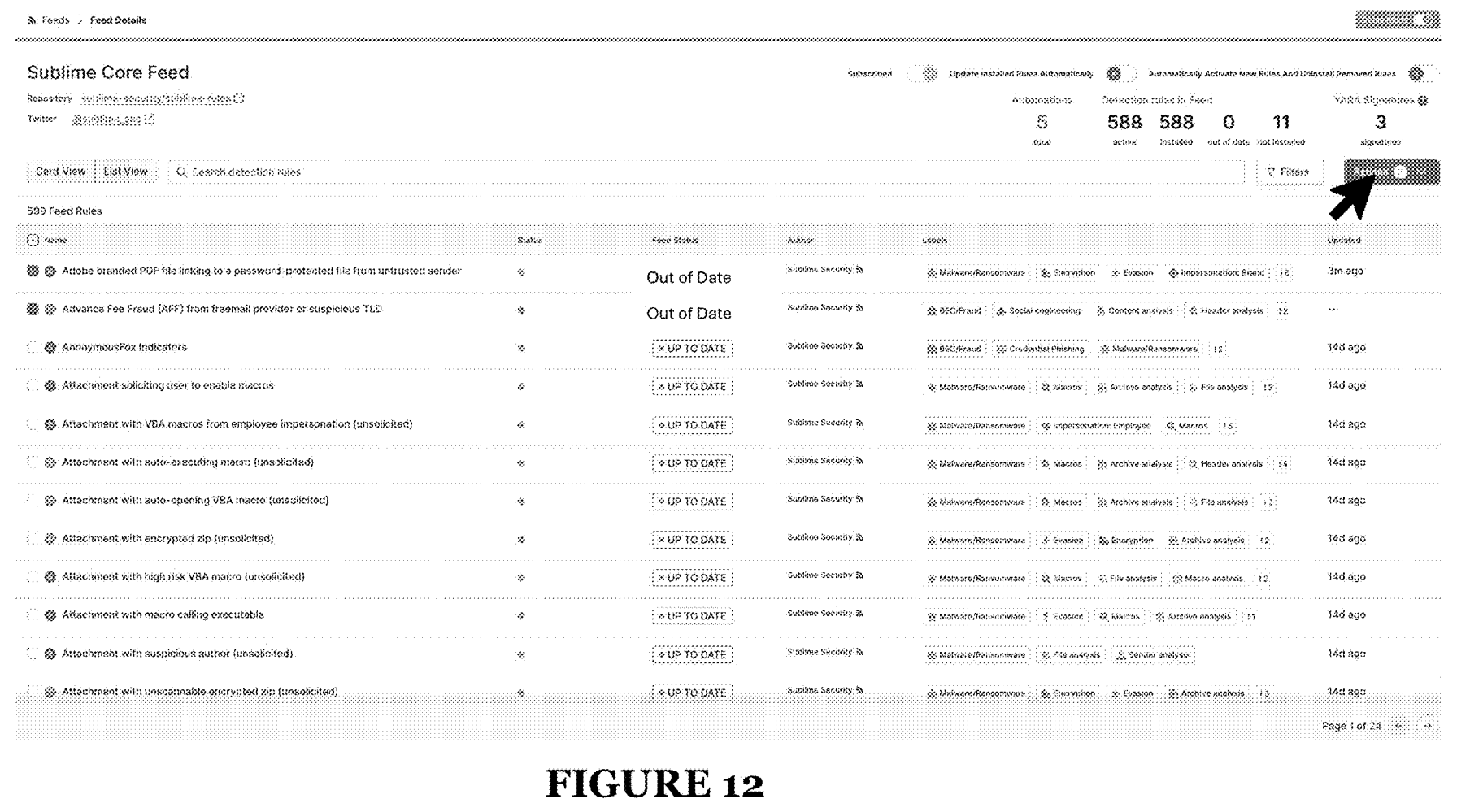
Figure 12A:
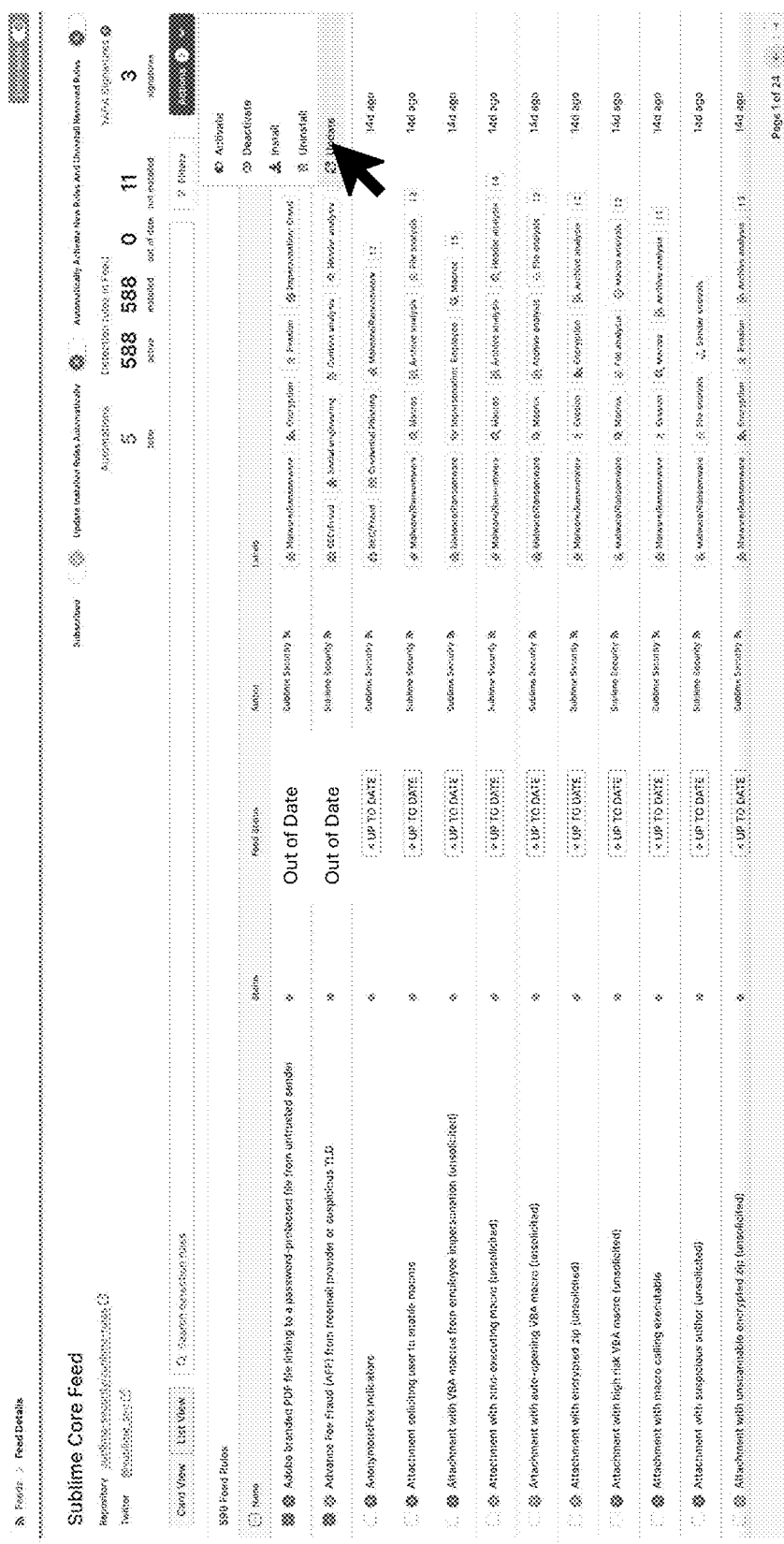
Figure 12B:
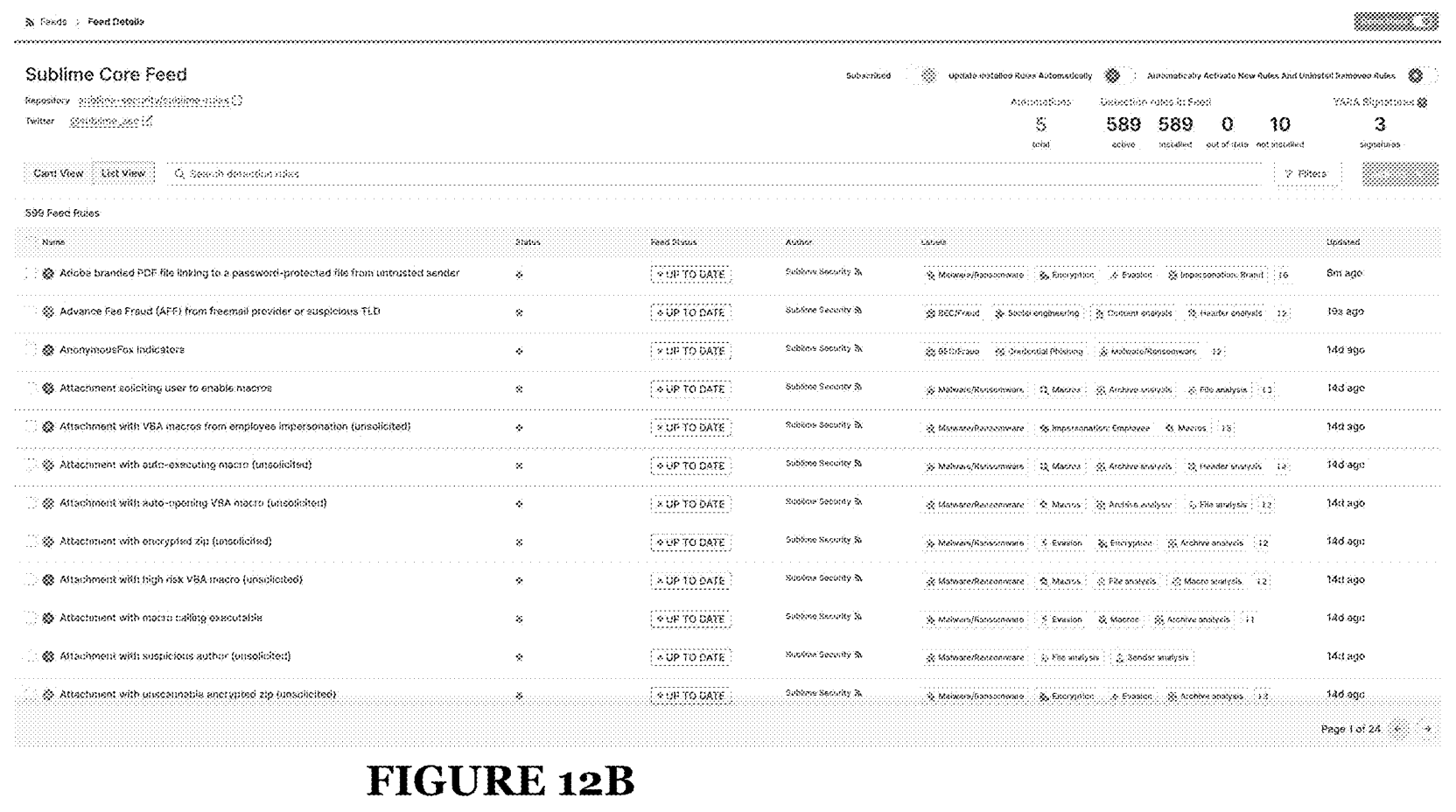

Additionally, or alternatively, in one or more embodiments, the system or service implementing method 200 may receive, via the detection instruction control user interface, a user input from the subscribing entity selecting a target selectable detection instruction element that includes a visual indication that the subscriber-agnostic threat detection instruction corresponding to the target selectable detection instruction element is out-of-date (e.g., the currently installed version for the corresponding subscriber-agnostic threat detection instruction is version 1; however, a newer version (e.g., version 2) of the same subscriber-agnostic threat detection instruction is available) and, in turn, instantiate a detection instructions action menu that includes a detection instruction update button while the target selectable detection instruction element is selected. In such an embodiment, after the detection instructions action menu is instantiated, the system or service implementing method 200 may function to receive, from the subscribing entity, an additional user input selecting the detection instruction update button while the target selectable detection instruction element is selected. Accordingly, in response to receiving the additional user input selecting the detection instruction update button, the system or service implementing method 200 may function to automatically retrieve the latest available detection instruction version (e.g., version 2) of the corresponding subscriber-agnostic threat detection instruction from a remote threat detection code repository (e.g., a GitHub® repository or the like) and install the latest available detection instruction version (e.g., version 2) in place of the out-of-date version (e.g., version 1) to transition the corresponding subscriber-agnostic threat detection instruction from an out-of-date detection state to an up-to-date detection state (e.g., the threat detection and response service 100 uses the updated detection instruction version of the subscriber-agnostic threat detection instruction when assessing a threat of any future inbound electronic communication while the detection instruction remains in the up-to-date detection instruction state), as shown generally by way of example in FIGS. 12-12B.

It shall be recognized that if the second selectable detection repository user interface element of the detection repository graphical user interface was alternatively selected, the system or service implementing method 200 may function to support activation, deactivation, and updating of the subscriber-specific threat detection instructions in analogous ways.

It shall be further recognized that, in some embodiments, multiple selectable detection instruction elements (e.g., at least two selectable detection instruction elements, at least fifteen selectable detection instruction elements, etc.) may be selected simultaneously via the detection instruction control user interface. Accordingly, in such an embodiment, selecting a corresponding action button (e.g., the detection instruction deactivation button, the detection instruction activation button, the detection instruction update button) of the detection instructions action menu may result in a bulk operation being performed on the selected threat detection instructions (e.g., activate all message threat detection instructions selected, deactivate all message threat detection instructions selected, update all message threat detection instructions selected).

3. COMPUTER-IMPLEMENTED METHOD AND COMPUTER PROGRAM PRODUCT

Embodiments of the system and/or method can include every combination and permutation of the various system components and the various method processes, wherein one or more instances of the method and/or processes described herein can be performed in real-time or near real-time, asynchronously (e.g., sequentially), concurrently (e.g., in parallel), or in any other suitable order by and/or using one or more instances of the systems, elements, and/or entities described herein.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although omitted for conciseness, the preferred embodiments include every combination and permutation of the implementations of the systems and methods described herein. Furthermore, each method step, process step, or the like described herein may be performed in real-time or near real-time.

As a person skilled in the art will recognize from the previous detailed description and from the figures and claims, modifications and changes can be made to the preferred embodiments of the invention without departing from the scope of this invention defined in the following claims.

We claim:

1. A computer-implemented method for real-time detection and mitigation of malicious electronic communications, the method comprising:
at a threat detection and response service:
detecting, in real-time, an electronic communication transmitted to a message storage repository monitored by the threat detection and response service;
retrieving, by one or more computers, unstructured message data of the electronic communication in response to detecting the transmission of the electronic communication to the message storage repository;
transforming, by the one or more computers, the unstructured message data of the electronic communication into a structured message data object interpretable by the threat detection and response service, wherein transforming the unstructured message data of the electronic communication into the structured message data object includes:
instantiating a message data object based on a message data model schema defined by the threat detection and response service for representing electronic communications of a target type,
extracting, from the unstructured message data of the electronic communication, a plurality of message components specified by the message data model schema, and
populating, within the message data object, the plurality of message components in accordance with the message data model schema to create the structured message data object corresponding to the electronic communication;
assessing, by the one or more computers, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository;
automatically detecting, by the one or more computers, the electronic communication as malicious based on the assessment of the structured message data object of the electronic communication against the set of subscriber-agnostic threat detection instructions and the set of subscriber-specific threat detection instructions; and
executing, in real-time, a threat mitigation action that mitigates a security threat associated with the electronic communication in response to detecting the electronic communication as malicious.

2. The computer-implemented method according to claim 1, wherein:
the threat detection and response service provides the subscribing entity with a distinct instance of the threat detection and response service in response to receiving a service enrollment request from the subscribing entity, and
the computer-implemented method further includes:
receiving, via a graphical user interface of the threat detection and response service, a code repository connection request from the subscribing entity to digitally connect a private threat detection code repository hosted by a remote code repository service to the distinct instance of the threat detection and response service, wherein the private threat detection code repository includes the set of subscriber-specific threat detection instructions;

retrieving, in real-time or near real-time, the set of subscriber-specific threat detection instructions included in the private threat detection code repository in response to receiving the code repository connection request; and storing the set of subscriber-specific threat detection instructions retrieved from the private threat detection code repository within the distinct instance of the threat detection and response service, wherein the threat detection and response service does not use the set of subscriber-specific threat detection instructions when assessing inbound electronic communications that correspond to other subscribing entities.

3. The computer-implemented method according to claim 1, wherein:

the threat detection and response service provisions a distinct instance of the threat detection and response service for the subscribing entity in response to receiving a service enrollment request from the subscribing entity, and provisioning the distinct instance of the threat detection and response service for the subscribing entity includes:

automatically retrieving the set of subscriber-agnostic threat detection instructions provided by the threat detection and response service by downloading a copy of a publicly accessible threat detection code repository hosted by a remote code repository service, wherein:

the publicly accessible threat detection code repository includes the set of subscriber-agnostic threat detection instructions, and the publicly accessible threat detection code repository is controlled by the threat detection and response service; and storing, within the distinct instance of the threat detection and response service, the set of subscriber-agnostic threat detection instructions retrieved from the publicly accessible threat detection code repository.

4. The computer-implemented method according to claim 1, wherein:

the threat detection and response service provisions a distinct instance of the threat detection and response service for the subscribing entity in response to receiving a service enrollment request from the subscribing entity, and the computer-implemented method further includes after detecting the electronic communication as malicious:

receiving, via a graphical user interface of the threat detection and response service, a code repository connection request from the subscribing entity to digitally connect a third-party threat detection code repository hosted by a remote code repository service to the distinct instance of the threat detection and response service, wherein:

the third-party threat detection code repository includes a corpus of third-party threat detection instructions created by a third-party entity external to the subscribing entity and the threat detection and response service;

retrieving, in real-time or near real-time, the corpus of third-party threat detection instructions included in the third-party threat detection code repository in response to receiving the code repository connection request; and storing the corpus of third-party threat detection instructions retrieved from the third-party threat detection code repository within the distinct instance of the threat detection and response service.

5. The computer-implemented method according to claim 4, further comprising:

detecting, in real-time, a second electronic communication transmitted to the message storage repository;

generating, by the one or more computers, a second structured message data object for the second electronic communication using unstructured message data that corresponds to the second electronic communication;

automatically assessing, by the one or more computers, the second structured message data object that corresponds to the second electronic communication against (i) the set of subscriber-agnostic threat detection instructions provided by the threat detection and response service, (ii) the set of subscriber-specific threat detection instructions created by the subscribing entity that controls the message storage repository, and (iii) the corpus of third-party threat detection instructions created by the third-party entity external to the subscribing entity and the threat detection and response service;

automatically detecting, by the one or more computers, the second electronic communication as malicious based on the second structured message data object satisfying at least one third-party threat detection instruction of the corpus of third-party threat detection instructions; and executing, in real-time, a second threat mitigation action that mitigates a security threat associated with the second electronic communication in response to detecting the second electronic communication as malicious.

6. The computer-implemented method according to claim 1, wherein:

the message storage repository is used by an end user associated with the subscribing entity, and executing the threat mitigation action includes automatically routing the electronic communication from the message storage repository to a threat containment queue that is not accessible by the end user.

7. The computer-implemented method according to claim 1, wherein:

the electronic communication is stored in a primary directory of the message storage repository, and executing the threat mitigation action includes:

automatically removing the electronic communication from the primary directory of the message storage repository, and automatically routing the electronic communication removed from the primary directory to a message disposal directory of the message storage repository.

8. The computer-implemented method according to claim 1, wherein:

the message storage repository corresponds to an electronic mail service used by the subscribing entity, and executing the threat mitigation action includes:

generating, by the one or more computers, a security alert message that includes a precis of the electronic communication detected as malicious, and transmitting the security alert message to the subscribing entity using a real-time messaging service different from the electronic mail service.

9. The computer-implemented method according to claim 1, further comprising:
after executing the threat mitigation action that mitigates the security threat associated with the electronic communication:
instantiating, by the one or more computers, a detection repository graphical user interface that includes:
a first selectable detection repository user interface element that corresponds to the set of subscriber-agnostic threat detection instructions, and
a second selectable detection repository user interface element that corresponds to the set of subscriber-specific threat detection instructions;
receiving, by the one or computers, a first input from the subscribing entity selecting the first selectable detection repository user interface element; and
in response to receiving the first input, instantiating a detection instruction control user interface that includes a plurality of selectable detection instruction elements, wherein each distinct selectable detection instruction element corresponds to a distinct subscriber-agnostic threat detection instruction of the set of subscriber-agnostic threat detection instructions.

10. The computer-implemented method according to claim 9, wherein:
a first selectable detection instruction element of the plurality of selectable detection instruction elements corresponds to a first subscriber-agnostic threat detection instruction of the set of subscriber-agnostic threat detection instructions, wherein:
the first selectable detection instruction element includes a visual indication that indicates the first subscriber-agnostic threat detection instruction is an active detection instruction that is used by the threat detection and response service when assessing inbound electronic communications associated with the subscribing entity, and
a second selectable detection instruction element of the plurality of selectable detection instruction elements corresponds to a second subscriber-agnostic threat detection instruction of the set of subscriber-agnostic threat detection instructions, wherein:
the second selectable detection instruction element includes a visual indication that indicates the second subscriber-agnostic threat detection instruction is an inactive detection instruction that is not used by the threat detection and response service when assessing the inbound electronic communications associated with the subscribing entity.

11. The computer-implemented method according to claim 10, further comprising:
receiving, via the detection instruction control user interface, a second input from the subscribing entity selecting the first selectable detection instruction element,
instantiating, while the first selectable detection instruction element is selected, a detection instructions action menu that includes a detection instruction deactivation button,
receiving, from the subscribing entity, an additional user input selecting the detection instruction deactivation button while the first selectable detection instruction element is selected, and
transitioning the first subscriber-agnostic threat detection instruction from an active detection state to an inactive detection state based on receiving the additional user input, wherein the threat detection and response service does not use the first subscriber-agnostic threat detection instruction when assessing a threat of any future inbound electronic communication while the first subscriber-agnostic threat detection instruction remains in the inactive detection state.

12. The computer-implemented method according to claim 10, further comprising:
receiving, via the detection instruction control user interface, a second input from the subscribing entity selecting the second selectable detection instruction element,
instantiating, while the second selectable detection instruction control object is selected, a detection instructions action menu that includes a detection instruction activation button,
receiving, from the subscribing entity, an additional user input selecting the detection instruction activation button while the second selectable detection instruction control object is selected, and
transitioning the second subscriber-agnostic threat detection instruction from an inactive detection state to an active detection state based on receiving the additional user input, wherein the threat detection and response service uses the second subscriber-agnostic threat detection instruction when assessing a threat of any future inbound electronic communication while the second subscriber-agnostic threat detection instruction remains in the active detection state.

13. A computer-implemented system comprising:
one or more processors;
a memory;
a computer-readable medium operably coupled to the one or more processors, the computer-readable medium having computer-readable instructions stored thereon that, when executed by the one or more processors, cause a computing device to perform operations comprising:
detecting, in real-time, an electronic communication transmitted to a message storage repository monitored by a threat detection and response service;
retrieving, by the one or more processors, unstructured message data of the electronic communication in response to detecting the transmission of the electronic communication to the message storage repository;
transforming, by the one or more processors, the unstructured message data of the electronic communication into a structured message data object interpretable by the threat detection and response service;
assessing, by the one or more processors, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository;
automatically detecting, by the one or more processors, the electronic communication as malicious based on the assessment of the structured message data object of the electronic communication against the set of subscriber-agnostic threat detection instructions and the set of subscriber-specific threat detection instructions; and executing, in real-time, a threat mitigation action that mitigates a security threat associated with the electronic communication in response to detecting the electronic communication as malicious.

14. The computer-implemented system according to claim 1, wherein:
the structured message data object that corresponds to the electronic communication includes:
a plurality of parent-level electronic communication data objects, wherein each distinct parent-level electronic communication data object of the plurality of parent-level electronic communication data objects represents a distinct portion of the electronic communication, and
each distinct parent-level electronic communication data object of the plurality of parent-level electronic communication data objects stores a plurality of message attribute identifiers and a corresponding set of message attribute values that correspond to the distinct portion of the electronic communication.

15. The computer-implemented system according to claim 14, wherein:
at least one subscriber-agnostic threat detection instruction of the set of subscriber-agnostic threat detection instructions is encoded with a data object traversal path that specifies a distinct sequence of message attribute identifiers configured to extract a target message attribute value from the structured message data object of the electronic communication,
the at least one subscriber-agnostic threat detection instruction is further encoded with one or more attribute value conditions to evaluate the target message attribute value extracted from the structured message data object of the electronic communication, and
the at least one subscriber-agnostic threat detection instruction is further encoded to detect the electronic communication as malicious in response to identifying the target message attribute value extracted from the structured message data object satisfies the one or more attribute value conditions.

16. The computer-implemented system according to claim 15, wherein:
the at least one subscriber-agnostic threat detection instruction is digitally linked to the threat mitigation action, and
the threat mitigation action is automatically executed by the threat detection and response service in response to identifying the at least one subscriber-agnostic threat detection instruction detecting the electronic communication as malicious.

17. A computer-program product comprising a non-transitory machine-readable storage medium storing computer instructions that, when executed by one or more processors, perform operations comprising:
detecting, in real-time, an electronic communication transmitted to a message storage repository monitored by a threat detection and response service;
retrieving, by the one or more processors, unstructured message data of the electronic communication in response to detecting the transmission of the electronic communication to the message storage repository;
transforming, by the one or more processors, the unstructured message data of the electronic communication into a structured message data object interpretable by the threat detection and response service, wherein transforming the unstructured message data of the electronic communication into the structured message data object includes:
instantiating a message data object based on a message data model schema defined by the threat detection and response service for representing electronic communications of a target type,
extracting, from the unstructured message data of the electronic communication, a plurality of message components specified by the message data model schema, and
populating, within the message data object, the plurality of message components in accordance with the message data model schema to create the structured message data object corresponding to the electronic communication;
assessing, by the one or more processors, the structured message data object that corresponds to the electronic communication against (i) a set of subscriber-agnostic threat detection instructions provided by the threat detection and response service and (ii) a set of subscriber-specific threat detection instructions created by a subscribing entity that controls the message storage repository;
automatically detecting, by the one or more processors, the electronic communication as suspicious based on the assessment of the structured message data object of the electronic communication against the set of subscriber-agnostic threat detection instructions and the set of subscriber-specific threat detection instructions; and
executing a threat mitigation action that mitigates a security threat associated with the electronic communication in response to detecting the electronic communication as suspicious.

18. The computer-program product according to claim 17, wherein the computer instructions, when executed by the one or more processors, perform operations further comprising:
determining a total number of message open events associated with the electronic communication using the one or more processors that tracks when the subscribing entity opens the electronic communication;
determining a total number of message reply events associated with the electronic communication using the one or more processors that tracks when the subscribing entity replies to the electronic communication, and
determining a total number of message forward events associated with the electronic communication using the one or more processors that tracks when the subscribing entity forwards the electronic communication.

19. The computer-program product according to claim 18, wherein:
executing the threat mitigation action includes automatically routing the electronic communication to an electronic communication review queue, and
the computer instructions, when executed by the one or more processors, perform operations further comprising:
displaying, using a graphical user interface, the electronic communication review queue, wherein the graphical user interface includes a selectable representation that corresponds to the electronic communication;
receiving, via the graphical user interface, an input from a user selecting the selectable representation that corresponds to the electronic communication; and displaying, by the one or more processors, an electronic communication details user interface that corresponds to the electronic communication, wherein the electronic communication details user interface includes a message activity history section that includes:
- the total number of message open events associated with the electronic communication,
- the total number of message reply events associated with the electronic communication, and
- the total number of message forward events associated with the electronic communication.

20. The computer-program product according to claim 19, wherein the electronic communication details user interface that corresponds to the electronic communication further includes:
- a screen shot of the electronic communication, and
- a subset of the set of subscriber-agnostic threat detection instructions or the set of subscriber-specific threat detection instructions that the threat detection and response service used to detect the electronic communication as suspicious.

21. The computer-program product according to claim 17, wherein:
- a subject threat detection instruction of the set of subscriber-agnostic threat detection instructions or the set of subscriber-specific threat detection instructions is encoded with a computer-executable enrichment function that is configured to perform an enrichment operation,
- assessing the structured message data object that corresponds to the electronic communication against the set of subscriber-agnostic threat detection instructions and the set of subscriber-specific threat detection instructions further includes assessing the structured message data object against the subject threat detection instruction, and
- the computer-program product further comprises computer instructions for performing operations including:
  - invoking the computer-executable enrichment function during the assessment of the structured message data object against the subject threat detection instruction;
  - transmitting a request to a backend service of the threat detection and response service to perform the enrichment operation in response to invoking the computer-executable enrichment function; and
  - receiving a response from the backend service that includes an enrichment output in response to the backend service performing the enrichment operation, wherein the subject threat detection instruction determines the electronic communication is suspicious based at least in part on the enrichment output.

22. The computer-program product according to claim 21, wherein:
- the computer-executable enrichment function corresponds to a message screenshot enrichment function,
- the message screenshot enrichment function captures a message screenshot of the electronic communication, and
- the subject threat detection instruction determines the electronic communication is suspicious based on providing the message screenshot as input to an additional enrichment function that detects the message screenshot includes a company logo that corresponds to a brand or an organization historically impersonated in phishing attacks.

23. The computer-program product according to claim 21, wherein:
- the computer-executable enrichment function corresponds to a message screenshot enrichment function,
- the message screenshot enrichment function captures a message screenshot of the electronic communication,
- the subject threat detection instruction further provides the message screenshot as input to an additional enrichment function that performs optical character recognition (OCR) on the message screenshot to identify textual content included in the screenshot, and
- the subject threat detection instruction determines the electronic communication is suspicious based on the textual content including one or more phrases referencing free products, giveaways, or promotional offers.

24. The computer-program product according to claim 21, wherein:
- the structured message data object includes a base64 encoded value,
- the computer-executable enrichment function corresponds to a base64 scanning enrichment function,
- the base64 scanning enrichment function is invoked in response to providing the base64 encoded value of the structured message data object as input to the base64 scanning enrichment function,
- the base64 scanning enrichment function outputs a decoded value that corresponds to the base64 encoded value, and
- the subject threat detection instruction determines the electronic communication is suspicious based on the decoded value satisfying one or more threat detection conditions of the subject threat detection instruction.

25. The computer-program product according to claim 21, wherein:
- the structured message data object includes a file attachment,
- the computer-executable enrichment function corresponds to a file screenshot enrichment function,
- the file screenshot enrichment function captures a screenshot of one or more pieces of content included within the file attachment, and
- the subject threat detection instruction determines the electronic communication is suspicious based on providing the screenshot as input to an additional enrichment function that detects the screenshot includes a company logo that corresponds to a brand or an organization historically impersonated in phishing attacks.

26. The computer-program product according to claim 21, wherein:
- the structured message data object includes a hyperlink,
- the computer-executable enrichment function corresponds to a machine learning-based link analysis enrichment function,
- the machine learning-based link analysis enrichment function is invoked in response to providing the hyperlink of the structured message data object as input to the machine learning-based link analysis enrichment function, and
- in response to invoking the machine learning-based link analysis enrichment function, the machine learning-based link analysis enrichment function:
  - navigates to a destination webpage that corresponds to the hyperlink,
  - captures a screenshot of the destination webpage, and executes one or more machine learning-based object detection models to determine if the screenshot includes one or more objects of a predetermined object type, and outputs a classification label indicating the hyperlink is suspicious based on the screenshot having at least one object of the predetermined object type, wherein the subject threat detection instruction determines the electronic communication is suspicious based on the classification label outputted by the machine learning-based link analysis enrichment function satisfying one or more threat detection conditions of the subject threat detection instruction.

27. The computer-program product according to claim 21, wherein:

the structured message data object includes a file attachment, the computer-executable enrichment function corresponds to a machine learning-based logo detection enrichment function, the machine learning-based logo detection enrichment function is invoked in response to providing the file attachment of the structured message data object as input to the machine learning-based logo detection enrichment function, and in response to invoking the machine learning-based logo detection enrichment function, the machine learning-based logo detection enrichment function:

detects, using a machine learning-based object detection model, an occurrence of a subject logo within the file attachment, generates, using a Siamese neural network, a numerical vector representation of the subject logo, assesses the numerical vector representation of the subject logo against a plurality of reference numerical vector representations that correspond to a predetermined set of company logos, and determines the subject logo is equivalent to a subject company logo included in the predetermined set of company logos based on the assessment, wherein the subject threat detection instruction determines the electronic communication is suspicious based on the machine learning-based logo detection enrichment function determining the subject logo is equivalent to the subject company logo.

28. The computer-program product according to claim 21, wherein:

the structured message data object includes a file attachment with a macro, the computer-executable enrichment function corresponds to a machine learning-based macro classification enrichment function, the machine learning-based macro classification enrichment function is invoked in response to providing the file attachment with the macro as input to the machine learning-based macro classification enrichment function, and in response to invoking the machine learning-based macro classification enrichment function, the machine learning-based macro classification enrichment function:

assesses the macro using a machine learning model, and outputs a classification label indicating the macro is malicious based on the assessment, wherein the subject threat detection instruction determines the electronic communication is suspicious based on the classification label outputted by the machine learning-based macro classification enrichment function satisfying one or more threat detection conditions of the subject threat detection instruction.

29. The computer-implemented method according to claim 1, wherein:

the message query language is configured to reference at least one structured data list during evaluation of the threat detection instruction, the structured data list being selected from a group including a global list and an organization-specific list, and the structured data list comprises one or more attribute values associated with electronic communications.

30. The computer-implemented method according to claim 1, wherein the message query language is configured to reference one or more historical data records during evaluation of the threat detection instruction, the historical data records comprising classification results or message attributes associated with one or more prior electronic communications processed by the threat detection and response service.

* * * * *